US008595196B2

(12) United States Patent
Kataoka et al.

(10) Patent No.: US 8,595,196 B2
(45) Date of Patent: Nov. 26, 2013

(54) COMPUTER PRODUCT, INFORMATION RETRIEVING APPARATUS, AND INFORMATION RETRIEVAL METHOD

(75) Inventors: Masahiro Kataoka, Kawasaki (JP); Ken Murata, Kawasaki (JP); Hideo Kasai, Kawasaki (JP); Takashi Tsubokura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 491 days.

(21) Appl. No.: 12/622,902

(22) Filed: Nov. 20, 2009

(65) Prior Publication Data

US 2010/0131475 A1 May 27, 2010

Related U.S. Application Data

(63) Continuation of application No. PCT/JP2007/060648, filed on May 24, 2007.

(51) Int. Cl.
*G06F 17/00* (2006.01)
*G06F 17/30* (2006.01)
*G06F 7/00* (2006.01)

(52) U.S. Cl.
USPC ............ 707/693; 707/730; 707/769; 707/797

(58) Field of Classification Search
None
See application file for complete search history.

(56) References Cited

U.S. PATENT DOCUMENTS

| | | | |
|---|---|---|---|
| 4,700,175 A * | 10/1987 | Bledsoe | ........................ 341/65 |
| 4,797,855 A | 1/1989 | Duncan, IV et al. | |
| 4,862,167 A | 8/1989 | Copeland, III | |
| 4,955,066 A * | 9/1990 | Notenboom | .................. 382/240 |
| 5,351,047 A | 9/1994 | Behlen | |
| 5,696,507 A * | 12/1997 | Nam | ............................... 341/67 |
| 5,745,745 A | 4/1998 | Tada et al. | |

(Continued)

FOREIGN PATENT DOCUMENTS

| | | |
|---|---|---|
| JP | A 4-363970 | 12/1992 |
| JP | A 6-189140 | 7/1994 |

(Continued)

OTHER PUBLICATIONS

Toman-Vojtech, Compression of XML Data, Mar. 20, 2003, Department of Software Engineering, Master Thesis, Faculty of Mathematics and Physics, Charles University, Prague, pp. 1-123.*

(Continued)

*Primary Examiner* — Jung Kim
*Assistant Examiner* — James J Wilcox
(74) *Attorney, Agent, or Firm* — Greer, Burns & Crain, Ltd.

(57) ABSTRACT

A recording medium stores therein an information retrieval program that causes a computer to execute generating a Huffman tree based on an XML tag written in an XML file and an appearance frequency of character data exclusive of the XML tag; compressing the XML file using the Huffman tree; receiving a retrieval condition that includes a retrieval keyword and type information concerning the retrieval keyword; setting a decompression start flag for a compression code that is for an XML start tag related to the type information, the decompression start flag instructing commencement of decompression of a compression code string subsequent to the XML start tag; detecting, in the compressed XML file, the compression code for which the decompression start flag has been set; and decompressing, when the compression code for which the decompression start flag has been set is detected, the compression code string, using the Huffman tree.

14 Claims, 62 Drawing Sheets

(56) References Cited

U.S. PATENT DOCUMENTS

| | | | |
|---|---|---|---|
| 5,748,953 A * | 5/1998 | Mizutani et al. | 1/1 |
| 5,796,356 A | 8/1998 | Okada et al. | |
| 5,802,534 A * | 9/1998 | Hatayama et al. | 715/205 |
| 5,812,076 A | 9/1998 | Yoshida | |
| 5,970,177 A | 10/1999 | Chinnock | |
| 6,215,906 B1 | 4/2001 | Okada | |
| 6,240,455 B1 | 5/2001 | Kamasaka et al. | |
| 6,518,895 B1 | 2/2003 | Weiss et al. | |
| 6,529,912 B2 * | 3/2003 | Satoh et al. | 707/693 |
| 6,563,440 B1 | 5/2003 | Kangas | |
| 6,771,824 B1 | 8/2004 | Chiu et al. | |
| 7,043,088 B2 | 5/2006 | Chiu et al. | |
| 7,283,591 B2 | 10/2007 | Ruehle | |
| 7,348,901 B2 | 3/2008 | De Martin et al. | |
| 7,365,658 B2 | 4/2008 | Todorov et al. | |
| 7,539,692 B2 * | 5/2009 | Min et al. | 1/1 |
| 7,856,595 B2 * | 12/2010 | Itani | 715/234 |
| 2002/0063641 A1 | 5/2002 | Fish | |
| 2002/0099685 A1* | 7/2002 | Takano et al. | 707/1 |
| 2004/0223608 A1 | 11/2004 | Oommen et al. | |
| 2007/0273564 A1* | 11/2007 | Morel | 341/87 |
| 2008/0098024 A1 | 4/2008 | Kataoka et al. | |

FOREIGN PATENT DOCUMENTS

| | | |
|---|---|---|
| JP | A 8-147311 | 6/1996 |
| JP | A 11-161672 | 6/1999 |
| JP | A 2001-211082 | 8/2001 |
| JP | A 2001-229067 | 8/2001 |
| WO | WO 2006/123448 A1 | 11/2006 |
| WO | WO 2008-142799 A1 | 11/2008 |

OTHER PUBLICATIONS

Tomohiko Uematsu, "Introduction of document data compression algorithm," CQ Publishing Co., Ltd., pp. 51-53, Oct. 15, 1994.

Haruhiko Okumura, "Data compression algorithm," C Magazine, vol. 10, No. 10, pp. 52 to 63, Oct. 1, 1998.

Satoru Yamazaki, "LZ77 (sliding dictionary) compression/Huffman coding Algorithm and implementation used in ZIP/LHA," C Magazine, vol. 18, No. 1, pp. 48 to 64, Jan. 1, 2006.

Office Action issued by the United States Patent and Trademark Office for related U.S. Appl. No. 12/623,025, mailed Nov. 29, 2011.

Office Action issued by the United States Patent and Trademark Office for related U.S. Appl. No. 12/623,025, mailed Jul. 12, 2012.

* cited by examiner

FIG.5

| TYPE | | NUMERICAL VALUE/CHARACTER DATA | APPEARANCE FREQUENCY (NUMBER OF TIMES) | NUMBER OF APPEARANCE FILES | APPEARANCE RANK | APPEARANCE MAP 012······ ······n |
|---|---|---|---|---|---|---|
| NUMERICAL VALUE DATA | NUMERAL | 0 ⋮ 9 | 1,238 635 | 230 157 | 102 135 | 1011000110110011011101···0110111001 1000101111000101001···0110111001 |
| | NUMERICAL CONSECUTIVE CHARACTERS | NUMERICAL CONSECUTIVE CHARACTERS 00 ⋮ NUMERICAL CONSECUTIVE CHARACTERS 99 | | | | 1011000110110011001101101··· 1000101111000101001···0110111001 |
| | NUMERICAL CHARACTER GROUP | ONE-PLACE/HEAD NUMERAL 1 ONE-PLACE/HEAD NUMERAL 9 TWO-PLACE/HEAD NUMERAL 1 | | | | 1011000110110011001101101··· |
| | NUMERICAL CHARACTER ABSTRACTED DATA | MILD HIGH BLOOD PRESSURE MODERATE HIGH BLOOD PRESSURE SEVERE HIGH BLOOD PRESSURE MILD ABNORMALITY SEVERE ABNORMALITY | | | | 1000101111000101001···0110111001 1011000110110011001101101··· |
| CHARACTER DATA | ENGLISH CHARACTER | A ⋮ z | 1,238 635 | 230 157 | 102 135 | 1000101111000101001···0110111001 1000101111000101001···0110111001 |
| | KANA | あ ⋮ ん | 14,397 5,392 | 382 436 | 58 72 | 1101111011111011101··· 1101110111111001111··· |
| | KANJI | 亜 ⋮ 連 | 14,397 | 436 | 1,249 | 1011110111101111011··· |
| | NON-STANDARD CHARACTER | NON-STANDARD CHARACTER 1 ⋮ | 5,392 14,397 | 436 382 | 4,531 6,731 | 1011111011111001111··· 1011111011111001111··· |
| | CONSECUTIVE CHARACTERS | CONSECUTIVE CHARACTERS 1 ⋮ CONSECUTIVE CHARACTERS 256 削除プラグ | 5,392 1,238 635 | 436 230 157 | 6,940 1,235 2,045 | 1011000110110010101001···0110111001 1000101111000101001···0110111001 1111111111111111111111···11111111111 |

FIG.12

| NUMERAL/ CHARACTER | APPEARANCE FREQUENCY | COMPRESSION CODE |
|---|---|---|
| 0 | 1/16(0.0625)+0.00012 | [0000] |
| 1 | 〃 +0.00011 | [0001] |
| 2 | 〃 +0.00010 | [0010] |
| 3 | 〃 +0.00009 | [0011] |
| 4 | 〃 +0.00008 | [0100] |
| 5 | 〃 +0.00007 | [0101] |
| 6 | 〃 +0.00006 | [0110] |
| 7 | 〃 +0.00005 | [0111] |
| 8 | 〃 +0.00004 | [1000] |
| 9 | 〃 +0.00003 | [1001] |
| DECIMAL POINT (.) | 〃 +0.00002 | [1010] |
| FEEDER | 〃 +0.00001 | [1011] |
| OTHERS | | [1100] AND SUBSEQUENT CODE |

FIG.13

| NUMERAL/ CHARACTER | APPEARANCE FREQUENCY | COMPRESSION CODE |
|---|---|---|
| 0 | 1/32(0.03125)+0.000012 | [00000] |
| 1 | 〃 +0.000011 | [00001] |
| 2 | 〃 +0.000010 | [00010] |
| 3 | 〃 +0.000009 | [00011] |
| 4 | 〃 +0.000008 | [00100] |
| 5 | 〃 +0.000007 | [00101] |
| 6 | 〃 +0.000006 | [00110] |
| 7 | 〃 +0.000005 | [00111] |
| 8 | 〃 +0.000004 | [01000] |
| 9 | 〃 +0.000003 | [01001] |
| DECIMAL POINT (.) | 〃 +0.000002 | [01010] |
| FEEDER | 〃 +0.000001 | [01011] |
| OTHERS | | [01100] AND SUBSEQUENT CODE |

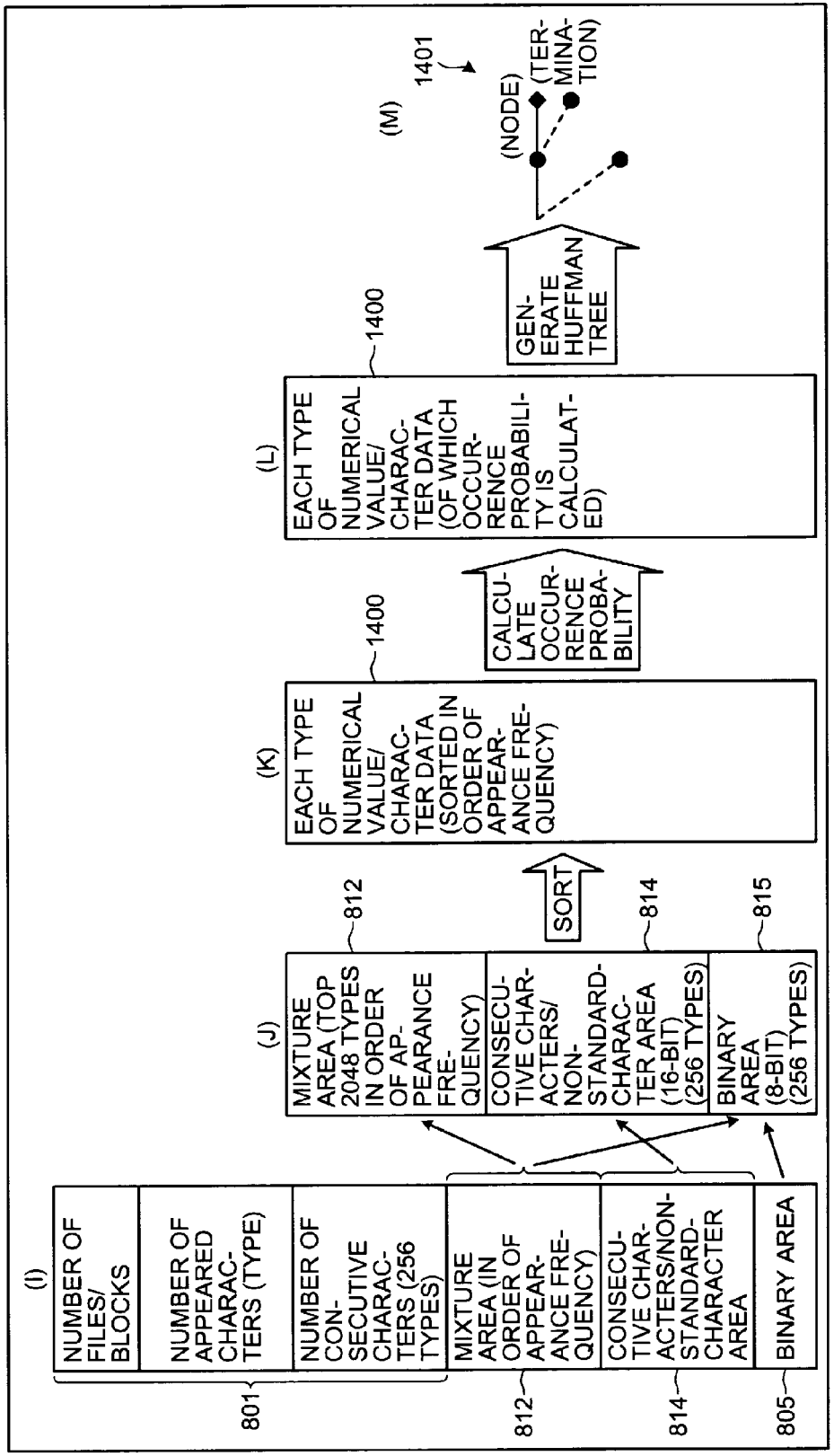

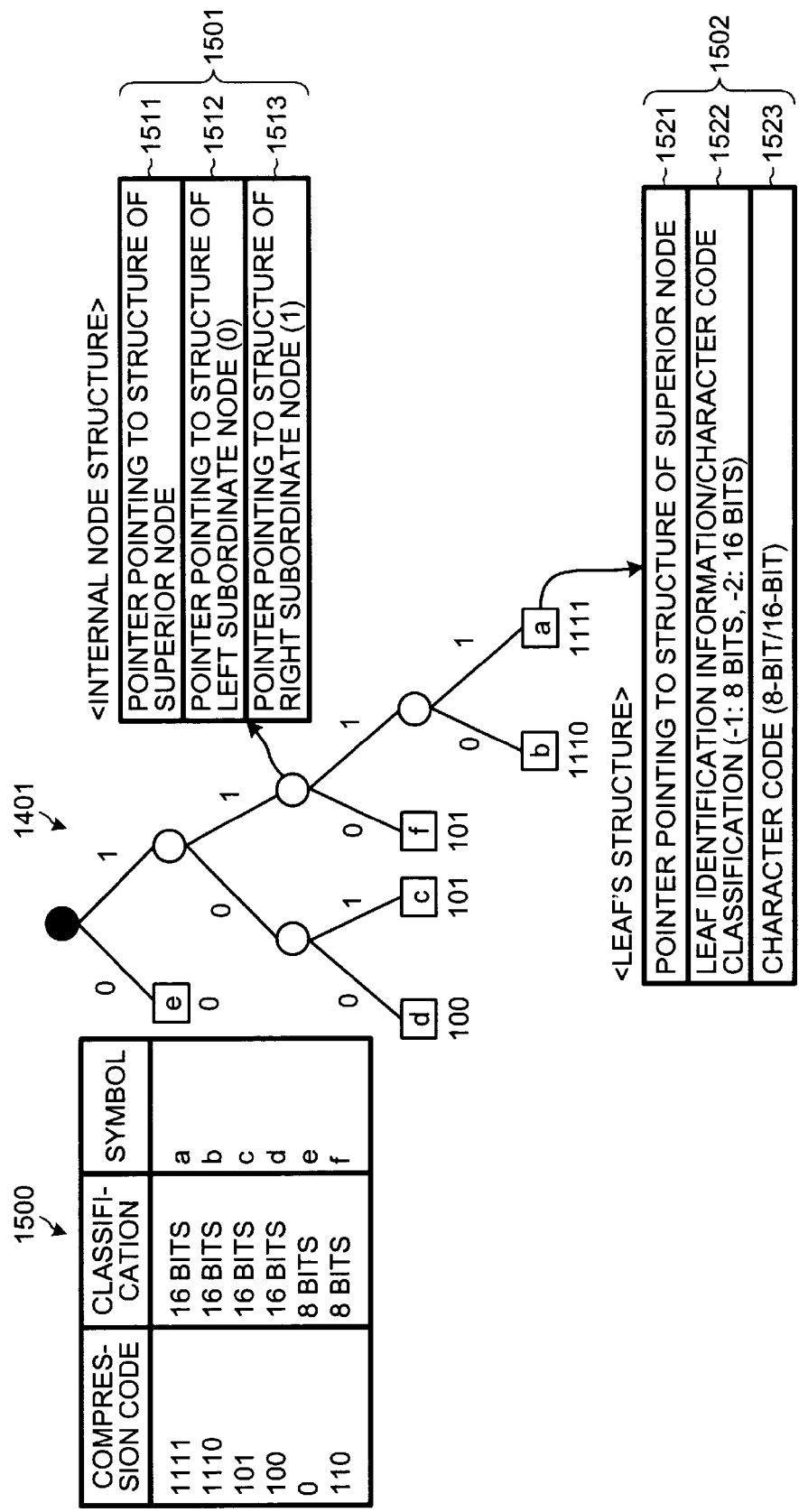

| COMPRESSION CODE | CLASSIFICATION | SYMBOL | DECOMPRESSION FLAG | COMPARISON FLAG | SUBSTITUTION FLAG | ACCESS RIGHT FLAG |
|---|---|---|---|---|---|---|
| 1111 | 16 BITS | a | | | | |
| 1110 | 16 BITS | b | | | | |
| 101 | 16 BITS | c | | | | |
| 100 | 16 BITS | d | | | | |
| ..... | 16 BITS | 高 | | | | |
| ..... | 16 BITS | 糖 | | ON | ON | |
| ..... | 16 BITS | x'B' | | | | |
| ..... | 16 BITS | (FEEDER+) | | | | |
| 0 | 8 BITS | e | | | | |
| 110 | 8 BITS | f | | | | |
| ..... | PATH LIST (HEADER) | <Image···· | | | | |
| ..... | PATH LIST (TRAILER) | ····.gif> | | | | |
| ..... | HTML TAG (START) | <P> | | | | |
| ..... | HTML TAG (END) | </P> | | | | |
| ..... | HTML TAG (INDEPENDENT) | <···> | | | | |
| ..... | XML TAG (START) | <患者(PATIENT)> | ON (DECOMPRESSION START) | | | |
| ..... | XML TAG (END) | </患者(PATIENT)> | OFF (DECOMPRESSION END) | | | ON (PERMISSION) |
| ..... | XML TAG (START) | <副作用(SIDE EFFECT)> | | ON | | |
| ..... | XML TAG (END) | </副作用(SIDE EFFECT)> | | | | |

FIG.20A

<NUMERICAL VALUE MAP>

| HEADING TWO-DIGIT NUMBER | ... | 4 | 3 | 2 | 1 | 0 | -1 | -2 | -3 | -4 | ... |
|---|---|---|---|---|---|---|---|---|---|---|---|
| 10 | ... | 0 | 0 | 0 | 0 | 0 | 0 | 0 | 0 | 0 | ... |
| 11 | ... | 0 | 0 | 0 | 0 | 0 | 0 | 0 | 0 | 0 | ... |
| 12 | ... | 0 | 0 | 0 | 0 | 0 | 0 | 0 | 0 | 0 | ... |
| ... | ... | ... | ... | ... | ... | ... | ... | ... | ... | ... | ... |
| 40 | ... | 0 | 1 | 0 | 0 | 0 | 0 | 0 | 0 | 0 | ... |
| ... | ... | ... | ... | ... | ... | ... | ... | ... | ... | ... | ... |
| 56 | ... | 0 | 0 | 0 | 0 | 0 | 0 | 1 | 0 | 0 | ... |
| ... | ... | ... | ... | ... | ... | ... | ... | ... | ... | ... | ... |
| 97 | ... | 0 | 0 | 0 | 0 | 0 | 0 | 0 | 0 | 0 | ... |
| 98 | ... | 0 | 0 | 0 | 0 | 0 | 0 | 0 | 0 | 0 | ... |
| 99 | ... | 0 | 0 | 0 | 0 | 0 | 0 | 0 | 0 | 0 | ... |

MULTIPLIER OF 10

FIG.22

| COMPRESSED BLOCK DATA | | ORIGINAL UNCOMPRESSED BLOCK DATA | | |
|---|---|---|---|---|
| | OFFSET | LENGTH | OFFSET | NUMBER OF CHARACTERS | LENGTH |
| C1 | 100 | 1780 | 0 | 4000 | 3575 |
| C2 | 1880 | 1695 | 3575 | 4000 | 3275 |
| . | . | . | . | . | . |
| . | . | . | . | . | . |
| . | . | . | . | . | . |
| Cm | 16420 | 160 | 32770 | 352 | 320 |

FIG.30

| RETRIEVAL KEYWORD "増殖細胞" | FILE NUMBER i OF XML FILE fi | | | |
|---|---|---|---|---|
| | 0 | 1 | 2 | 3 |
| FLAG ROW INDICATIVE OF PRESENCE/ABSENCE OF "増" | 1 | 1 | 0 | 0 |
| FLAG ROW INDICATIVE OF PRESENCE/ABSENCE OF "殖" | 0 | 1 | 1 | 1 |
| FLAG ROW INDICATIVE OF PRESENCE/ABSENCE OF "細" | 0 | 1 | 1 | 1 |
| FLAG ROW INDICATIVE OF PRESENCE/ABSENCE OF "胞" | 0 | 1 | 0 | 1 |
| DELETION FLAG | 1 | 1 | 1 | 0 |
| NARROWED DOWN RESULT | 0 | 1 | 0 | 0 |

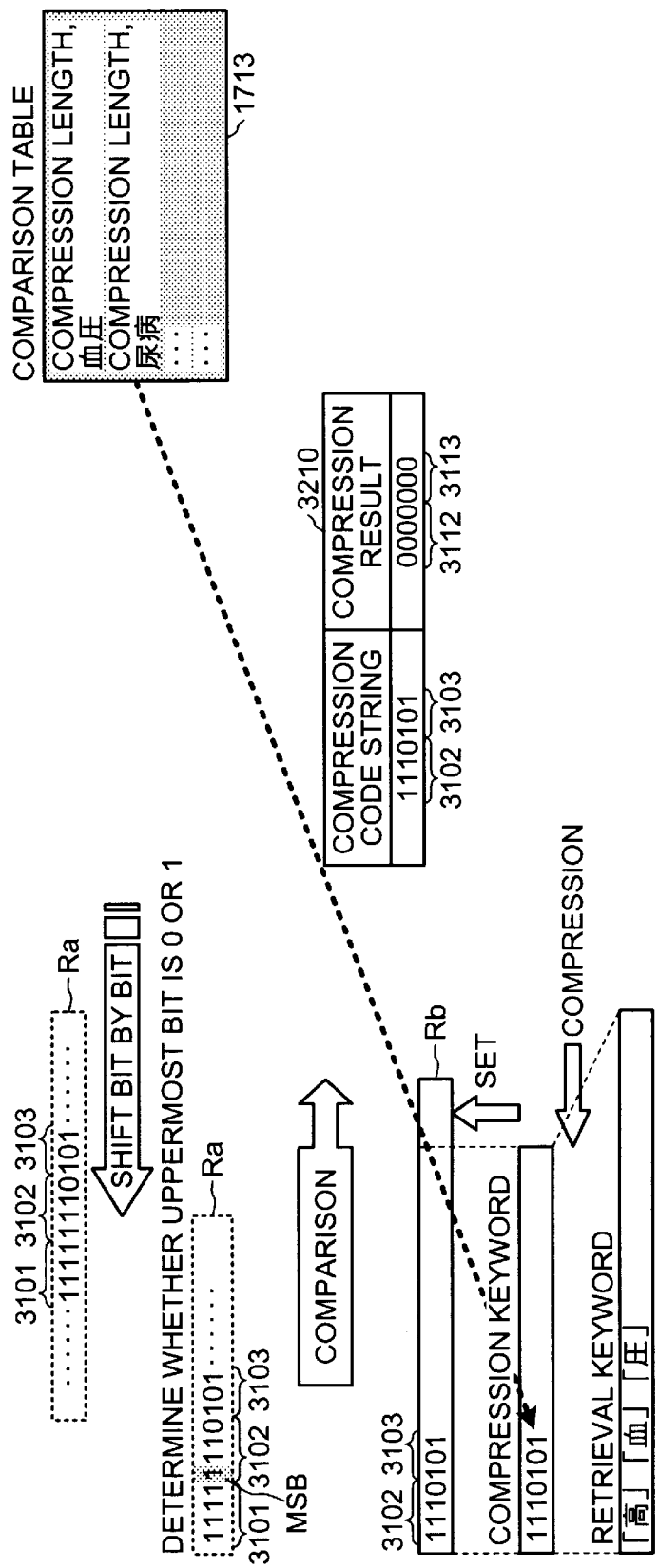

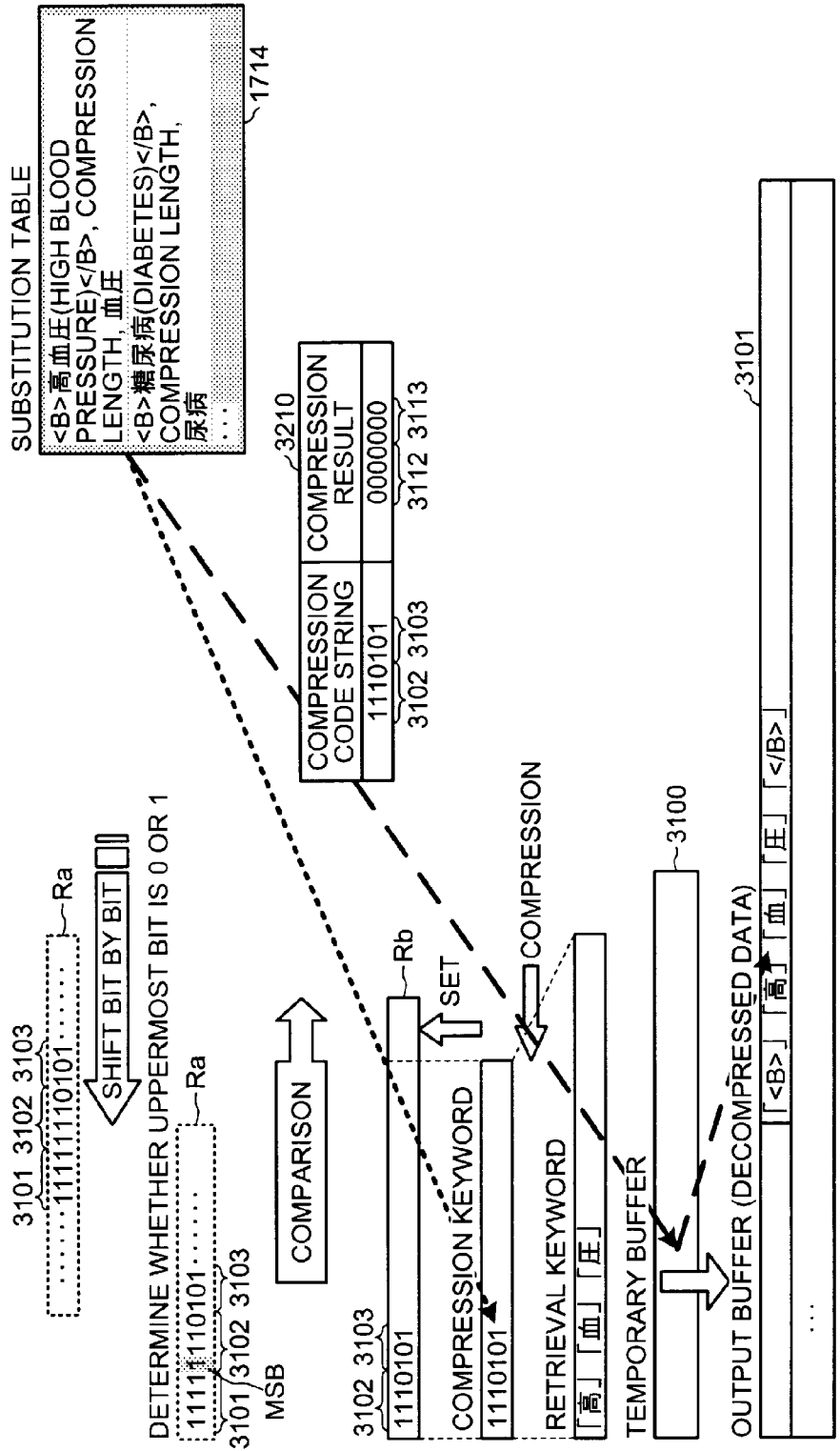

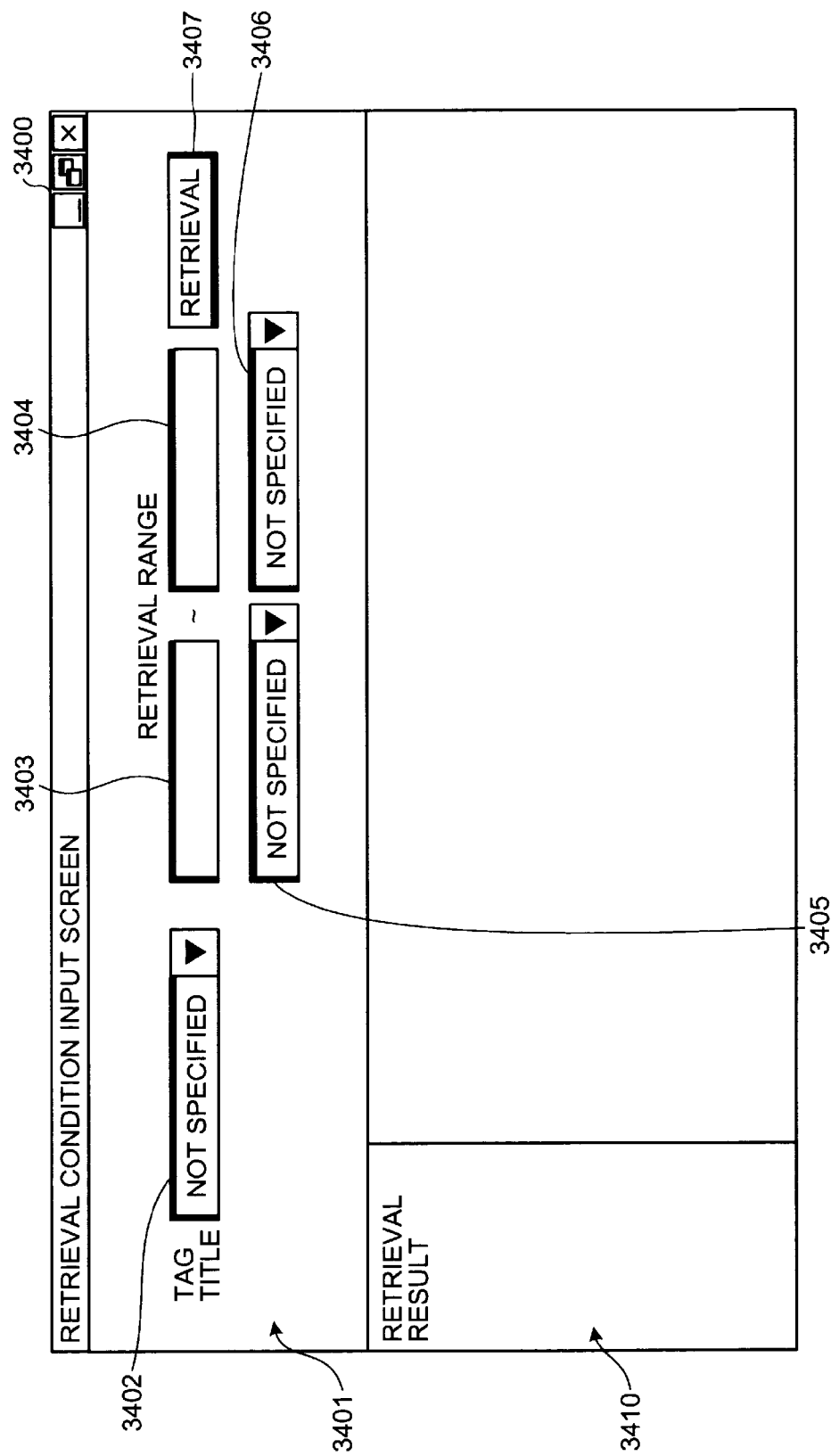

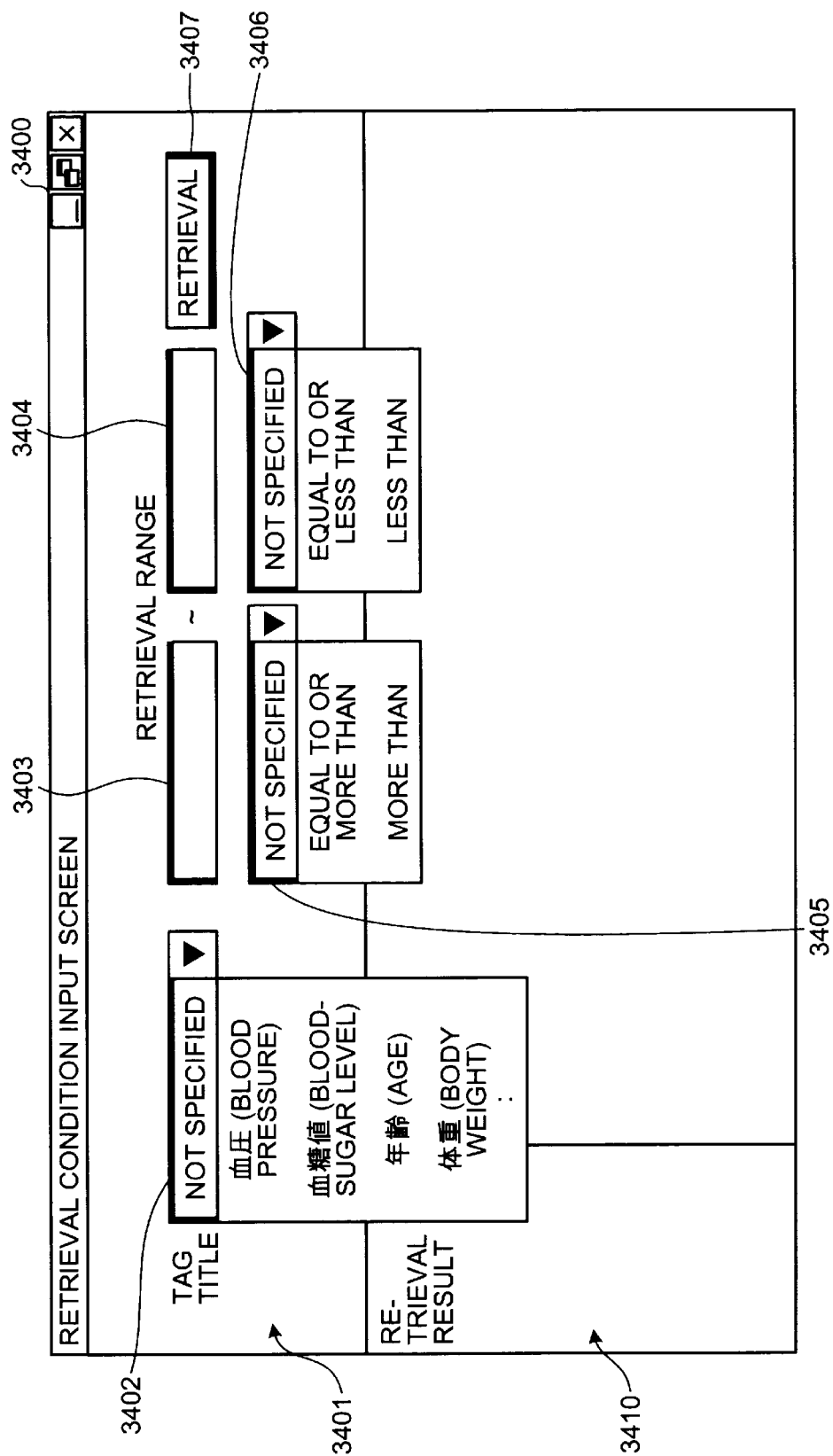

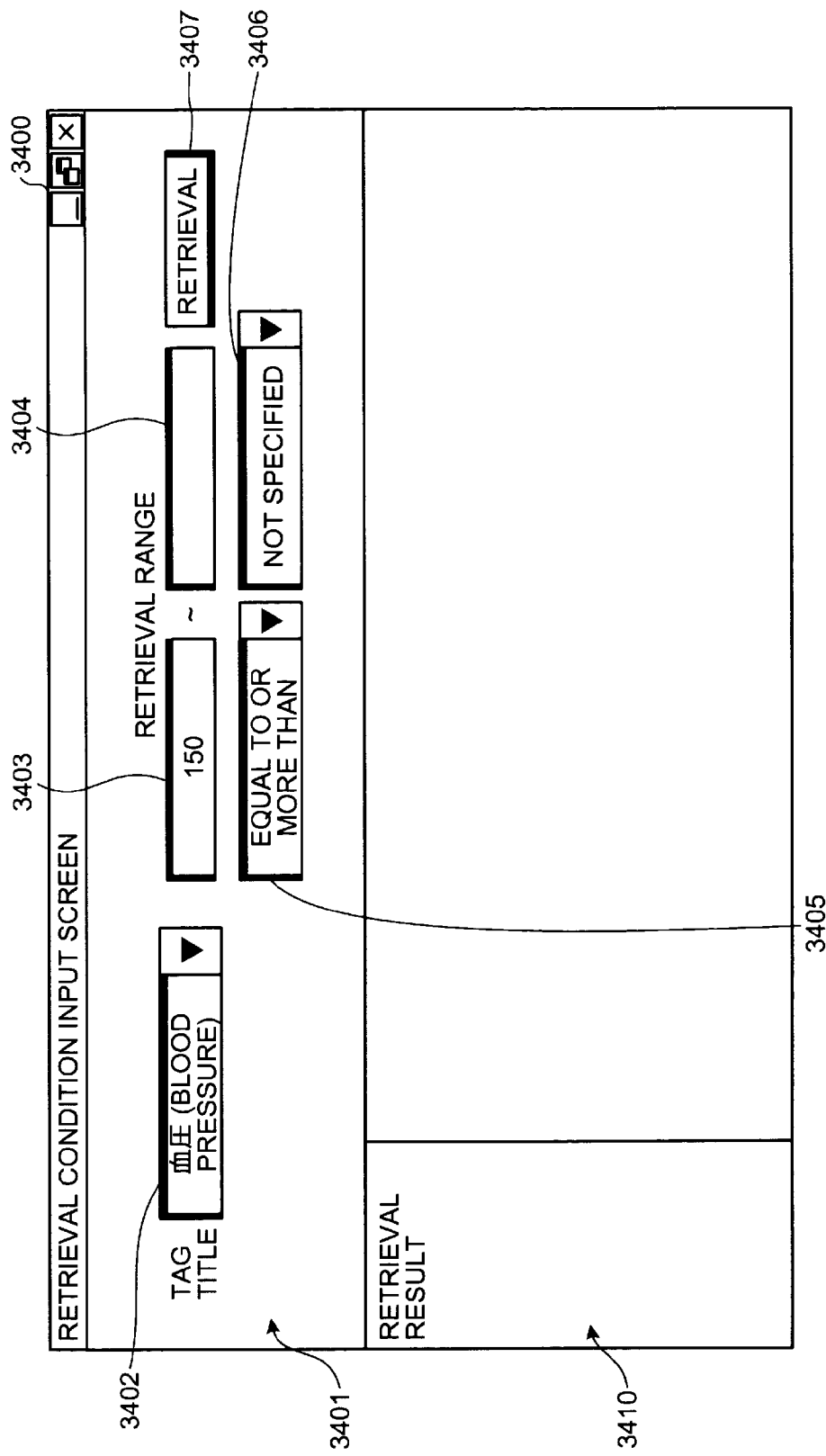

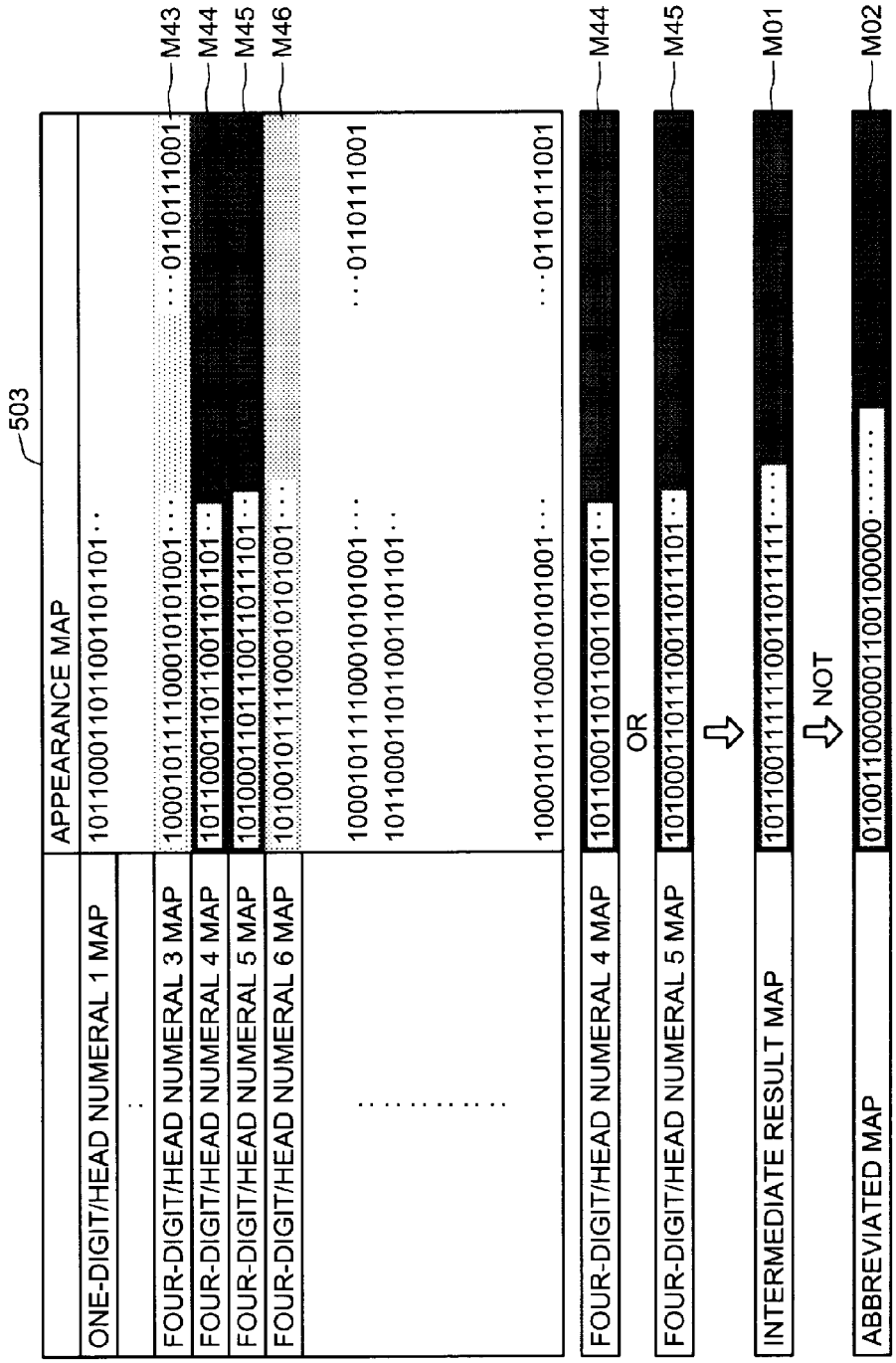

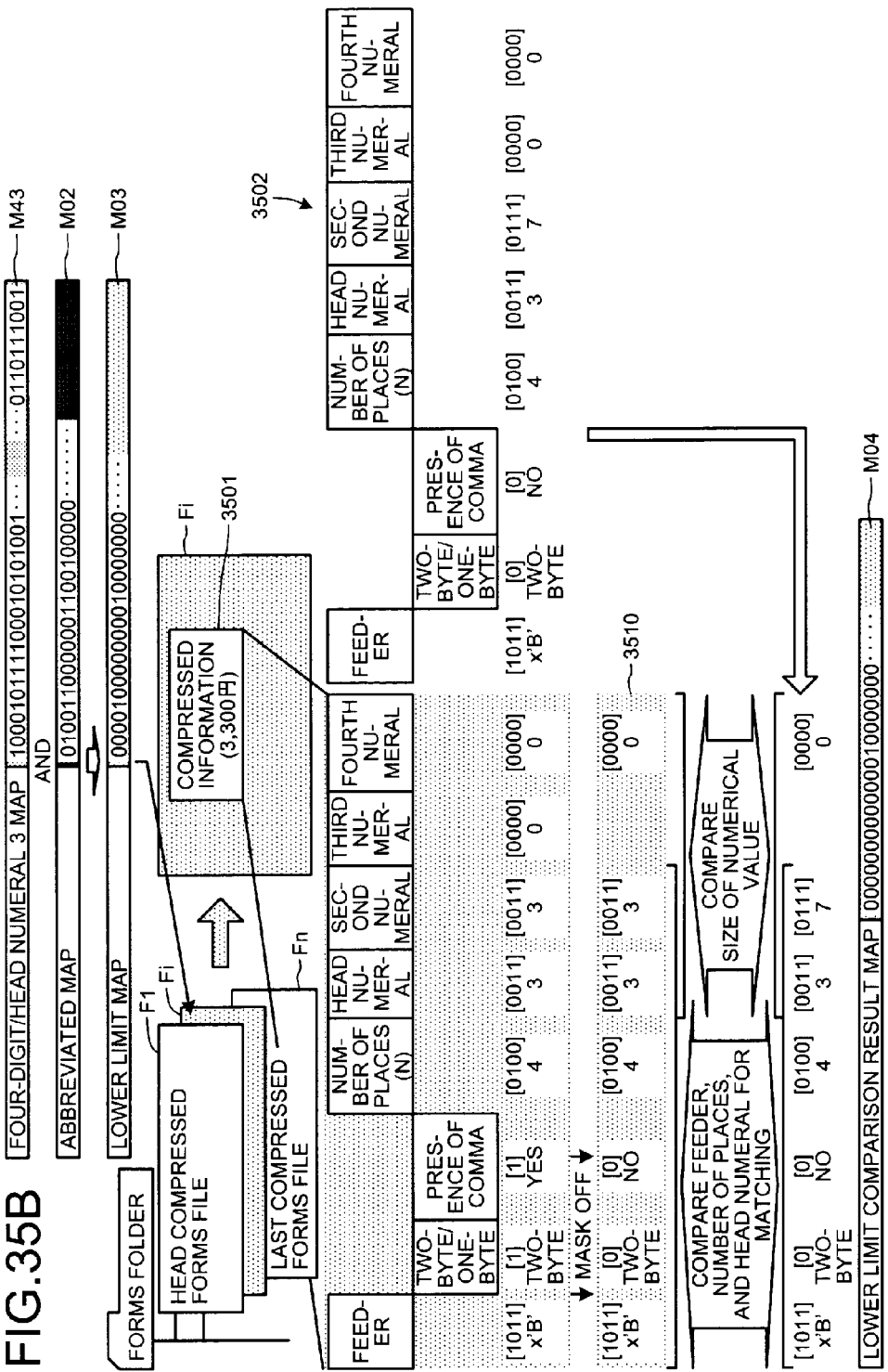

FIG.56

```xml
<?xml version="1.0" encoding="Shift_JIS"?>
<!DOCTYPE adr_case_data (View Source for full doctype...)>
-<adr_case_data>
  <a name="a020040">FJ020040</a>
 -<case_data xml_title="副作用症例(SIDE EFFECT CASE)" tbl_label="副作用症例(SIDE EFFECT CASE)">
   <adr_no xml_title="管理番号(ADMINISTRATIVE NUMBER)" tbl_label="管理番号(ADMINISTRATIVE NUMBER)">FJ020040</adr_no>
  -<patient_information xml_title="患者情報(PATIENT INFORMATION)" tbl_label="患者情報(PATIENT INFORMATION)">
    <received_id xml_title="受領番号(RECEPTION NUMBER)" tbl_label="受領番号(RECEPTION NUMBER)">2</received_id>
    <evaluate_id xml_title="評価番号(EVALUATION NUMBER)" tbl_label="評価番号(EVALUATION NUMBER)">1</evaluate_id>
    <patient_initial xml_title="患者イニシャル(PATIENT INITIALS)" tbl_label="イニシャル(INITIALS)">T.C</patient_initial>
    <patient_name xml_title="患者名(PATIENT NAME)" tbl_label="名前(NAME)"/>
   -<informtion_birth_date xml_title="生年月日情報(DATE OF BIRTH INFORMATION)" tbl_label="生年月日情報(DATE OF BIRTH INFORMATION)">
     <era_format xml_title="生年月日(西暦・元号区分)(DATE OF BIRTH (GROUPED BY A.D./ERA NAME))" tbl_label="年号(ERA NAME)">0</era_format>
     <birth_date_format xml_title="生年月日日区分(DATE OF BIRTH (GROUPED BY DAY))" tbl_label="日付型(DATE FORMAT)"/>
     <patient_birth_date_format xml_title="生年月日(DATE OF BIRTH)" tbl_label="日付型(DATE FORMAT)">102</patient_birth_date_format>
     <patient_birth_date xml_title="生年月日(DATE OF BIRTH)" tbl_label="生年月日(DATE OF BIRTH)">1954/07/27</patient_birth_date>
   -<informtion_age xml_title="年齢情報(AGE INFORMATION)" tbl_label="年齢情報(AGE INFORMATION)">
     <patient_age_group xml_title="患者の年齢グループ(PATIENT AGE GROUP)" tbl_label="年齢(AGE)"/>
     <age_format xml_title="年齢区分(GROUPED BY AGE)" tbl_label="年齢型(AGE FORMAT)">
     <age xml_title="年齢(AGE)" tbl_label="年齢(AGE)">46</age>
     <age_format_report xml_title="年齢区分(当局・市販後)(GROUPED BY AGE)" tbl_label="年齢型(AGE FORMAT)">3</age_format_report>
```

COMPUTER PRODUCT, INFORMATION RETRIEVING APPARATUS, AND INFORMATION RETRIEVAL METHOD

This application is a Continuation of International Application No. PCT/JP2007/060648, filed May 24, 2007.

FIELD

The embodiments discussed herein are related to a computer product, an information retrieving apparatus, and an information retrieval method.

BACKGROUND

Today, clinical test data and such are generated using ORACLE or SQL databases, and are updated daily. Such data, however, lacks openness, which poses a problem of difficulty in transfer and expansion of a data system. Hence, the major trend of data format is now gradually shifting to XML data having superior openness.

International Publication Pamphlet No. WO 2006-123448 discloses an information retrieval program for carrying out compression, encoding, and full-text retrieval of HTML format content.

If data having a complicated structure, such as clinical test data, is converted into XML data, the resulting XML data includes a large amount of tag information and has a file size several times to 20 times as large as the original file size. When such an XML file is to be searched, XML tag character strings are longer than the numerical value or character string to be retrieved, which is an obstacle that deteriorates retrieval performance.

FIG. 56 is an explanatory diagram of XML data related to clinical test data. For example, when the initials "T.C" of a patient name is to be retrieved from XML data representing clinical test data, an XML start tag <patient_initialxml_title= "患者イニシャル" > and an XML end tag </patient_initial> for the initials are searched for. Such search is an obstacle that deteriorates retrieval performance.

Although clinical test data includes character strings that may be identical, each character string has various points of significance such as pharmaceutical efficacy and side effects, which are identified by searching for the above XML tags. Search for an XML tag is, therefore, essential and is an obstacle that deteriorates retrieval performance.

Similarly, although clinical test data may include numerical values that are identical, each numerical value may signify a variety of things, such as body weight, age, and blood-sugar level, which are identified by searching for the above XML tags. Search for an XML tag is, therefore, essential and is an obstacle that deteriorates retrieval performance.

As described, the types of XML tags are many and complicated, thereby increasing the size of each data item. Particularly, when multiple data formats are integrated to combine clinical test data into a single XML file, the number of XML tags increases, making the file enormous in size. This leads to a problem of deterioration in retrieval performance.

Further, as clinical test data is frequently added and deleted, maintenance of the integrated files consumes a huge amount of time. Although information such as clinical test data is used for analysis, the information is also equivalent to personal information, bringing about a need to prevent access to the information by persons other than the analyst.

SUMMARY

According to an aspect of an embodiment, a recording medium stores therein an information retrieval program that causes a computer to execute generating a Huffman tree based on an XML tag written in an XML file and an appearance frequency of character data exclusive of the XML tag; compressing the XML file using the Huffman tree; receiving a retrieval condition that includes a retrieval keyword and type information concerning the retrieval keyword; setting a decompression start flag for a compression code that is for an XML start tag related to the type information, the decompression start flag instructing commencement of decompression of a compression code string subsequent to the XML start tag; detecting, in the compressed XML file, the compression code for which the decompression start flag has been set; and decompressing, when the compression code for which the decompression start flag has been set is detected, the compression code string, using the Huffman tree.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram of appearance frequency management data;

FIGS. 12 and 13 are diagrams of an example of revision of appearance frequency of a numeral, etc.;

FIG. 14 is a diagram of a Huffman tree generating process by a compressing/encoding unit;

FIG. 15 a schematic of a Huffman tree;

FIG. 16 is an explanatory diagram of an example of expansion of a compression code table depicted in FIG. 15;

FIG. 20A is an explanatory diagram of a numerical value map;

FIG. 22 is a table of a comparison between compressed block data C1 to Cm and original block data before compression;

FIG. 30 is a diagram of an example of narrowing down compressed XML files to a compressed XML file Fi;

FIG. 32A is an explanatory diagram of a binary comparison process by a binary comparing unit;

FIG. 32B is an explanatory diagram of a character string substitution process by a character string substituting unit;

FIGS. 34A to 34C depict a screen for inputting a numerical value as a retrieval keyword;

FIGS. 35A to 35D are explanatory diagrams of examples of size comparison in a numerical value range;

FIG. 56 is an explanatory diagram of XML data related to clinical test data.

DESCRIPTION OF EMBODIMENTS

Preferred embodiments of the present invention will be explained with reference to the accompanying drawings.

Figure 1:
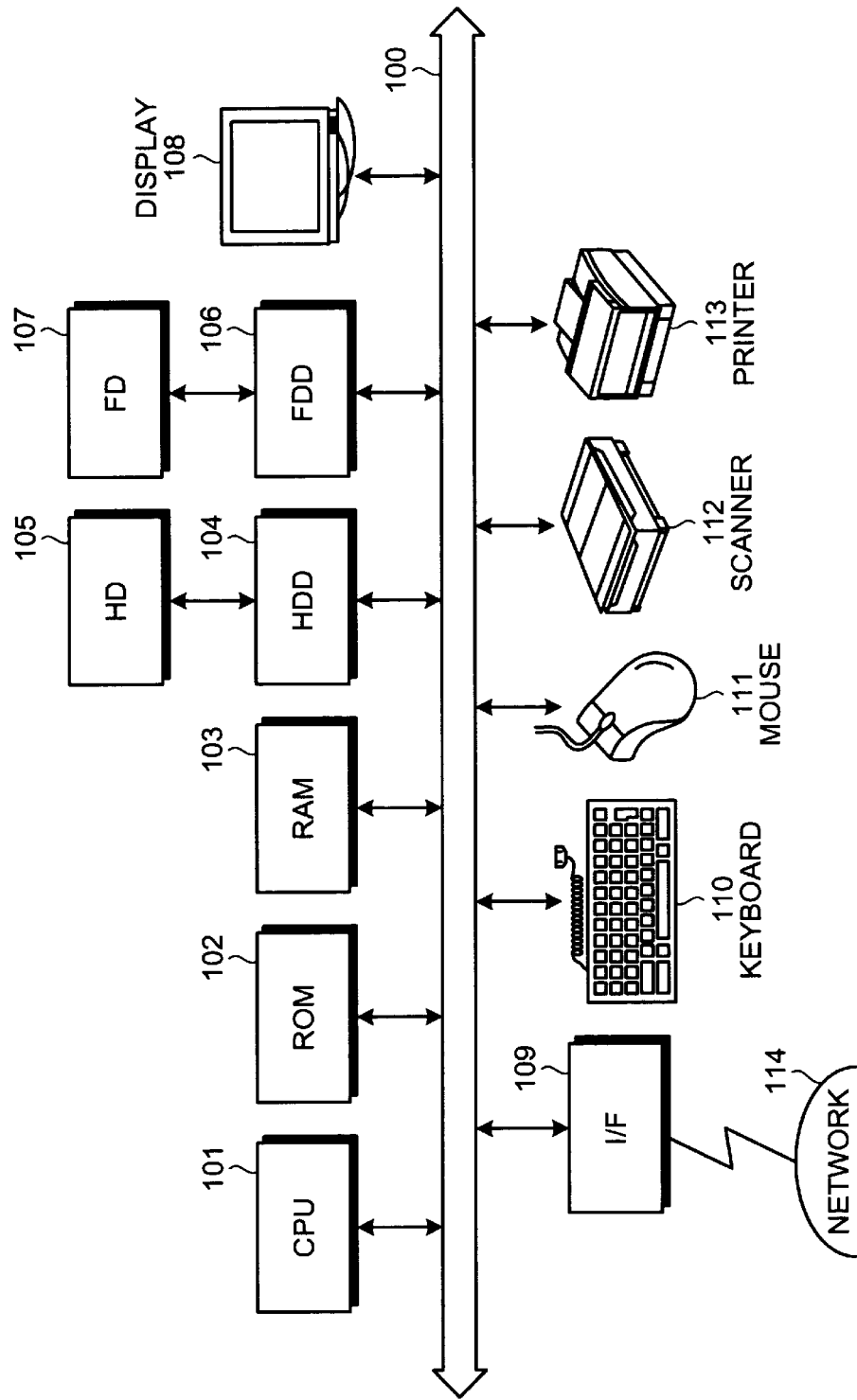
FIG. 1 is a block diagram of an information retrieving apparatus according to an embodiment.

FIG. 1 is a block diagram of an information retrieving apparatus according to an embodiment.

As depicted in FIG. 1, the information retrieving apparatus includes a central processing unit (CPU) 101, a read-only memory (ROM) 102, a random access memory (RAM) 103, a hard disk drive (HDD) 104, a hard disk (HD) 105, a flexible disk drive (FDD) 106, a flexible disk (FD) 107 as one example of a removable recording medium, a display 108, an interface (I/F) 109, a keyboard 110, a mouse 111, a scanner 112, and a printer 113, connected to one another by way of a bus 100.

The CPU 101 governs overall control of the information retrieving apparatus. The ROM 102 stores therein programs such as a boot program. The RAM 103 is used as a work area of the CPU 101. The HDD 104, under the control of the CPU 101, controls the reading and writing of data with respect to the HD 105. The HD 105 stores therein the data written under control of the HDD 104.

The FDD 106, under the control of the CPU 101, controls the reading and writing of data with respect to the FD 107. The FD 107 stores therein the data written under control of the FDD 106, the data being read by the information retrieving apparatus.

In addition to the FD 107, a compact disc-read-only memory (CD-ROM) (compact disc-recordable (CD-R), compact disc-rewritable (CD-RW)), magneto optical disk (MO), digital versatile disk (DVD), a memory card, etc. may be adopted as a removable computer-readable recording medium. The display 108 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 108.

The I/F 109 is connected to a network 114 such as the Internet through a communication line and is connected to other apparatuses through the network 114. The I/F 109 administers an internal interface with the network 114 and controls the input/output of data from/to external apparatuses. For example, a modem or a LAN adaptor may be employed as the I/F 109.

The keyboard 110 includes, for example, keys for inputting letters, numerals, and various instructions and performs the input of data. Alternatively, a touch panel-type input pad or numeric keypad, etc. may be adopted. The mouse 111 performs the movement of the cursor, selection of a region, or movement and size change of windows. A track ball or a joy stick may be adopted provided each respectively has a function similar to a pointing device.

The scanner 112 optically reads an image and takes in the image data into the information retrieving apparatus. The scanner 112 may have an optical character recognition (OCR)

function as well. The printer 113 prints image data and text data. The printer 113 may be, for example, a laser printer or an ink jet printer.

Figure 2:
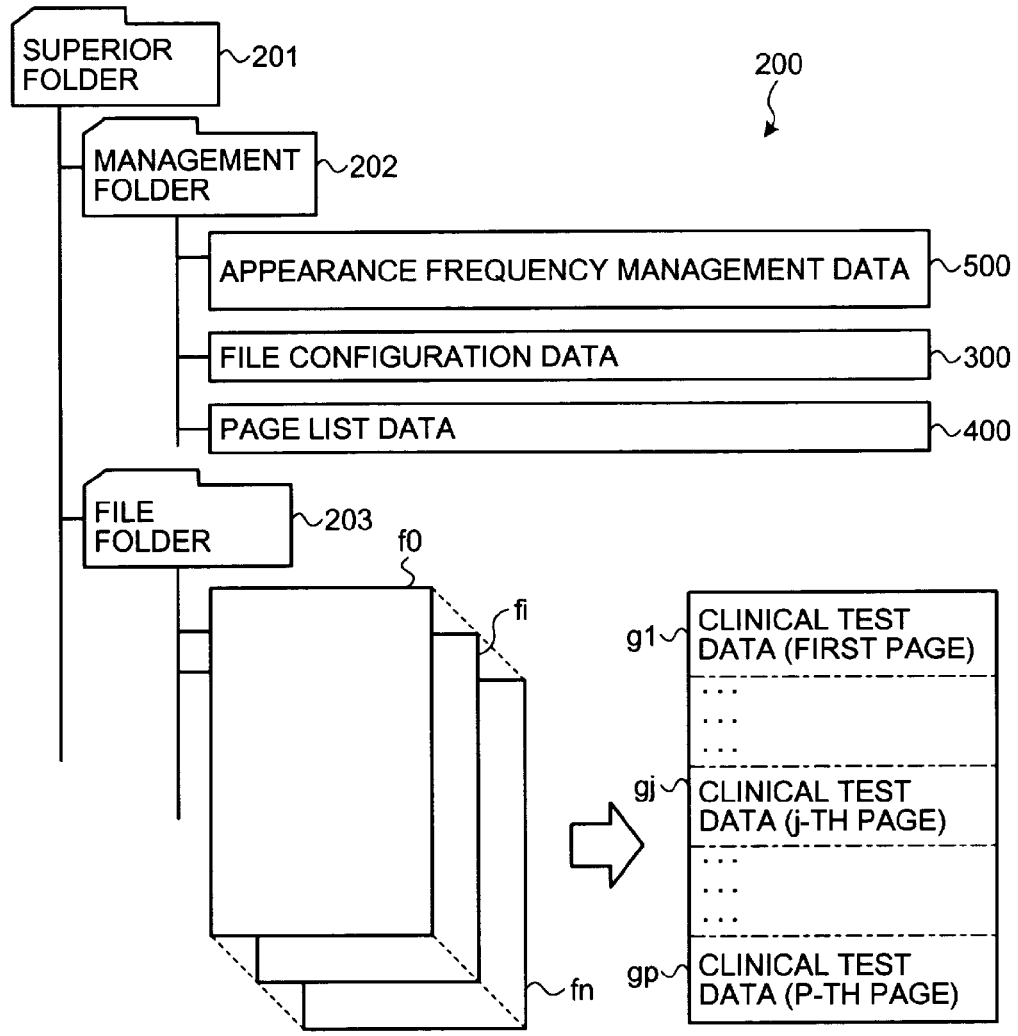
FIG. 2 is an explanatory diagram of a data configuration of content.

FIG. 2 is an explanatory diagram of a data configuration of content. In FIG. 2, the content is a database for XML files of clinical test data and electronic forms (the forms, including books and slips, being electronic data). In the present embodiment, for example, the content is XML files of clinical test data. The content 200 is saved in a superior folder 201, which includes subordinate folders inclusive of a management folder 202 and a file folder 203.

The management folder 202 stores therein file configuration data 300 (see FIG. 3), page list data 400 (see FIG. 4), and appearance frequency management data 500 (see FIG. 5). The file folder 203 stores therein a forms file group f including XML files fi (i=0 to n).

Each XML file fi includes clinical test data items gj (j=1 to P), where the XML files f0 to fn collectively have P pages of clinical test data items in total. Each clinical test data item gj has a header including an anchor and a heading, various types of clinical test data including patient information, side effects, pharmaceutical efficacy, etc., and a trailer. The clinical test data item gj, for example, includes the data depicted in FIG. 2.

Figure 3:
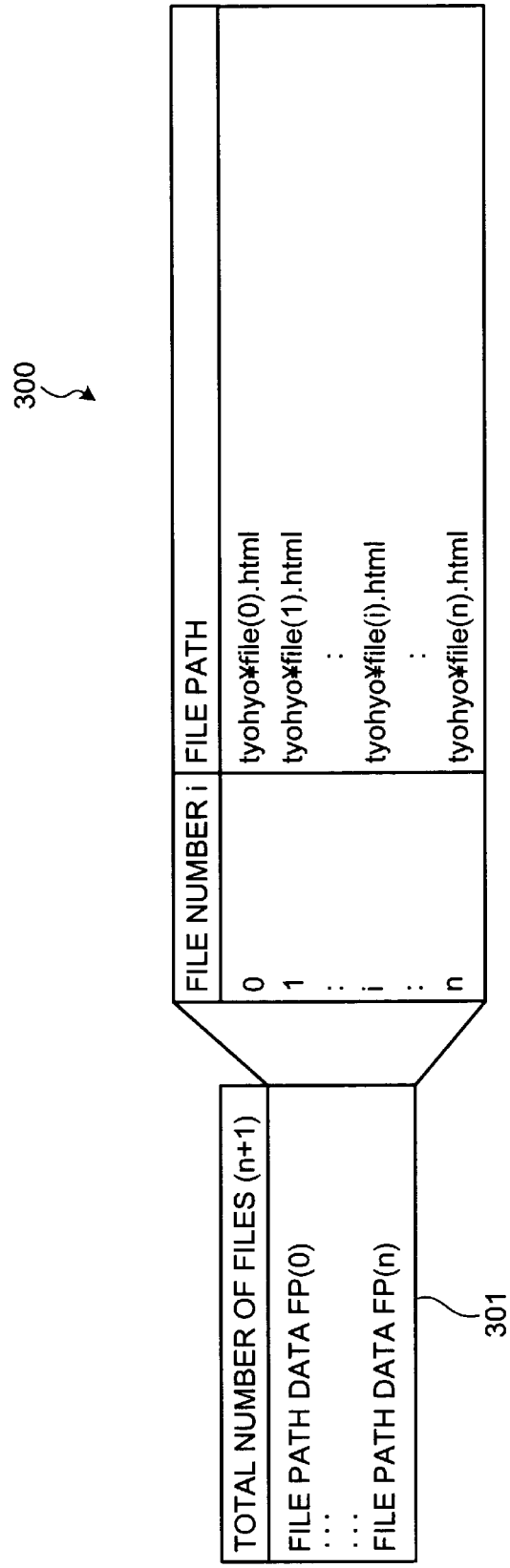
FIG. 3 is a diagram of a file configuration data depicted in FIG. 2.

FIG. 3 is a diagram of the file configuration data 300 depicted in FIG. 2. The file configuration data 300 is data correlating a file path for each of the XML files f0 to fn for each file number i (i=0 to n). As depicted in FIG. 3, an XML file fi having a file number i is expressed as "file(i).xml".

Figure 4:
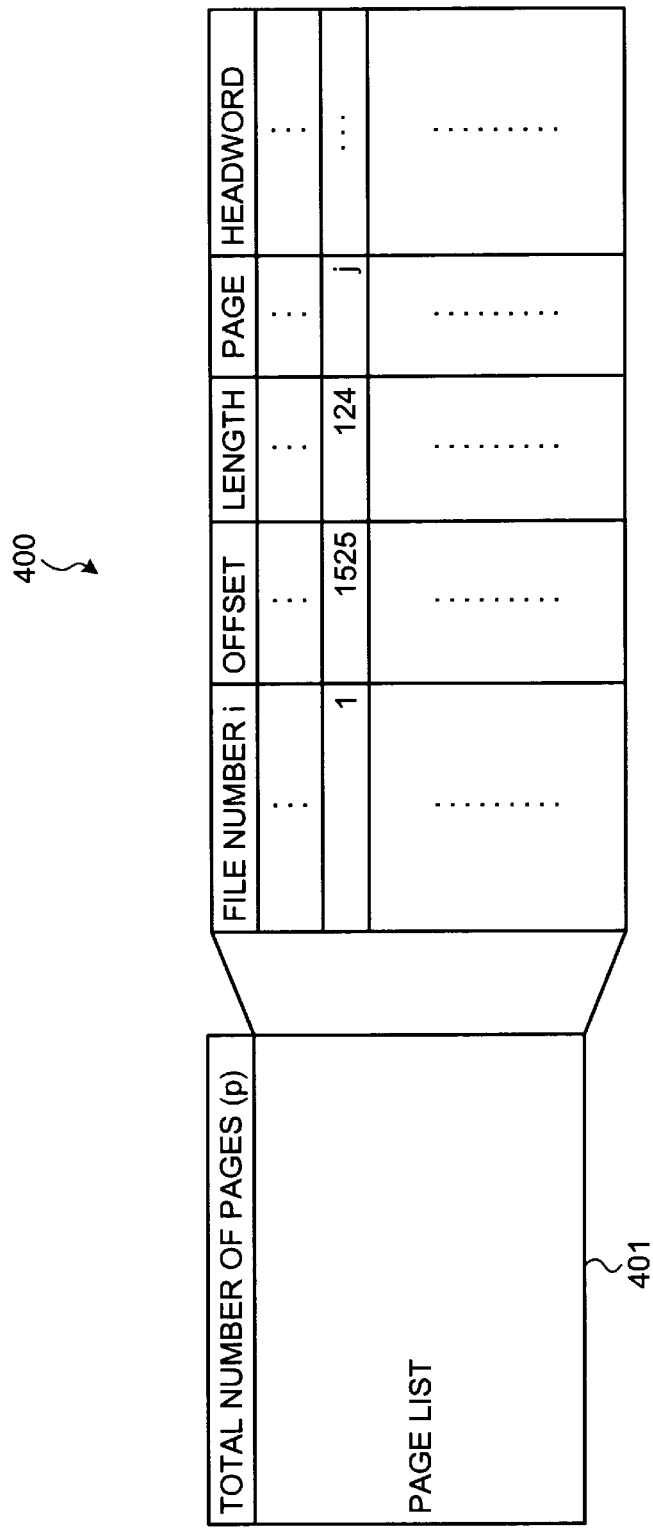
FIG. 4 is a diagram of page list data depicted in FIG. 2.

FIG. 4 is a diagram of the page list data 400 depicted in FIG. 2. The page list data 400 is data correlating the XML files fi, the clinical data items gj, and the file configuration data 300 depicted in FIG. 2. The page list data 400 includes the total number of XML files fi (n+1), a block size (m byte), the total number of clinical data items gj (P), file path data FP(0) to FP(n) for the XML files fi, and a page list.

The page list data 400 further includes a file number i, the number of blocks, and a file path as depicted in FIG. 3 for each file path data FP(i). The page list 401 is a list in which offset, length, a page number j, and a headword are described for each file number i.

FIG. 5 is a diagram of the appearance frequency management data 500. As depicted in FIG. 5, the appearance frequency management data 500 is data for management of the appearance frequency of numerical value/character data. Numerical value/character data is classified into numerical value data and character data. Numerical value data is data including numerals of 0 to 9, consecutive numerals consisting of two or more numerals, such as 00 to 99, numerical value groups each consisting of numerical values having an identical number of places (digits) and an identical head numeral, and abstracted numerical value data of which numerical values give abstractive expressions, such as slightly high blood pressure.

A numerical value group is a group of numerical values within a numerical value range defined by the number of places and a head numeral. For example, a numerical value group defined by the number of places of three and a headword of 2 is a group of numerical values within a numerical value range of 200 to 299.

Character data is data including English characters, kana, kanji, and consecutive characters. Specifically, character data include English characters, katakana, and symbols based on an 8-bit character-encoding scheme (ASCII); English characters, katakana, and symbols based on a 16-bit character-encoding scheme (JIS); and kana and kanji based on the 16-bit character-encoding scheme (JIS). In the present specification, these character data of phonogram and kanji centering around 8-bit code data, such as English characters, kana, and katakana, are referred to as "standard character data".

Character data also includes non-standard characters and consecutive characters, in addition to the standard character data. Consecutive characters represent character data of a string of two or more characters. For example, when two kanas, each notated by a 16-bit code, make up consecutive characters, the consecutive characters represent character data notated by a 32-bit code. Binary data of an address pointer, etc., is also included in the above "character data" for convenience, although such binary data is non-character data. Hereinafter, binary data is included in "character data" in terminology unless a specific notation is made.

A characteristic of the present embodiment is that an XML tag is classified into consecutive characters, thereby enabling XML tags as long character strings, such as <patient_initialxml_title="患者イニシャル" tbl_label="イニシャル">, to be totaled according to tag.

The appearance frequency management data 500 includes the appearance frequency, the number of appearance files (or number of blocks), an appearance rank, and appearance maps 510 (501 to 509) of numerical value/character data. The appearance frequency is the frequency (number of times) at which numerical value/character data appears in the XML files f0 to fn collectively. The number of appearance files is the number of XML files in which numerical value/character data appears, among all the XML files f0 to fn. An appearance rank is a position in a ranking of appearance frequencies.

The appearance maps 510 are strings of bits, each string having n+1 bits arranged in the order of the XML files fi, and each bit indicating the presence/absence of numerical value/character data. In FIG. 5, the bit at the left end corresponds to the XML file f0 while the bit at the right end corresponds to the XML file fn.

For each bit, "1" indicates ON while "0" indicates OFF. Specifically, when a bit corresponding to an XML file fi is "1" on the appearance maps 510 for a given numerical value/character data, it means that the numerical value/character data is present in the XML file fi. When the bit corresponding to the XML file fi is "0", it means that the numerical value/character data is not present in the XML file fi.

A further characteristic of the present embodiment is that a deletion tag is set for the XML files F0 to Fn. The deletion tag is set to "1" in a default condition, and becomes "0" when an XML file fi having a deletion tag is deleted. As a result, an XML file fi having the deletion tag of "0" is excluded from files to be searched, thereby increasing retrieval speed.

Figure 6:
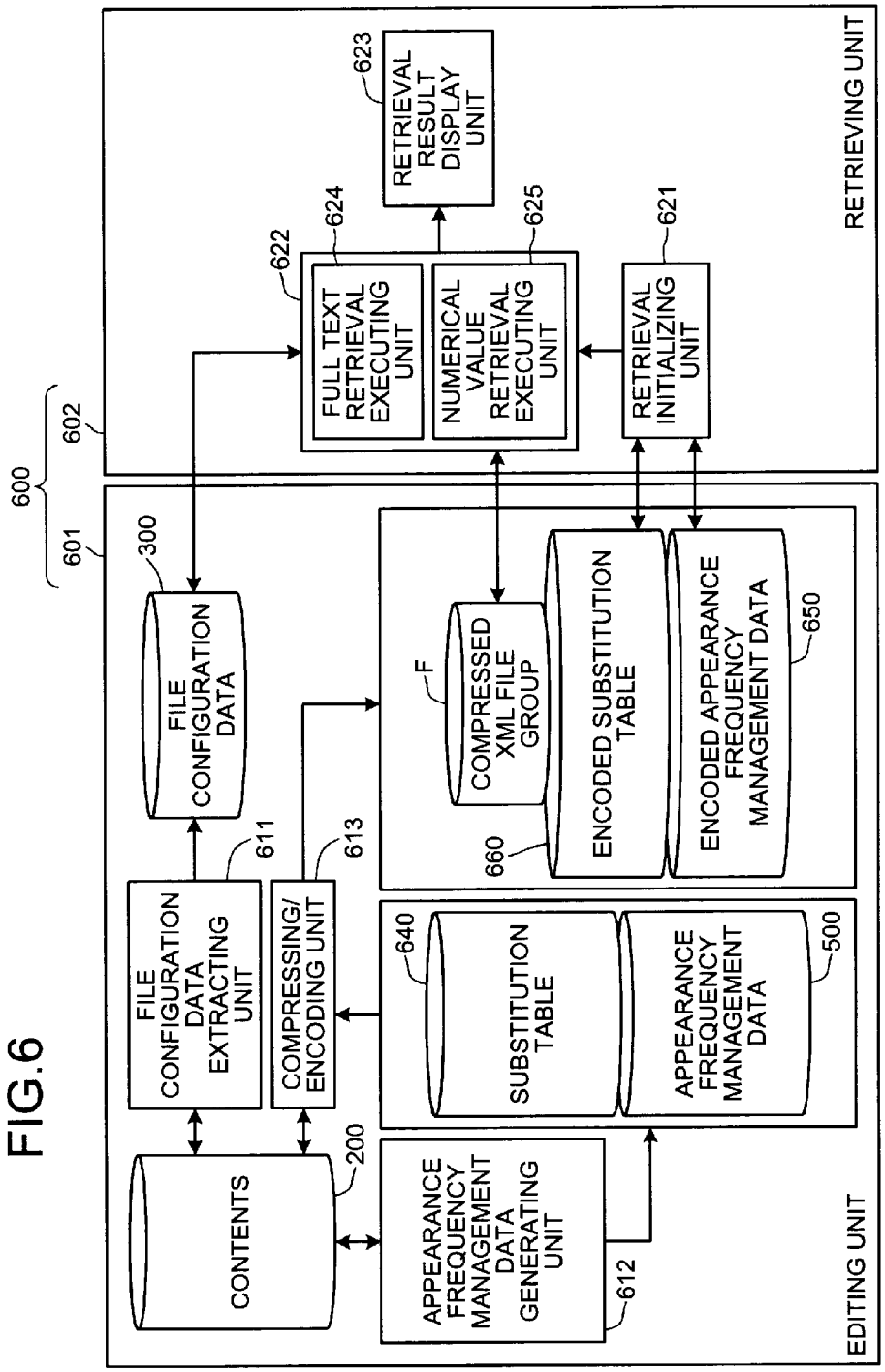
FIG. 6 is a functional diagram of the information retrieving apparatus according to an embodiment.

FIG. 6 is a functional diagram of an information retrieving apparatus according to an embodiment. As depicted in FIG. 6, an information retrieving apparatus 600 includes an editing unit 601, and a retrieving unit 602.

The editing unit 601 includes a file configuration data extracting unit 611, an appearance frequency management data generating unit 612, and a compressing/encoding unit 613.

The file configuration data extracting unit 611 refers to the file configuration data depicted in FIG. 3 and extracts the page list data 400 depicted in FIG. 4 from the XML files f0 to fn. The appearance frequency management data generating unit 612 generates the appearance frequency management data 500 from the XML files f0 to fn.

The appearance frequency management data generating unit 612 further generates a substitution table 640 for substituting consecutive numerals or consecutive characters written in multiple XML files f0 to fn with a non-standard character.

Hereinafter, consecutive numerals and consecutive characters are collectively referred to as "consecutive character data".

The compressing/encoding unit 613 compresses the XML files f0 to fn to generate a compressed XML file group F, and encodes the appearance frequency management data 500 and the substitution table 640 to generate encoded appearance frequency management data 650 and an encoded substitution table 660.

The retrieving unit 602 includes a retrieval initializing unit 621, a retrieval executing unit 622, and a retrieval result display unit 623. The retrieval initializing unit 621 decodes the encoded appearance frequency management data 650 and the encoded substitution table 660 to initialize the retrieval performed by the retrieving unit 602.

The retrieval executing unit 622 executes retrieval processing using the appearance frequency management data 500 and the substitution table 640 to generate a retrieval candidate list. Specifically, the retrieval executing unit 622 includes a full text retrieval executing unit 624 that executes full text retrieval and a numerical value retrieval executing unit 625 that executes numerical value retrieval.

The full text retrieval executing unit 624 receives input of a retrieval keyword and executes full text retrieval with respect to compressed XML files to generate a retrieval candidate list displaying the XML files fi corresponding to the retrieval keyword.

The numerical value retrieval executing unit 625 receives input of a numerical value or a numerical value range and executes numerical value retrieval with respect to the compressed XML file group F to generate a retrieval candidate list displaying the XML files fi corresponding to the input numerical value or numerical value range.

The retrieval result display unit 623 decompresses a retrieval candidate selected by a user from among the retrieval candidates given by the retrieval executing unit 622, and displays the decompressed retrieval candidate as a retrieval result. Respective functions of the XML files, the appearance frequency management data 500, the file configuration data 300, the page list data 400, the substitution table 640, the compressed XML file group F, the encoded appearance frequency management data 650, and the encoded substitution table 660 as described are implemented, for example, through recording media, such as the ROM 102, RAM 103, and HD 105 depicted in FIG. 1.

Respective functions of the editing unit 601 (including internal functional components) and the retrieving unit 602 (including internal functional components) are implemented, for example, when the CPU 101 executes a program recorded on a computer-readable recording medium, such as the ROM 102, RAM 103, and HD 105 depicted in FIG. 1.

Figure 7:
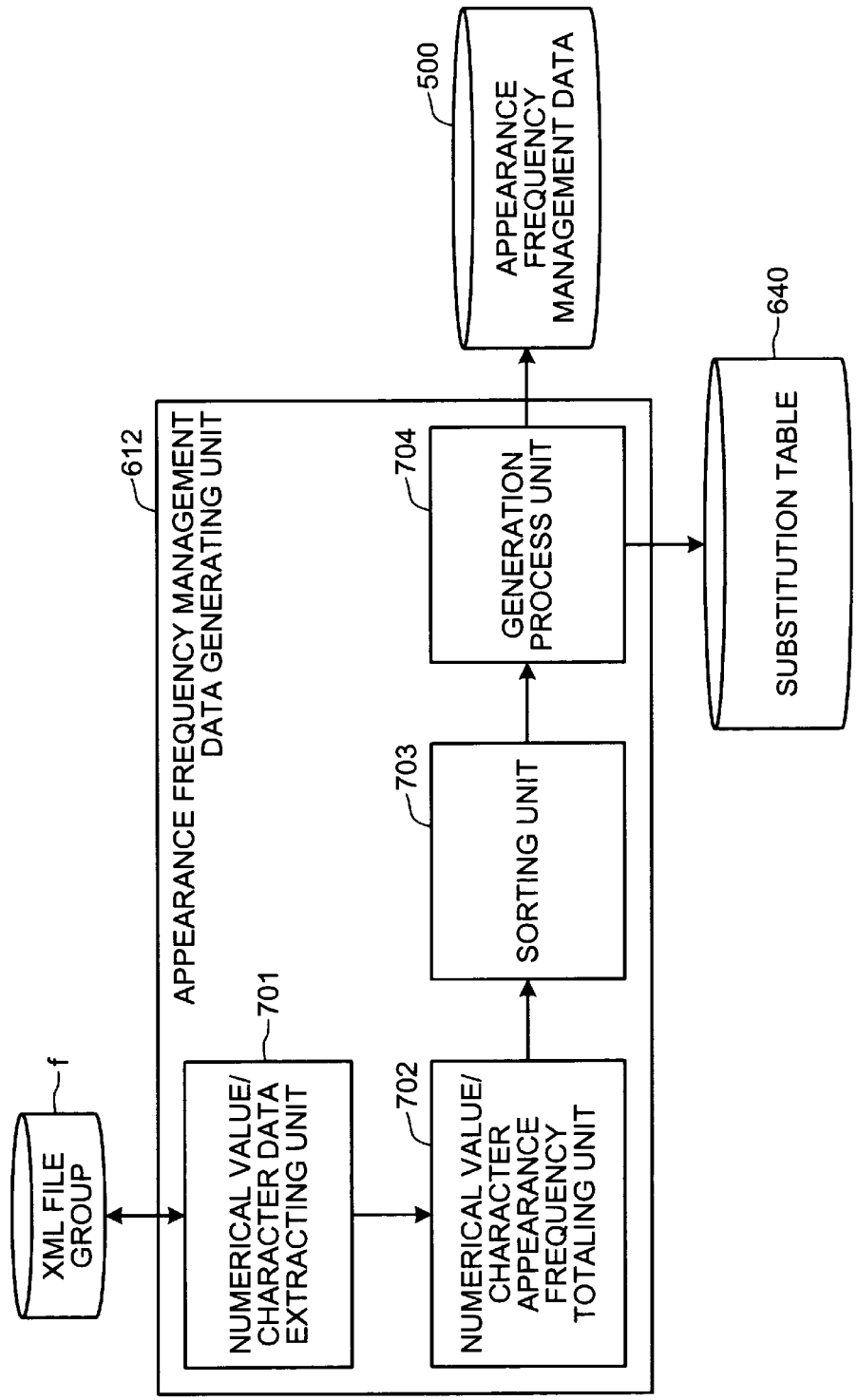
FIG. 7 is a functional diagram of an appearance frequency management data generating unit depicted in FIG. 6.

FIG. 7 is a functional diagram of the appearance frequency management data generating unit 612 depicted in FIG. 6. As depicted in FIG. 7, the appearance frequency management data generating unit 612 includes a numerical value/character data extracting unit 701, a numerical value/character appearance frequency totaling unit 702, a sorting unit 703, and a generation process unit 704.

The numerical value/character data extracting unit 701 extracts numerical/character data sequentially from XML files. The numerical value/character appearance frequency totaling unit 702 totals the respective frequencies at which the numerical/character data extracted by the numerical value/character data extracting unit 701 appears in the XML files fi, and detects the presence/absence of the numerical/character data in each of the XML files f0 to fn.

The sorting unit 703 sorts the numerical value/character data according to appearance frequency. The generating process unit 704 generates the appearance frequency management data 500, using the appearance frequencies of the sorted numerical/character data and the appearance maps 501 to 509 indicative of the result of presence/absence detection for each of numerical/character data. The generating process unit 704 also generates the substitution table 640. A process of generating the appearance frequency management data 500 and the substitution table 640 by the appearance frequency management data generating unit 612 will be described in detail.

Figure 8:
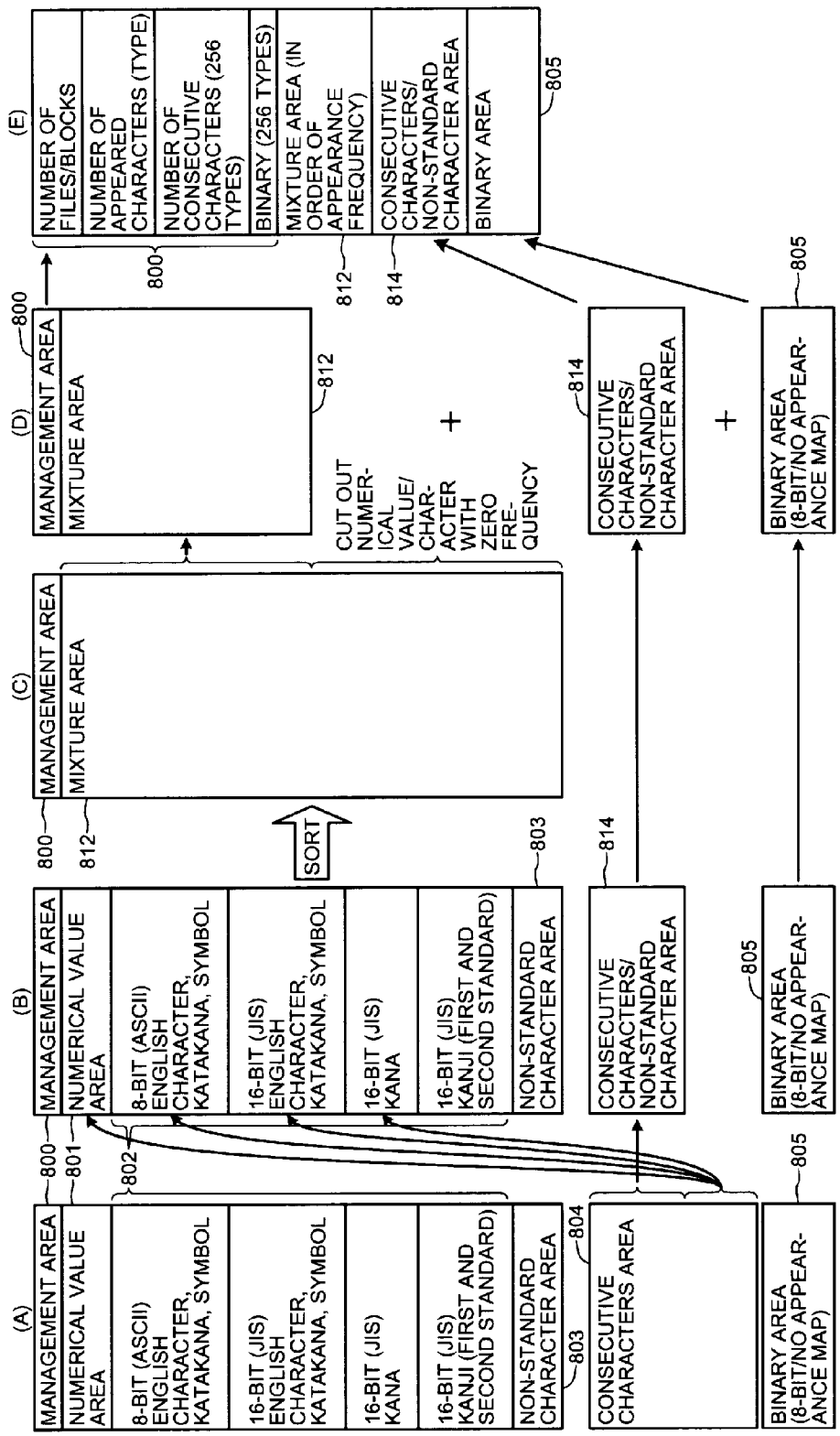
FIG. 8 is a schematic of a process of generating appearance frequency management data.

FIG. 8 is a schematic of a process of generating the appearance frequency management data 500. Section A in FIG. 8 depicts a data configuration of the appearance frequency management data 500 that results when the numerical value/character appearance frequency totaling unit 702 totals numerical value/character data. Section B in FIG. 8 depicts a data configuration of the appearance frequency management data 500 that results after consecutive characters/non-standard character substitution processing. Section C in FIG. 8 depicts a data configuration of the appearance frequency management data 500 that results after mixed data including standard character data and non-standard character data are sorted. Section D in FIG. 8 depicts a data configuration of the appearance frequency management data 500 that results after mixed data with a low appearance frequency is cut out. Section E in FIG. 8 depicts a data configuration of the appearance frequency management data 500 generated ultimately.

In section A of FIG. 8, reference numeral 800 denotes a management area of the appearance frequency management data 500. Reference numeral 801 denotes a numerical value area in which the appearance frequency, the number of appearance files, the appearance rank, and an appearance map of numerical data (not including consecutive numerals) are stored. Reference numeral 802 denotes a standard character area in which the appearance frequency, the number of appearance files, the appearance rank, and an appearance map of standard character data are stored, the standard character data including English characters, katakana, and symbols based on an 8-bit character-encoding scheme (ASCII), English characters, katakana, and symbols based on a 16-bit character-encoding scheme (JIS), and kana and kanji based on the 16-bit character-encoding scheme (JIS).

Reference numeral 803 denotes a non-standard character area in which the appearance frequency, the number of appearance files, the appearance rank, and an appearance map of non-standard character data are stored. Reference numeral 804 denotes a consecutive characters area in which the appearance frequency, the number of appearance files, the appearance rank, and an appearance map of consecutive characters data are stored. Reference numeral 805 denotes a binary area in which the appearance frequency, the number of appearance files, and the appearance rank of 8-bit binary data are stored.

In the data configuration depicted in section A of FIG. 8, consecutive characters data in the consecutive characters area 804 are sorted in the order of appearance frequency. Consecutive characters data having a given appearance frequency or higher is substituted with non-standard character data that do not coincide with existing non-standard character data (hereinafter, "consecutive characters/non-standard character data"). In this manner, consecutive characters data having a string of characters with a high appearance frequency are replaced with non-standard character data, which is single character data; thereby reducing data volume and thus improving compression efficiency. Consecutive characters data having an appearance frequency lower than the given appearance frequency is consecutive characters data that does not appear frequently. Such consecutive characters data is, therefore, fragmented into single character data, which are allocated to corresponding areas. As a result, the data configuration of the appearance frequency management data 500 depicted in section A of FIG. 8 becomes the data configuration depicted in section (B) resulting after the consecutive characters/non-standard character substitution processing.

In the data configuration depicted in section B of FIG. 8, data in the numerical value area 801, standard character data in the standard character area 802, and non-standard character data in the non-standard character area 803 are mixed, and are sorted in descending order of appearance frequency, which results in the data configuration depicted in section C. In the data configuration depicted in section C, consecutive characters/non-standard character data in the consecutive characters/non-standard character area 814 and binary data in the binary area 805 of section B are not subject to sorting.

In the data configuration depicted in section C, data having a low appearance frequency, such as data of zero appearance, is cut out from a mixture area 812 in which numerical value data, standard character data, and non-standard character data are present together. Cutting out low appearance frequency data results in the data configuration depicted in section D. In the data configuration depicted in section D, the management area 800 and the mixture area 812, the consecutive characters/non-standard character area 814, and the binary area 805 are combined together to ultimately generate the appearance frequency management data 500 having the data configuration depicted in section E.

In the appearance frequency management data 500, the management area 800 stores therein the number of files/blocks, the number of types of character data that appear (number of appearing characters (type)), the number of consecutive characters/non-standard character data (number of consecutive characters (256 types)), and the number of binary data (256 types).

In the appearance frequency management data 500 depicted in FIG. 5, with the exception of binary data, appearance frequencies and the appearance maps 510 are correlated with the numerical value/character data. The numerical value/character data is sorted in descending order of appearance frequency. In the appearance frequency management data 500 depicted in FIG. 5, the numerical value/character data and the appearance frequency thereof are encoded by an encoding algorithm of exclusive-OR (XOR), etc., using a prescribed master key, which will be described later.

Figure 9:
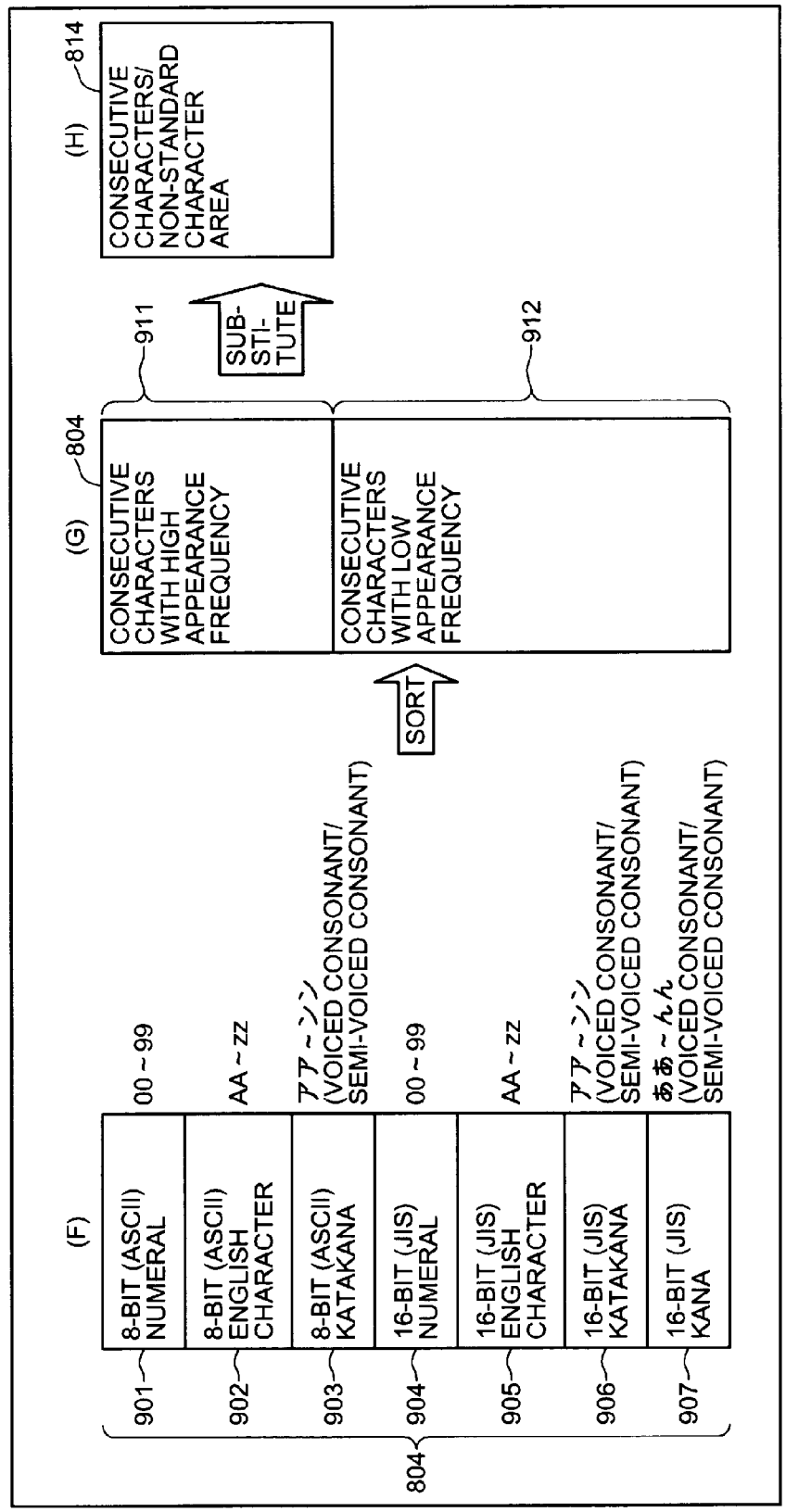
FIG. 9 is a schematic of data configuration during consecutive characters/non-standard character substitution processing.

FIG. 9 is a schematic of data configuration during consecutive characters/non-standard character substitution processing. In FIG. 9, section F depicts a data configuration of the consecutive characters area 804 of the appearance frequency management data 500 that results when consecutive characters data is totaled by the numerical value/character appearance frequency totaling unit 702. Section G depicts a data configuration of the consecutive characters area 804 that results after consecutive characters data is sorted. Section H depicts a data configuration that results after the substitution processing.

In the data configuration depicted in section F, the consecutive characters area 804 includes areas 901 to 907. The area 901 stores therein information concerning numerical string data ("00" to "99") in the 8-bit character-encoding scheme (ASCII) format; the information including the numerical string data, the appearance frequency, the number of appearance files, the appearance rank, and an appearance map.

The area 902 stores therein information concerning English character string data ("AA" to "zz") in the 8-bit character-encoding scheme (ASCII) format; the information including the English character string data, the appearance frequency, the number of appearance files, the appearance rank, and an appearance map. The area 903 stores therein information concerning katakana string data ( "ｱﾞｱﾞ" to "ﾝﾝ" , voiced consonant, semi-voiced consonant) in the 8-bit character-encoding scheme (ASCII) format; the information including the katakana string data, the appearance frequency, the number of appearance files, the appearance rank, and an appearance map.

The area 904 stores therein information concerning numerical string data ("0 0" to "9 9") in the 16-bit character-encoding scheme (JIS) format; the information including the numerical string data, the appearance frequency, the number of appearance files, the appearance rank, and an appearance map. The area 905 stores therein information concerning English character string data ("AA" to "z z") in the 16-bit character-encoding scheme (JIS) format; the information including the English character string data, the appearance frequency, the number of appearance files, the appearance rank, and an appearance map.

The area 906 stores therein information concerning katakana string data ("ｱﾞｱﾞ" to "ﾝﾝ" , voiced consonant, semi-voiced consonant) in the 16-bit character-encoding scheme (JIS) format; the information including the katakana string data, the appearance frequency, the number of appearance files, the appearance rank, and an appearance map. The area 907 stores therein information concerning kana string data ( "ぁぁ" to "んん" , voiced consonant, semi-voiced consonant) in the 16-bit character-encoding scheme (JIS) format; the information including the kana string data, the appearance frequency, the number of appearance files, the appearance rank, and an appearance map.

The data configuration depicted in section G of FIG. 9 is the result of sorting, in descending order of appearance frequency, consecutive characters data making up the data configuration depicted in section F. In the data configuration depicted in section G, an area 911 has information concerning consecutive characters data having a high appearance frequency, which is to be substituted with non-standard data. An area 912, on the other hand, has information concerning consecutive characters data having an appearance frequency that is lower than the given appearance frequency (low appearance frequency consecutive characters data). This low appearance frequency consecutive characters data is fragmented into single character data. Hence, the appearance frequency and the appearance maps 505 to 509 of character data are revised.

The data configuration depicted in section H of FIG. 9 is the result of substituting the high appearance frequency consecutive characters data in the data configuration depicted in section G with non-standard character data. The consecutive characters/non-standard character area 814 stores therein information concerning consecutive characters/non-standard character data resulting from the substitution; the information including the consecutive characters/non-standard character data, the appearance frequency, the number of appearance files, the appearance rank, and an appearance map.

Figure 10:
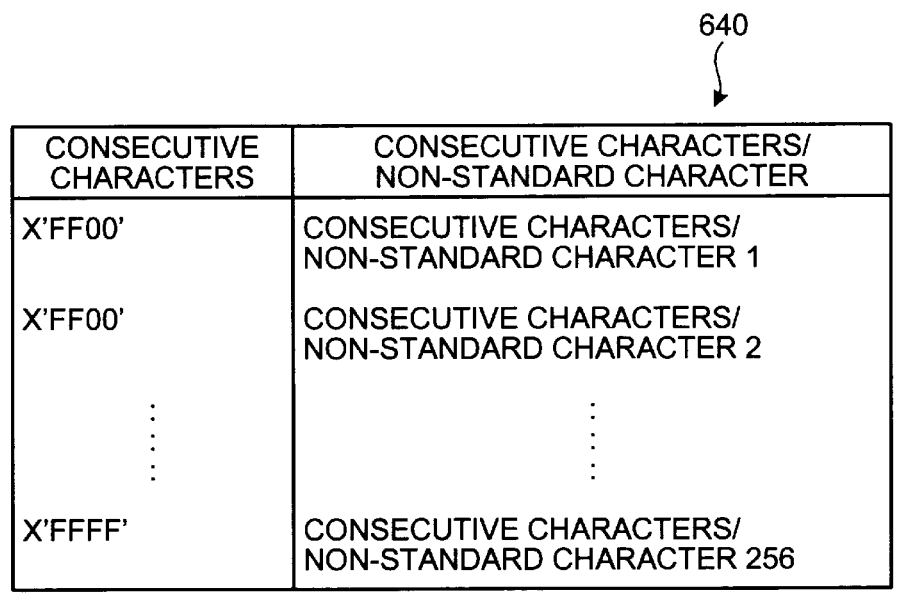
FIG. 10 is a diagram of a substitution table generated ultimately.

FIG. 10 is a diagram of the substitution table 640 generated ultimately. The substitution table 640 is generated by correlating the consecutive characters data in the area 911 of the data configuration depicted in section G and the consecutive characters/non-standard character data in the area 814 of the data configuration depicted in section H.

Figure 11:
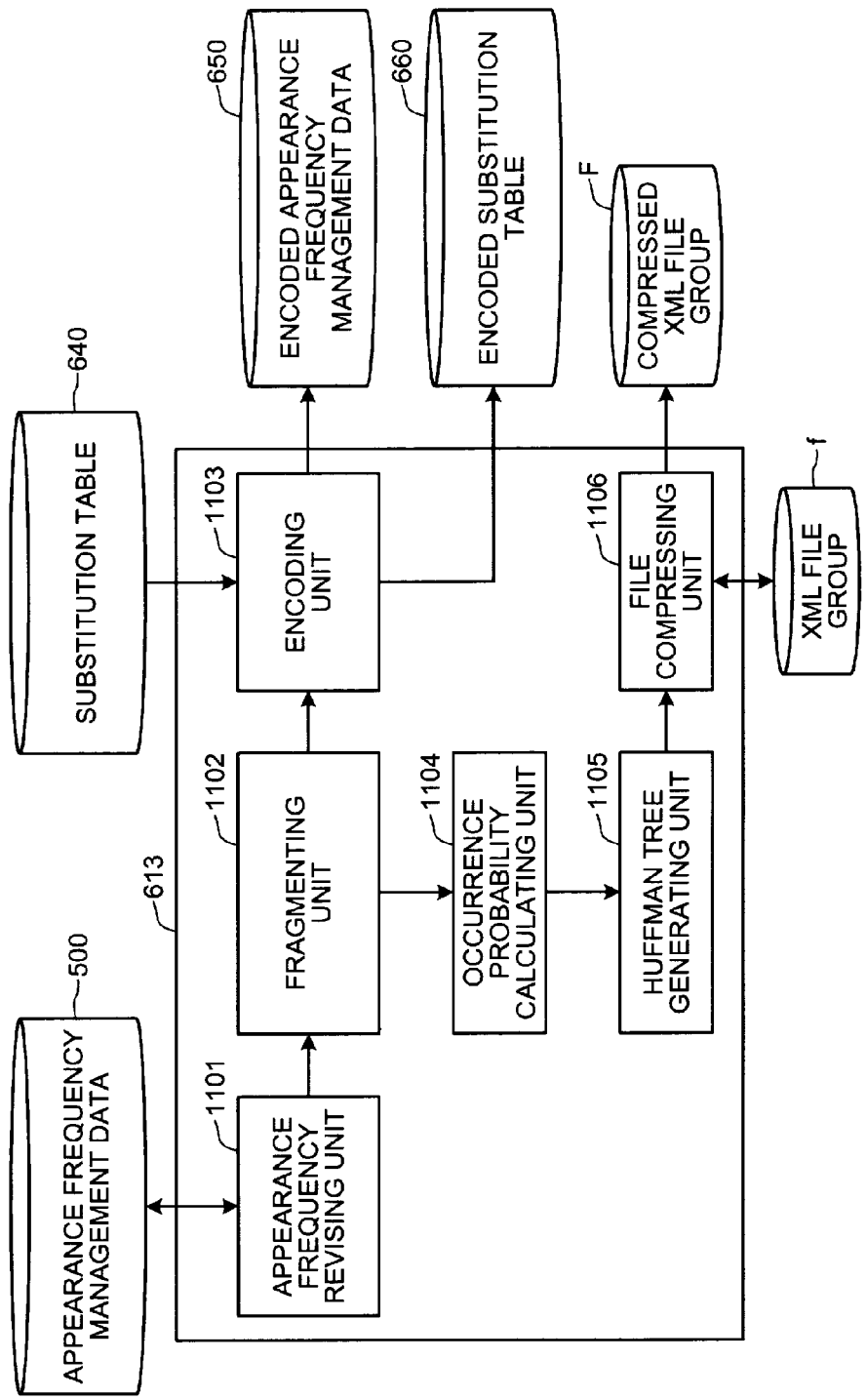
FIG. 11 is a functional diagram of a compressing/encoding unit depicted in FIG. 6.

FIG. 11 is a functional diagram of the compressing/encoding unit 613 depicted in FIG. 6. As depicted in FIG. 11, the compressing/encoding unit 613 includes an appearance frequency revising unit 1101, a fragmenting unit 1102, an encoding unit 1103, an occurrence probability calculating unit 1104, a Huffman tree generating unit 1105, and a file compressing unit 1106.

The appearance frequency revising unit 1101 revises the appearance frequency of numerals in the appearance frequency management data 500. For example, the bit width of a compression code for a numeral such as 0 to 9, a decimal point, and a feeder (hereinafter "numeral, etc.") is set and an appearance frequency corresponding to the set bit width is set for a numeral, etc., such as 0 to 9. More specifically, the appearance frequency of a numeral, etc., is revised forcibly to be higher than the appearance frequency of character data.

FIG. 12 is a diagram of an example of revision of the appearance frequency of a numeral, etc. FIG. 12 depicts a code table for revising the appearance frequency of numerical value/character data. As depicted in FIG. 12, the bit width of the compression code is 4 bits; hence, the appearance frequency of each numerical value, etc., is $1/16$, to which another appearance frequency is further added according to the appearance rank of each numerical value, etc. The revision example depicted in FIG. 12 is effective in application to a XML file having many numerals. When the sum of appearance frequencies exceeds 1 as a result of revision, the appearance frequency of other character data is revised according to the corresponding appearance frequency thereof.

FIG. 13 is a diagram of another example of revision of the appearance frequency of a numeral, etc. FIG. 13 depicts a code table for revising the appearance frequency of numerical value/character data. In FIG. 13, the bit width of the compression code is 5 bits; hence, the appearance frequency of each numerical value, etc., is $1/32$, to which another appearance frequency is further added according to the appearance rank of each numerical value, etc. The revision example depicted in FIG. 13 is effective in application to a Web homepage having much character data. When the sum of appearance frequencies exceeds 1 as a result of revision, the appearance frequency of other character data is revised according to the corresponding appearance frequency thereof.

The fragmenting unit 1102, depicted in FIG. 11, sorts, in descending order of appearance frequency, numerical value/character data in the character area of the appearance frequency management data 500. Numerical value/character data having a low appearance frequency, i.e., an appearance frequency that is lower than a given appearance frequency, is fragmented into 8-bit code data and is stored in the binary area where 8-bit code binary data is stored.

The encoding unit 1103 encodes the appearance frequency management data 500 resulting from data fragmenting by the fragmenting unit 1102 through XOR processing, using a prescribed master key, to generate the encoded appearance frequency management data 650. The substitution table 640 may also be encoded through XOR processing, using a prescribed master key, to generate the encoded substitution table 660.

The occurrence probability calculating unit 1104 sorts numerical value data, standard character data, consecutive characters/non-standard character data, and binary data in the appearance frequency management data 500 resulting from data fragmenting by the fragmenting unit 1102, in descending order of appearance frequency to calculate the occurrence probabilities of the data. The Huffman tree generating unit 1105 generates a Huffman Tree from the occurrence probabilities calculated by the occurrence probability calculating unit 1104.

The file compressing unit 1106 compresses the XML file group f using the Huffman tree generated by the Huffman tree generating unit 1105 to generate the compressed XML file group F. Specifically, the file compressing unit 1106 compresses the XML file group f by assigning shorter bits to numerical value/character data written in the XML files f0 to fn in descending order of post-amendment appearance frequency, i.e., in descending order of occurrence probability. The compression of the XML file group f by the file compressing unit 1106 is carried out by using compressing methods that differ for compressing numerical values and character data, which will be described later.

FIG. 14 is a diagram of a Huffman tree generating process by the compressing/encoding unit 613. In the appearance frequency management data 500 of a data configuration as depicted in FIG. 14, low appearance frequency character data is fragmented by the fragmenting unit 1102, and the fragmented character data is stored in the binary area storing binary data (data configuration (J) of FIG. 14).

Subsequently, in the data configuration (J), all of numerical value/character data in the mixture area, in the consecutive characters/non-standard character area, and in the binary area are sorted in descending order of appearance frequency (data configuration (K) of FIG. 14). In an area 1400 of the data configuration of (K), the occurrence probability of each of numerical value/character data is calculated using the appearance frequency as a Huffman compression parameter (data configuration (L) of FIG. 14). Finally, with the data configuration (L), a Huffman tree is generated from the occurrence probability of each of numerical value/character data (data configuration (M) of FIG. 14). A characteristic of the present embodiment lies in the generated Huffman tree 1401.

FIG. 15 a schematic of the Huffman tree 1401. In FIG. 15, symbols a to f (which do not represent actual character data of lowercase alphabetical letters but represent any given character data or numerical data) will be used to simplify the explanation.

In FIG. 15, the Huffman tree 1401 is built according to the appearance frequencies of the symbols a to f. The Huffman tree 1401 is composed of a group of nodes and links connecting the nodes. Among the group of nodes, a black circle represents a root, white circles represent intermediate nodes, and squares represent leaves. In the Huffman tree 1401, a node branches to a subordinate node in such a way that the node branches to a left subordinate node when a link takes a value of "0", and branches to a right subordinate node when the link takes a value of "1".

Each of the internal nodes has a structure 1501. The structure 1501 of an internal node includes three types of pointers: a pointer, in area 1511, pointing to a structure of a superior node to the internal node; a pointer, in area 1512, pointing to a structure of a left subordinate node to the internal node; and a pointer, in area 1513, pointing to a structure of a right subordinate node to the internal node. Each pointer is a positive value representing the distance between separate structures in terms of bytes.

Each of the leaves has a structure 1502 similar to the structure 1501 of the internal nodes. The structure 1502 of a leaf has a pointer, in area 1521, pointing to a structure of a superior node to the leaf. The pointer is a positive value representing the distance between the leaf and the structure in terms of bytes. Because a subordinate node to the leaf is not present, the leaf has, in area 1522, leaf identification information/character code classification instead of a pointer pointing to a structure of a left subordinate node. The leaf identification information is information in the form of a negative value, which identifies the node as a leaf. Similarly, the leaf has, in area 1523, a character code identified by the leaf instead of having a pointer pointing to a structure of a right subordinate node.

Reference numeral 1500 denotes a compression code table that indicates the corresponding relation between the symbols a to f and compression codes. The compression code table 1500 is a table in which the symbols a to f are correlated with the compression codes, according to the Huffman tree 1401.

FIG. 16 is an explanatory diagram of an example of expansion of the compression code table 1500 depicted in FIG. 15. A compression code table 1600 depicted in FIG. 16 is obtained by expanding the compression code table 1500 of FIG. 15 by assigning symbols (character strings of <P>, </P>, <患者 , </ 患者 >, etc.) and compression codes for the symbols, to path lists (header, trailer), HTML tags (start, end, independent) and XML tags (start, end), in the form of non-JIS-standard characters, etc.

Reference of the compression code table 1600 reveals that a decompression flag, a comparison flag, a substitution flag, and an access right flag are set with respect to the symbols in the Huffman tree 1401. A decompression flag is a flag identifying a tag to be decompressed, among tags appearing during a search. "ON" is set for a start tag. "ON" indicates the decompression flag that signifies the start of decompression. Therefore, when a decompression flag that is "ON" is detected, decompression is started from the start tag having the decompression flag that is "ON".

"OFF" is set for an end tag corresponding to a start tag set to "ON". "OFF" indicates a decompression flag that signifies the end of decompression. Therefore, when a decompression flag that is "OFF" is detected, decompression of data subsequent to the decompression flag that is "OFF" is prohibited. A tag for which no decompression flags set to "ON" or "OFF" is not decompressed. As a result, only tags to be used for comparison are decompressed, thereby increasing the data retrieval speed.

A comparison flag is a flag that is set for character data matching the head character of a retrieval keyword. In FIG. 16, the comparison flag is set to "ON" for character data "高". For example, when the retrieval keyword is "高血圧", the comparison flag is set to "ON" for character data "高".

In the XML files f0 to fn, character strings whose head character is not "高" are excluded from the character strings to be compared with the retrieval keyword. In the XML files f0 to fn, if a character string has a head character of "高", the character string is to be compared with the retrieval keyword. Thus, comparison of the retrieval keyword and a character string is carried out by comparing the character strings from the character subsequent to the head character "高", thereby improving the data retrieval speed.

Setting the comparison flag in a contrived manner enables forward matching retrieval, reverse matching retrieval, and full matching retrieval of a character string between XML tags. Specifically, forward matching retrieval is performed by setting only the comparison flag for the XML start tag and compressing the retrieval keyword using the Huffman tree 1401.

Reverse matching retrieval is performed by setting the comparison flag on a compression code for the head character of the retrieval keyword and compressing a character string consisting of the remaining portion of the retrieval keyword and the XML end tag, using the Huffman tree 1401. Full matching retrieval is performed by setting the comparison flag for the XML start tag and compressing a character string consisting of the retrieval keyword and the XML end tag, using the Huffman tree 1401.

In FIG. 16, because the comparison flag is set only for the XML start tag <副作用 >, forward matching retrieval of a character string between the XML start tag <副作用 > and the XML end tag <副作用 > is carried out.

When numerical value retrieval is carried out, data to be compared are narrowed down to a numerical value by setting the comparison flag on a feeder appended to the head of the numerical value.

A substitution flag is a flag for substituting a character string between tags having a character string displayed in a highlighted form when the character string between the tags is hit. If a substitution flag is detected, the hit character string is substituted and the character string after substitution is output to an output buffer.

An access right flag is a flag for setting permission for a right to access to a tag. The access right flag is set for each user or each terminal. For example, a tag with the access right flag set to "ON" is retrieved and is displayed only on the terminal operated by a doctor.

Figure 17:
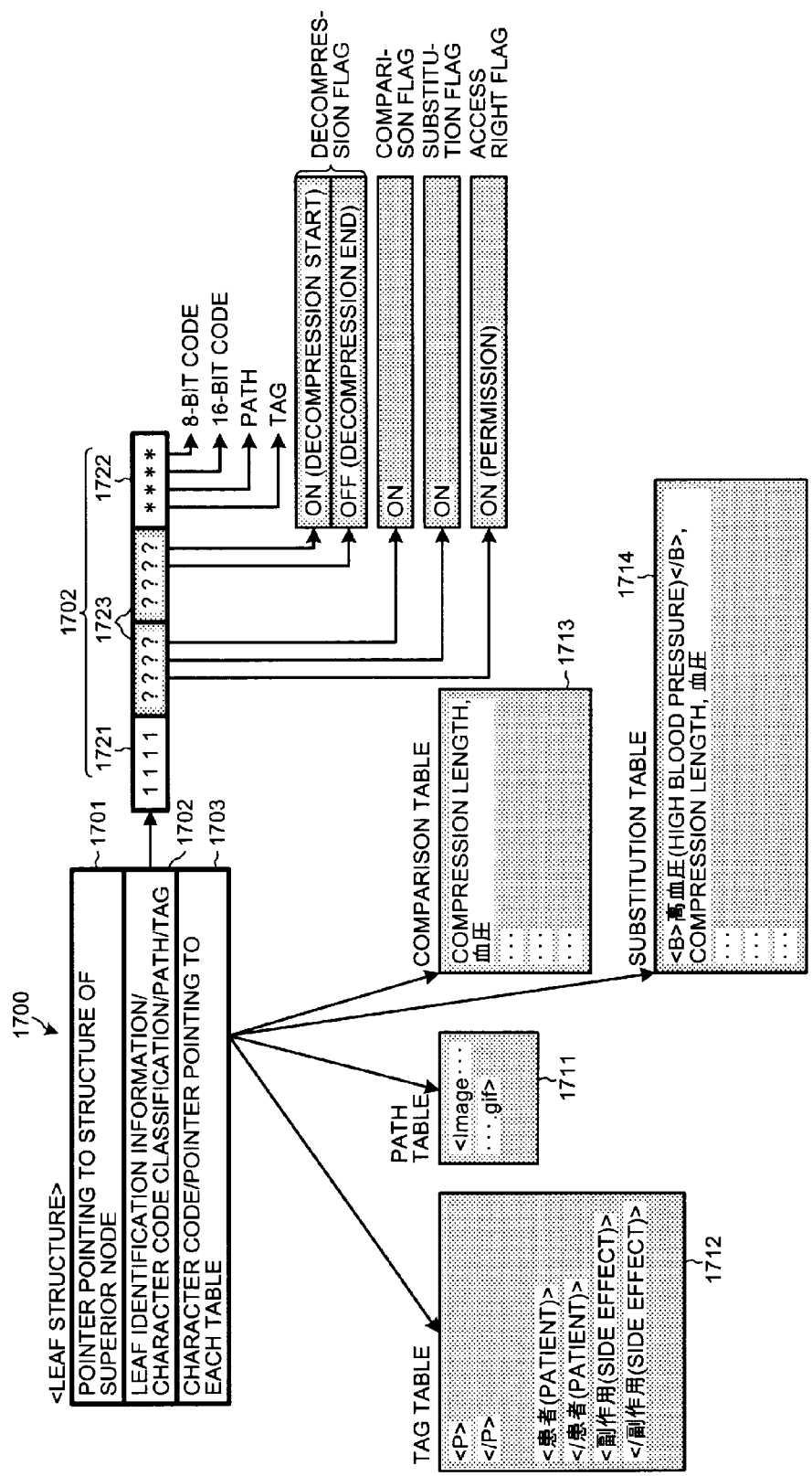
FIG. 17 is an explanatory diagram of an example of expansion of the structure of a leaf depicted in FIG. 15.

FIG. 17 is an explanatory diagram of an example of expansion of the structure 1502 of a leaf depicted in FIG. 15. A structure 1700 of a leaf is similar to the structure 1502 of a leaf, having a pointer, in area 1701, pointing to a structure of a superior node to the leaf and in area 1702, leaf identification information/character code classification. The structure 1700 of a leaf also has, in area 1702, a flag for identification as a path and a tag.

Similar to the structure 1502 of a leaf, the structure 1700 of a leaf has a character code that is stored in an area 1703 and identified by the leaf. The structure 1700 of a leaf also has a pointer pointing to each table that is stored in the area 1703.

A path table 1711 is a table describing paths. By specifying a pointer, a path correlated with the specified pointer is read from the path table. A tag table 1712 is a table describing tags. By specifying a pointer, a tag correlated with the specified pointer is read from the tag table.

A comparison table 1713 is a table describing the portion of a character string remaining subsequent to the head character of the character string and the compression length of the remaining portion of the character string. By specifying a pointer, a tag correlated with the specified pointer is read out from the comparison table. For example, when the retrieval keyword is "高血圧", the comparison flag is set to "ON" for the character data "高", as depicted in FIG. 16. A pointer corresponding to a compressed character string "血圧" starting from the second character is thus stored in the area 1703.

A substitution table 1714 is a table describing character strings that replace hit character strings. By specifying a pointer, a character string correlated with the specified pointer is read out from the substitution table to replace a hit character string with the read character string. In the example depicted in FIG. 17, "<B>高血圧 </B>, compressed length, 血圧" is written as the post-substitution character string.

When the head character "高" is detected and the compressed character string "血圧" starting from the second character matches, "<B>高血圧 </B>" is read out using a pointer as a key, and the hit character string "高血圧" between the tags is replaced with the character string "<B> 高血圧 </B>" to display "高血圧" in bold face.

The area 1702 is a data area of, for example, 16 bits. A first area 1721 identified by the upper 4 bits of the area 1702 indicates whether the first area represents leaf identification information. The upper 4 bits "1111" represent a negative value, and thus identifies a node as a leaf.

In a second area 1722 identified by the lower 4 bits, when information identified by a leaf is a character code, the character code represents an 8-bit code or a 16-bit code, or when information identified by a leaf is a symbol, the symbol represents a path or a tag.

An intermediate area 1723 is a vacant area; thus, the decompression flag, the comparison flag, the substitution flag, and the access right flag are set in the intermediate area 1723. The result of setting the flags in this vacant area is equivalent to the contents of the compression code table 1600 of FIG. 16. The decompression flag, the comparison flag, the substitution flag, and the access right flag are the flags that are not set at generation of the Huffman tree 1401 but are set at execution of data retrieval.

Figure 18:
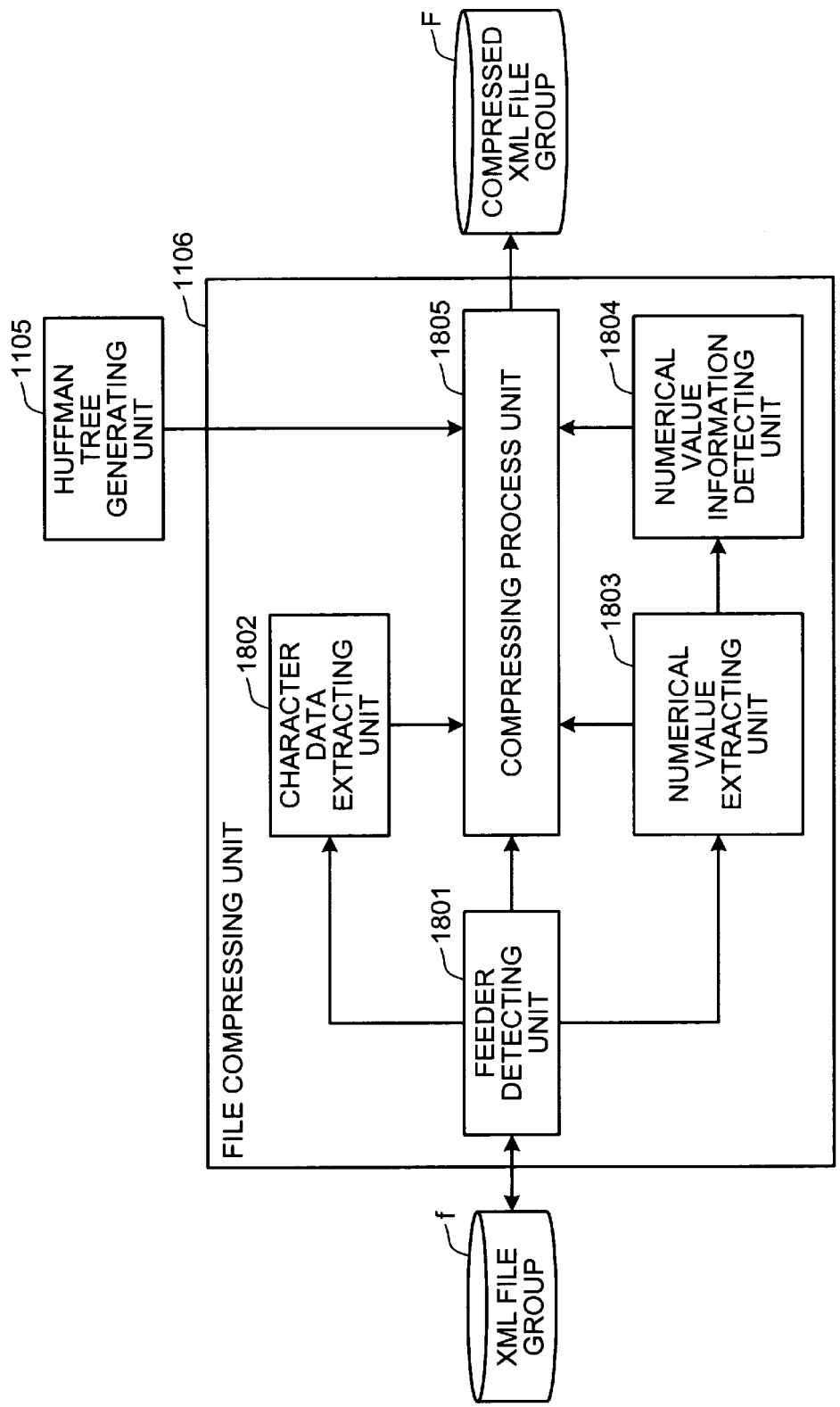
FIG. 18 is a functional diagram of a file compressing unit depicted in FIG. 11.

FIG. 18 is a functional diagram of the file compressing unit 1106 depicted in FIG. 11.

As depicted in FIG. 18, the file compressing unit 1106 includes a feeder detecting unit 1801, a character data extracting unit 1802, a numerical value extracting unit 1803, a numerical value information detecting unit 1804, and a compressing process unit 1805.

The feeder detecting unit 1801 detects a feeder in an XML file fi. Because a feeder is at the head of a numerical value, detection of the feeder indicates the presence of a numerical value following the feeder. No detection of a feeder, therefore, indicates recognition of character data.

If the feeder detecting unit 1801 does not detect a feeder at a feeder position, the character data extracting unit 1802 extracts the data (character data) located at the position. The extracted character data is subjected to a compressing process at the compressing process unit 1805.

If the feeder detecting unit 1801 detects a feeder, the numerical value extracting unit 1803 extracts a numerical value correlated with the feeder, e.g., a numerical string following the feeder, as a numerical value. If a comma or decimal point is included in the numerical string, the comma or decimal point is also extracted.

The numerical value information detecting unit 1804 extracts detailed information concerning the numerical value extracted by the numerical value extracting unit 1803. The detailed information is, for example, information indicating the number of places of the numerical value, whether the numerical value is two-bytes or one-byte, whether the numerical value includes a comma and/or a decimal point, and the location of the decimal point if included.

The compressing process unit 1805, using the Huffman tree generated by the Huffman tree generating unit 1105, compresses character data extracted by the character data extracting unit 1802 and numerical value data extracted by the numerical value extracting unit 1803.

When numerical values are compressed, a numeral expressing the number of places and a numeral in each place are each converted into a compression code corresponding to the numeral. Compression codes for each numeral in each place are arranged in the order of the places. If a numerical value includes a decimal point, the numerical value is converted into a compression code corresponding to the decimal point. The presence/absence of a comma and two-byte/one-byte are each expressed by 1 bit.

In a numerical value compressing process, the numerical value alone is extracted from the numerical value information concerning blood pressure and age, patient identification codes, etc. The extracted numerical value is compressed. For example, a compression code for a feeder is read out through a referencing of the code tables depicted in FIGS. 12 and 13.

Subsequently, a bit indicative of whether the numerical value is a two-byte numerical value or a one-byte numerical value (two-byte/one-byte bit) is set. This two-byte/one-byte bit is "1" when the numerical value is a two-byte numerical value, and is "0" when the numerical value is a one-byte numerical value. A comma presence/absence bit indicative of whether the numerical value is expressed using a comma "," is set. This comma presence/absence bit is "1" when the numerical value includes a comma, and is "0" when the numerical value includes no comma.

The number of places of the numerical value is then detected. The detected number of places does not include the number of places following a decimal point. A compression code for a numeral equivalent to the detected number of places is read out from the code table depicted in FIG. 12. Compression codes for each numeral at each place from the head place to the end place making up the numerical value are read out from the coding tables depicted in FIGS. 12 and 13.

When the numerical value includes a decimal point, a compression code for the decimal point is read out from the coding tables depicted in FIGS. 12 and 13. In this manner, the numerical value is compressed into a numerical string composed of compression codes and bits. An example of a compressing process using the code table depicted in FIG. 12 will be described hereinafter. A numerical value subjected to the compressing process is referred to as a compressed numerical value.

Figure 19A:
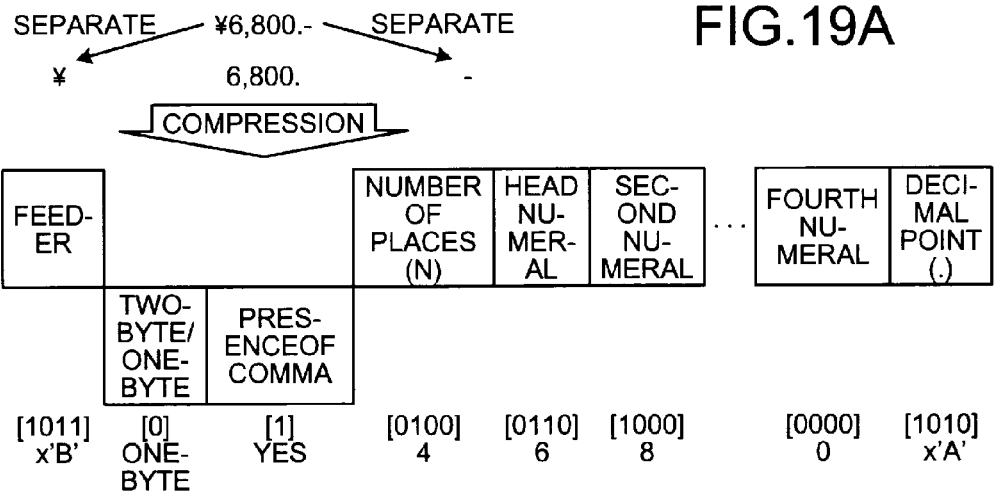
FIG. 19A is a diagram of a first example of a numerical value compressing process.

FIG. 19A is a diagram of a first example of a numerical value compressing process. As depicted in FIG. 19A, "¥" at the head position and "-" at the end position are separated from numerical value information "¥ 6,800.-" to extract a numerical value "6,800.", which is compressed.

For example, a compression code "1011" for a feeder "x'B'" indicative of the starting point of the numerical value is read out from the code table depicted in FIG. 12. Subsequently, a two-byte/one-byte bit "0" indicative of the numerical value "6,800." being a one-byte numerical value is set. A comma presence/absence bit "1" indicative of the numerical value "6,800." being expressed using a comma "," is also set. The number of places "4" of the numerical value "6,800." is then detected, and a compression code "0100" for the detected number of places "4" is read out from the code table depicted in FIG. 12.

Subsequently, compression codes "0110", "1000", "0000", and "0000" for the head numeral "6", the second numeral "8", the third numeral "0", and the end numeral "0" of the numerical value "6,800." are read out from the code table depicted in FIG. 12. Lastly, a compression code "1010" for the decimal point "x'A'" of the numerical value "6,800." is read out from the code table depicted in FIG. 12. The numerical value "6,800." is compressed in this manner.

Figure 19B:
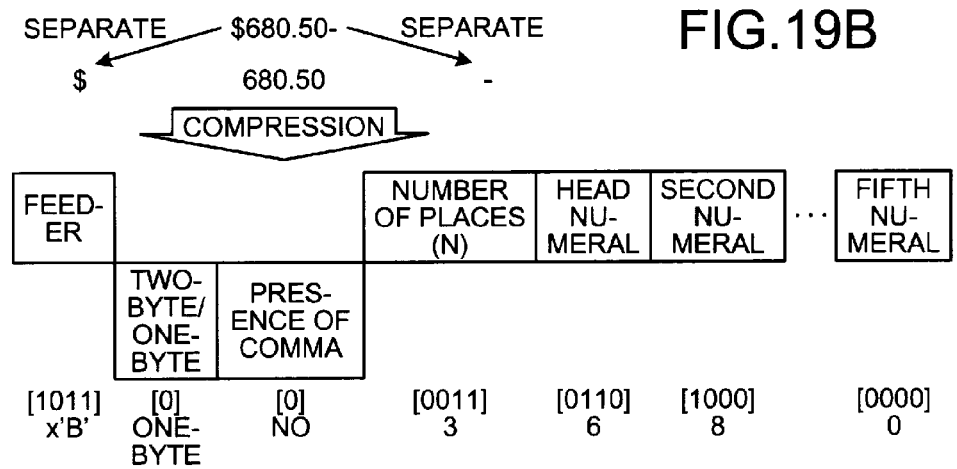
FIG. 19B is a diagram of a second example of a numerical value compressing process.

FIG. 19B is a diagram of a second example of the numerical value compressing process. As depicted in FIG. 19B, "$" at the head position and "-" at the end position are separated from numerical value information "$680.50-" to extract a numerical value "680.50", which is compressed.

For example, the compression code "1011" for the feeder "x'B'" indicative of the starting point of the numerical value is read out from the code table depicted in FIG. 12. Subsequently, a two-byte/one-byte bit "0" indicative of the numerical value "680.50" being a one-byte numerical value is set. A comma presence/absence bit "0" indicative of the numerical value "680.50" being expressed without using a comma "," is also set. The number of places "3" of the numerical value "680.50" is then detected, and a compression code "0011" for the detected number of places "3" is read out from the code table depicted in FIG. 12.

Subsequently, compression codes "0110", "1000", "0000", "1010", "0101", and "0000" for the head numeral "6", the second numeral "8", the third numeral "0", the decimal point "x'A'", the fourth numeral "5", and the end numeral "0" of the numerical value "680.50" are read out from the code table depicted in FIG. 12. The numerical value "680.50" is compressed in this manner.

Figure 19C:
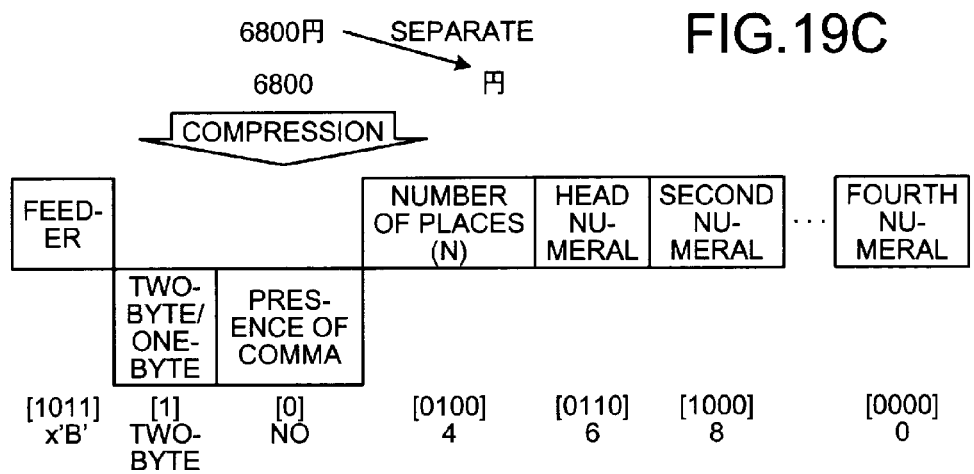
FIG. 19C is a diagram of a third example of a numerical value compressing process.

FIG. 19C is a diagram of a third example of the numerical value compressing process. As depicted in FIG. 19C, "円" at the end position is separated from numerical value information "6800円" to extract a numerical value "6800", which is compressed.

For example, the compression code "1011" for the feeder "x'B'" indicative of the starting point of the numerical value is read out from the code table depicted in FIG. 12. Subsequently, a two-byte/one-byte bit "1" indicative of the numerical value "6800" being a two-byte numerical value is set. A comma presence/absence bit "0" indicative of the numerical value "6800" being expressed without using a comma "," is also set. The number of places "4" of the numerical value "6800" is then detected, and the compression code "0100" for the detected number of places "4" is read out from the code table depicted in FIG. 12.

Subsequently, compression codes "0110", "1000", "0000", and "0000" for the head numeral "6", the second numeral "8", the third numeral "0", and the end numeral "0" of the numerical value "6800" are read out from the code table depicted in FIG. 12. The numerical value "6800" is compressed in this manner.

Figure 19D:
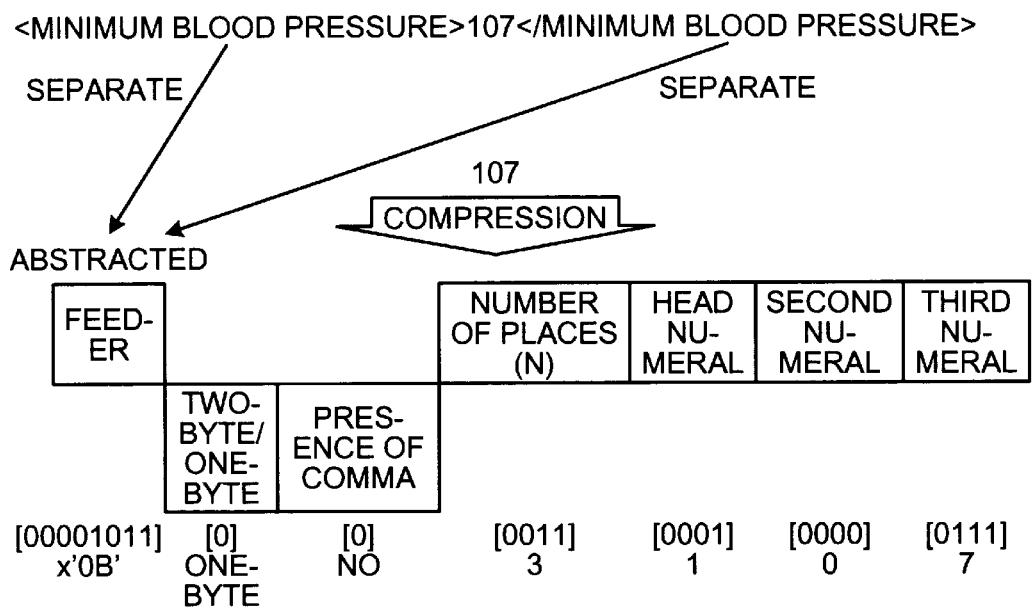
FIG. 19D is a diagram of an example of a process of compressing numerical value abstracted data.

FIG. 19D is a diagram of an example of a process of compressing numerical value abstracted data. As depicted in FIG. 19D, "</最小血圧>" at the head position and the same at the end position are separated from numerical value abstracted data representing a minimum blood pressure "<最小血圧>107<最小血圧>" to extract a numerical value "107", which is compressed.

For example, a compression code "00001011" for a feeder "x'0B'" indicative of the starting point of the numerical value is read out from the code table depicted in FIG. 12. The feeder "x'0B'" is a feeder that identifies the numerical value as the last blood pressure. Subsequently, a two-byte/one-byte bit "0" indicative of the numerical value "107" being a one-byte numerical value is set. A comma presence/absence bit "0" indicative of the numerical value "107" being expressed without using a comma "," is also set. The number of places "3" of the numerical value "107" is then detected, and the compression code "0011" for the detected number of places "3" is read out from the code table depicted in FIG. 12.

Subsequently, compression codes "0001", "0000", and "0111" for the head numeral "1", the second numeral "0", and the third numeral "7" of the numerical value "107" are read out from the code table depicted in FIG. 12. The numerical value "107" is compressed in this manner.

To speed up numerical value detection and size comparison, numerical value compression using the following numerical value map may be carried out. FIG. 20A is an explanatory diagram of the numerical value map. In the numerical value map, a flag indicative of a multiplier of 10 is set for the heading 2-digit number of each numeral. A multiplier of 10 represents the number of places to reach the head number. For example, for numerical value information of "5670円", the multiplier of 10 of the head number "5" is 3; hence, a flag of the multiplier of 10 "3" for the heading 2-digit number "56" is set to "1" (ON).

In the case of a decimal, the right end number of the decimal is regarded as the head number; hence, a multiplier of 10 takes a negative value. For example, in the case of numerical value information of "0.14 mg", because a multiplier of 10 of the head number "4" is "−2", a flag of the multiplier of 10 "−2" for the heading 2-digit number "41" is set to "1" (ON). When numerical value information written in the XML files F0 to fn is numerical value information that does not include a decimal, such as the above numerical value information "5670円", a feeder on a positive multiplier (hereinafter, "feeder (+)") is given to the numerical value information. When the numerical value information is of a decimal numerical value, such as "0.14 mg", a feeder on a negative multiplier (hereinafter, written as "feeder (−)") is given to the numerical value information.

Figure 20B:
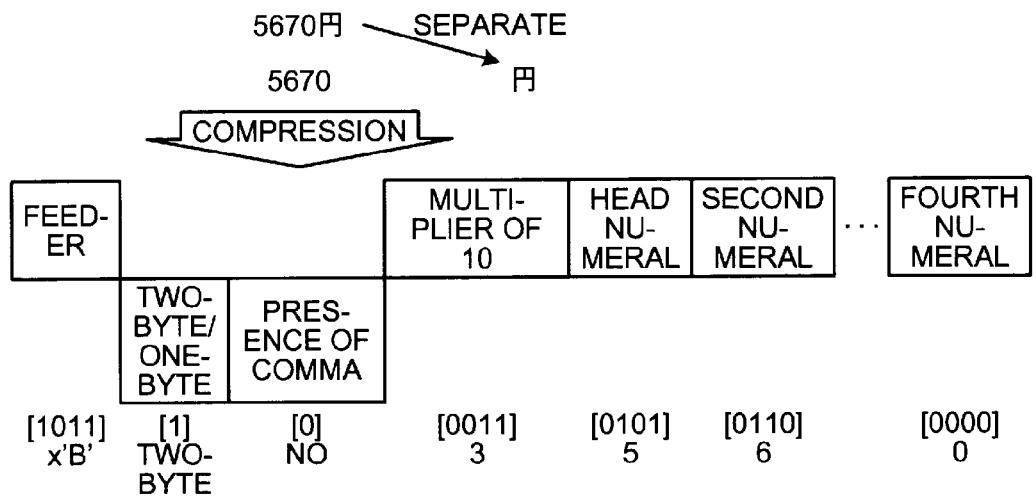
FIG. 20B is a diagram of a fourth example of the numerical value compression process.

FIG. 20B is a diagram of a fourth example of the numerical value compression process. In FIG. 20B, "円" at the end of the numerical value information "5670円" is removed therefrom to extract a numerical value "5670", which is then compressed using the numerical value map.

For example, a compression code "1011" for a feeder (+)"x'B'" indicative of the start position of the numerical value is read out from the coding table depicted in FIG. 12. A one-byte/two-byte "1" indicating the numerical value "5670" to be a two-byte numerical value is then set. A comma presence/absence bit "0" indicating that the numerical value "5670" is not expressed using a comma "," is also set. The multiplier of 10"3" for the numerical value "5670" is then detected from the numerical value map, and a compression code "0011" for the detected number of places "3" is read out from the coding table of FIG. 12.

Subsequently, compression codes "0101", "0110", "0000", and "0000" for the head number "5", the second number "6", the third number "7", and the end number "0" of the numerical value "5670" are read out from the coding table depicted in FIG. 12. In this manner, the numerical value "5670" is compressed.

Figure 20C:
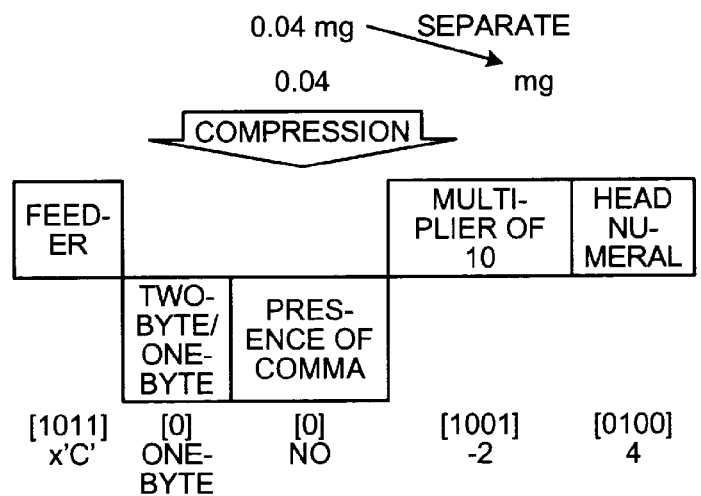
FIG. 20C is a diagram of a fifth example of the numerical value compression process.

FIG. 20C is a diagram of a fifth example of the numerical value compression process. In FIG. 20C, "mg" at the end of the numerical value information "0.14 mg" is removed therefrom to extract a numerical value "0.14", which is then compressed using the numerical value map.

For example, a compression code "1100" for a feeder (−)"x'C'" indicative of the start position of the numerical value is read out from the coding table of FIG. 12. A one-byte/two-byte "0" indicating that the numerical value "0.14" is a one-byte numerical value is then set. The comma presence/absence bit "0" indicating that the numerical value "0.14" is not expressed using a comma "," is also set. The multiplier of 10 "−2" for the numerical value "0.14" is then detected from the numerical value map, and a compression code "1001" for the detected number of places "−2" is read out from the coding table of FIG. 12.

Subsequently, a compression code "0100" for the head number "4" of the numerical value "0.14" is read out from the coding table of FIG. 12. In this manner, the numerical value "0.14" is compressed. Hence, numerical values in numerical value information are all turned to one-byte numerical values. This speeds up detection of a numerical value from character strings in the XML files f0 to fn and size comparison of character strings.

Figure 21:
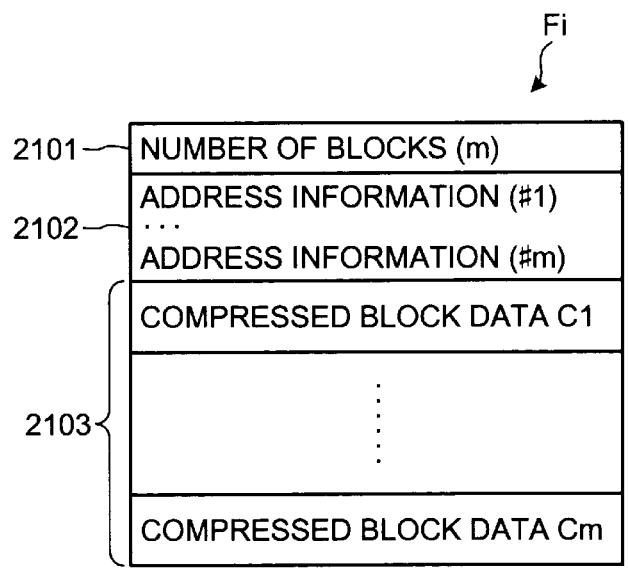
FIG. 21 is a diagram of a data configuration of a compressed XML file resulting from compression by a file compressing unit.

FIG. 21 is a diagram of a data configuration of a compressed XML file resulting from compression by the file compressing unit 1106. With reference to FIG. 21, an arbitrary compressed XML file fi will be described. The compressed XML file fi is made up of an area 2101 storing therein information of the number of blocks (m), an area 2102 storing therein address information (#1 to #m) of m blocks, and an area 2103 storing therein compressed block data C1 to Cm of the blocks.

FIG. 22 is a table of a comparison between the compressed block data C1 to Cm and the original block data before compression. As depicted in FIG. 22, the lengths of the compressed block data C1 to Cm are reduced approximately to the half of the lengths of the corresponding original block data through compression.

Figure 23:
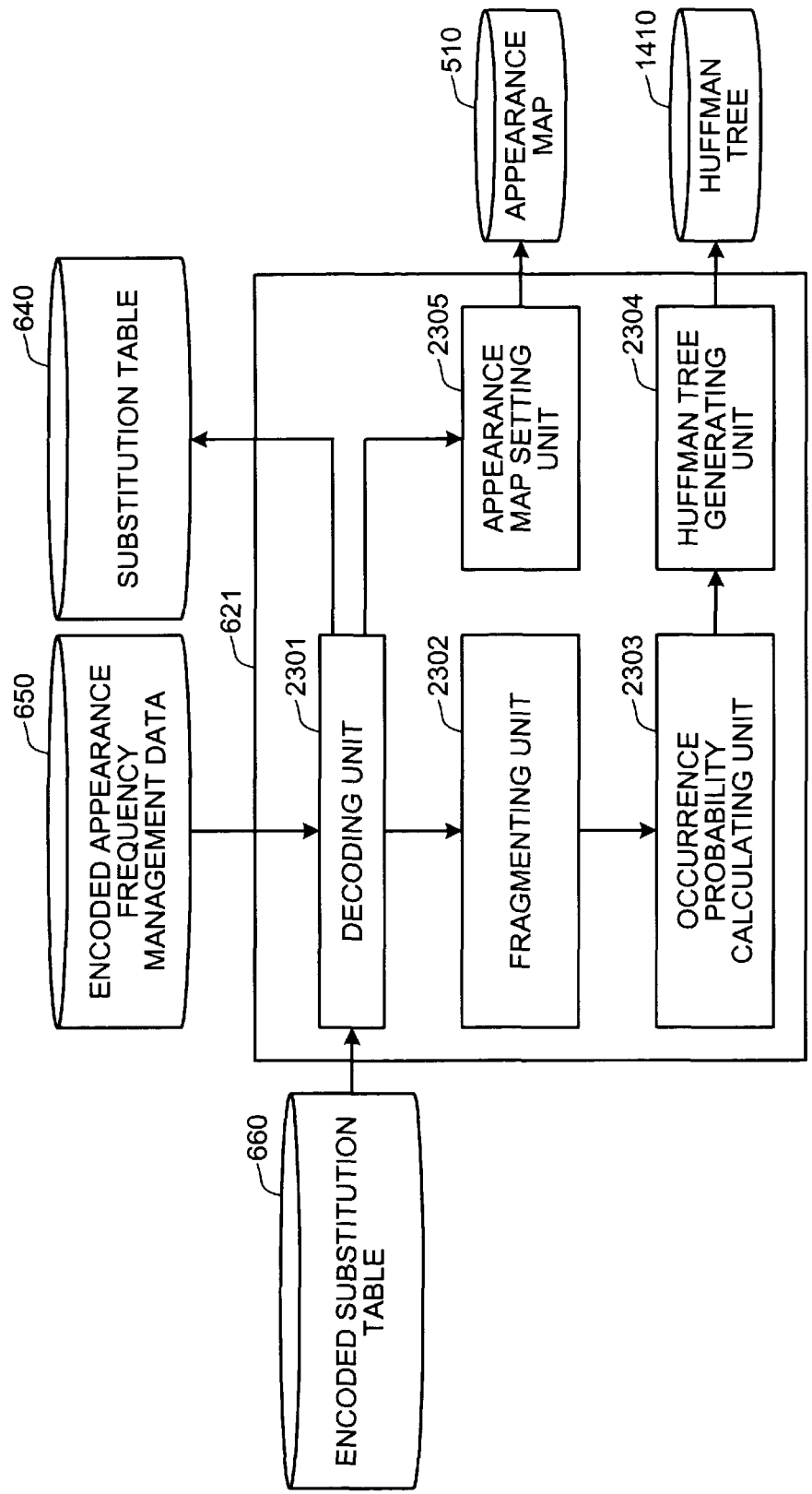
FIG. 23 is a functional diagram of a retrieval initializing unit depicted in FIG. 6.

FIG. 23 is a functional diagram of the retrieval initializing unit 621 depicted in FIG. 6. As depicted in FIG. 23, the retrieval initializing unit 621 includes a decoding unit 2301, a fragmenting unit 2302, an occurrence probability calculating unit 2303, a Huffman tree generating unit 2304, and an appearance map setting unit 2305.

The decoding unit 2301 decodes the encoded appearance frequency management data 650. For example, the decoding unit 2301 executes a decoding process through exclusive-OR (XOR) using the encoding master key of FIG. 11. In the same manner, the decoding unit 2301 also decodes the encoded substitution table 660 into the original substitution table 640.

The fragmenting unit 2302, the occurrence probability calculating unit 2303, and the Huffman tree generating unit 2304 execute processes identical to those carried out by the fragmenting unit 1102, the occurrence probability calculating unit 1104, and the Huffman tree generating unit 1105 depicted in FIG. 11 to generate a Huffman tree 1410, which is the Huffman tree that is revised by the appearance frequency revising unit 1101.

The appearance map setting unit 2305 reads the appearance maps 510 of the decoded appearance frequency management data 500, and expands the read contents on a memory to link the contents to a row/cell (kuten) code correspondence table. The row/cell (kuten) code is character code for two-byte characters established by Japanese Industrial Standards (JIS). The row/cell correspondence table is the table in which the address of each row and cell is stored.

Figure 24:
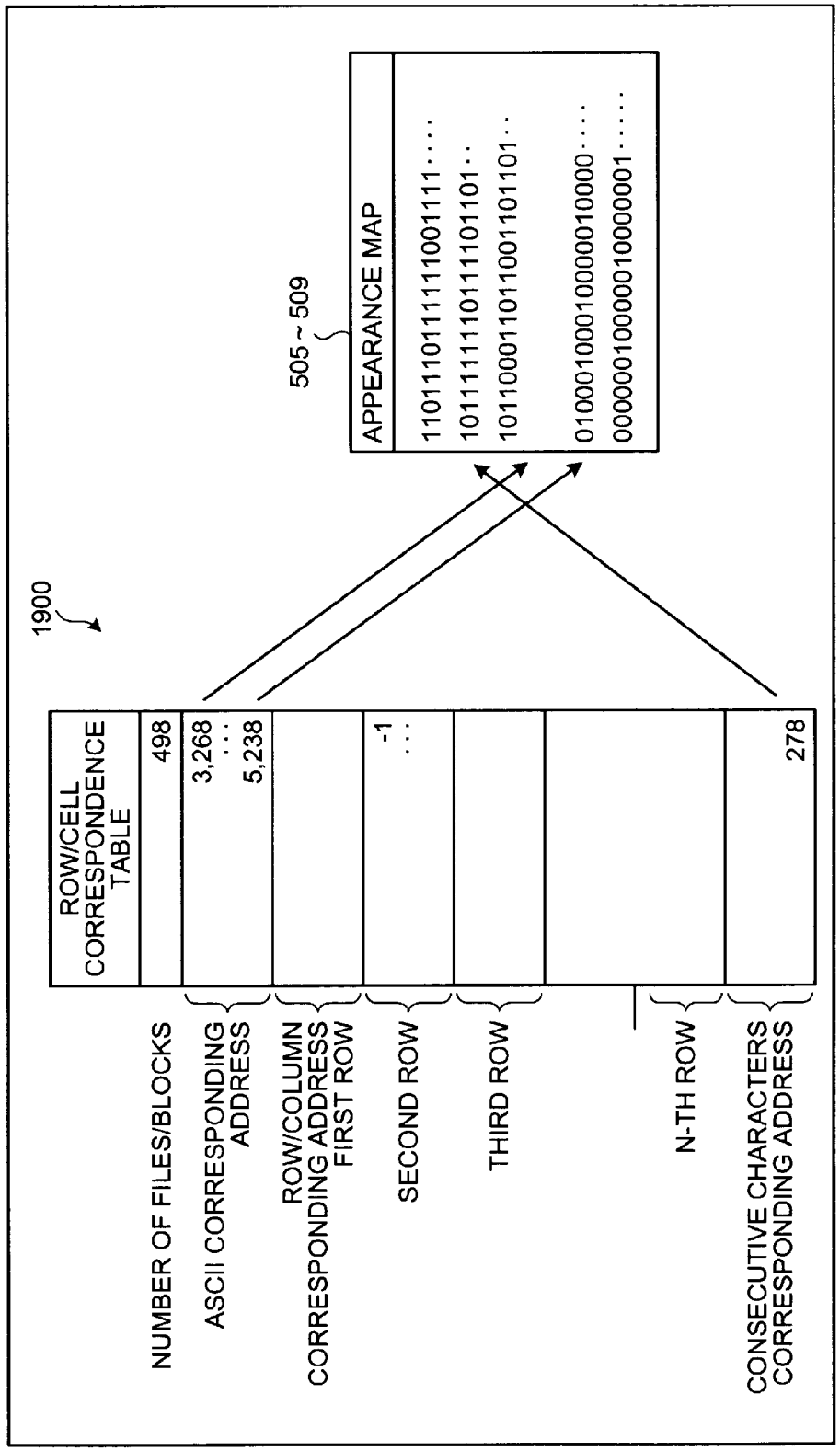
FIGS. 24 and 25 are diagrams of the corresponding relation between a character row/cell correspondence table and an appearance map.

FIG. 24 is a diagram of the corresponding relation between a character row/cell correspondence table and the appearance map. A character row/cell correspondence table 2400 correlates character data of the appearance frequency management data 500 with the appearance maps 505 to 509. The appearance maps 505 to 509 representing strings of bits indicative of the presence/absence of character data corresponding to row/cell codes may be called up, using the character row/cell correspondence table 2400.

Figure 25:
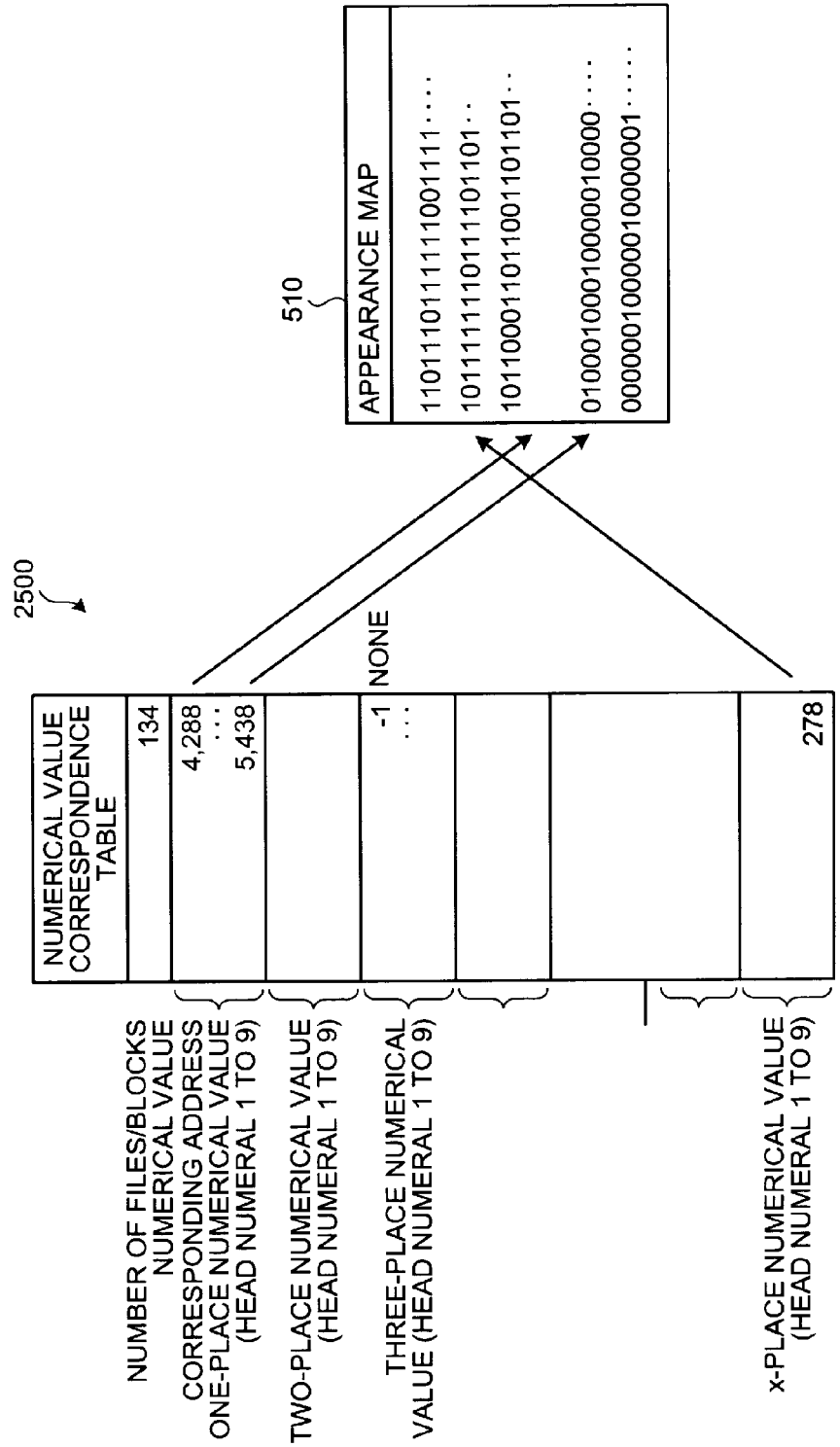

FIG. 25 is a diagram of the corresponding relation between a numerical value row/cell correspondence table and the appearance map. A numerical value row/cell correspondence table 2500 correlates numerical value groups of the appearance frequency management data 500 with the appearance map 510. The appearance map 510 representing strings of bits indicative of the presence/absence of numerals in numerical groups corresponding to rows/cells may be called up, using the numerical value row/cell correspondence table 2500.

Figure 26:
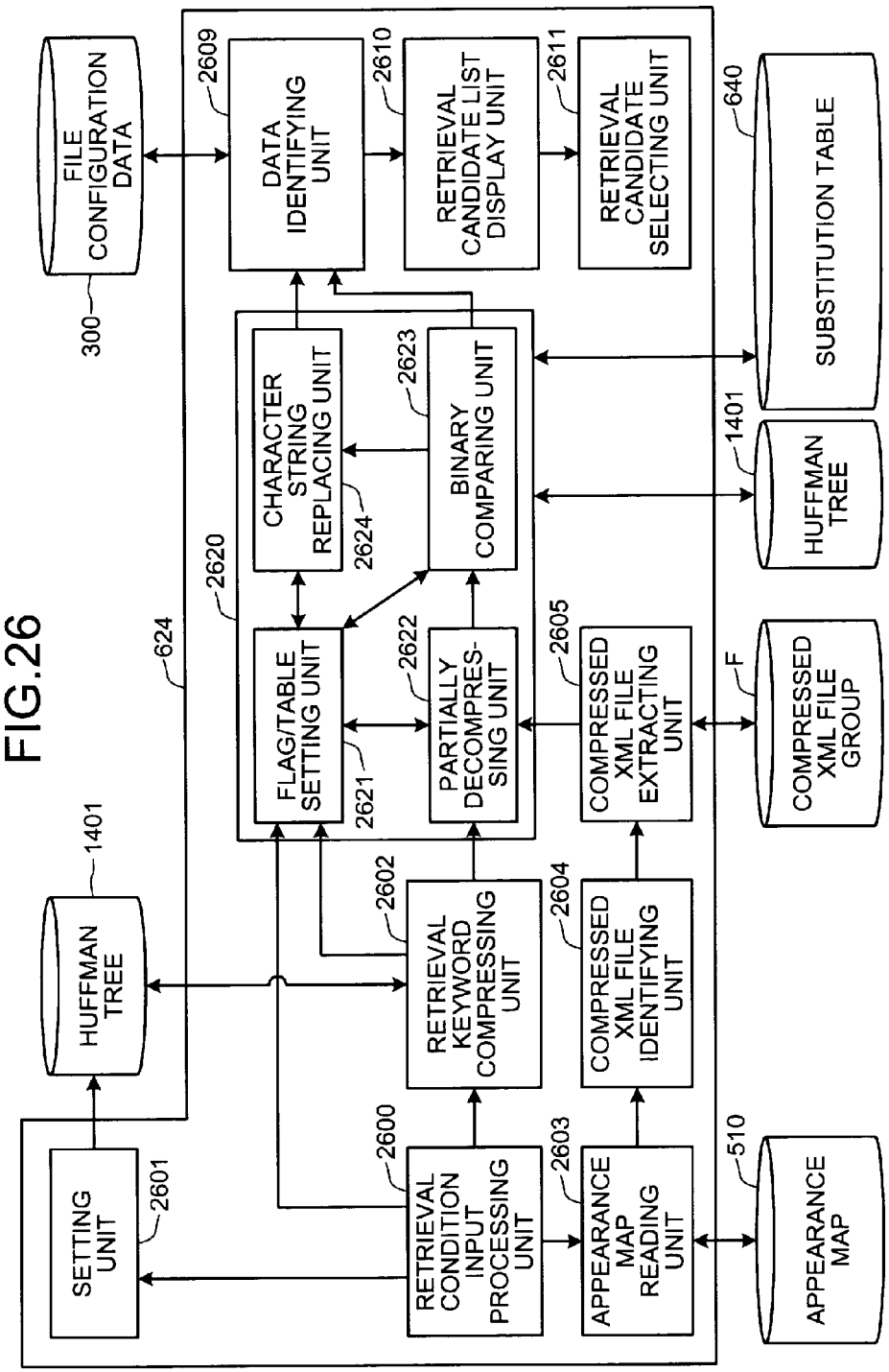
FIG. 26 is a functional diagram of a full text retrieval executing unit in a retrieval executing unit.

FIG. 26 is a functional diagram of the full text retrieval executing unit 624 in the retrieval executing unit 622.

As depicted in FIG. 26, the full text retrieval executing unit 624 includes a retrieval condition input processing unit 2600, a setting unit 2601, a retrieval keyword compressing unit 2602, an appearance map reading unit 2603, a compressed XML file identifying unit 2604, a compressed XML file extracting unit 2605, a retrieval candidate list display unit 2610, a retrieval candidate selecting unit 2611, and a partial decompression/comparison processing unit 2620.

The retrieval condition input processing unit 2600 receives input of a retrieval condition from a user. The retrieval condition is, for example, the title of an XML tag and a retrieval keyword. A character string in a clinical test data item having the XML format has different meanings depending on the types of tags between which the character string is placed. For example, a character string "糖尿病" means symptoms in one case and simply means the name of a disease in another case. Identifying the type of XML tag is, therefore, important for better retrieval efficiency.

When multiple retrieval keywords are present, character strings of the retrieval keywords are connected together. When consecutive characters of a retrieval keyword are equivalent to given consecutive characters, the consecutive characters are replaced with a non-JIS-standard character using the substitution table 640. The retrieval condition input processing unit 2600 then fragments the retrieval keyword into single characters.

Figure 27:
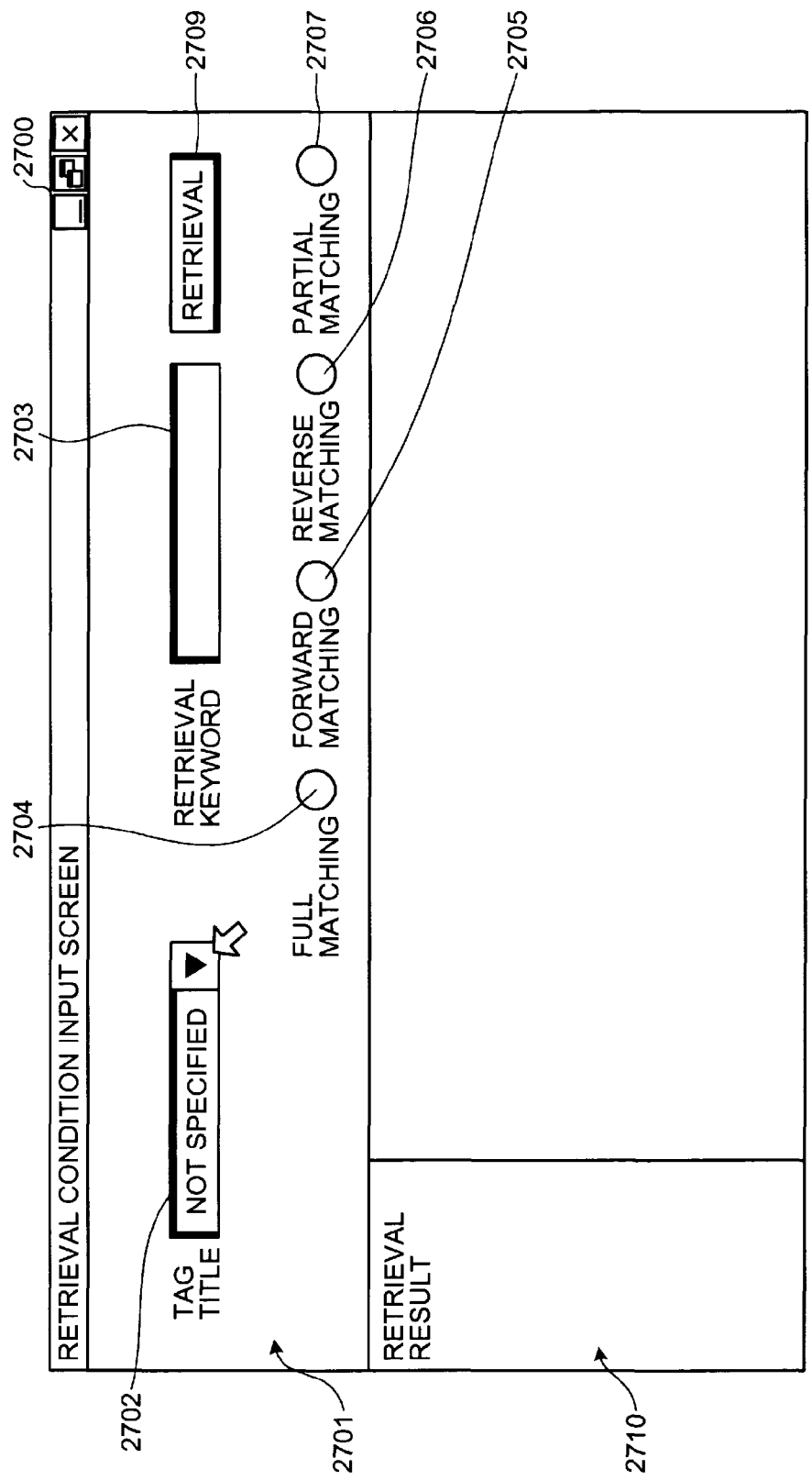
FIGS. 27 to 29 depict a screen through which a character string is input as a retrieval keyword.
Figure 28:
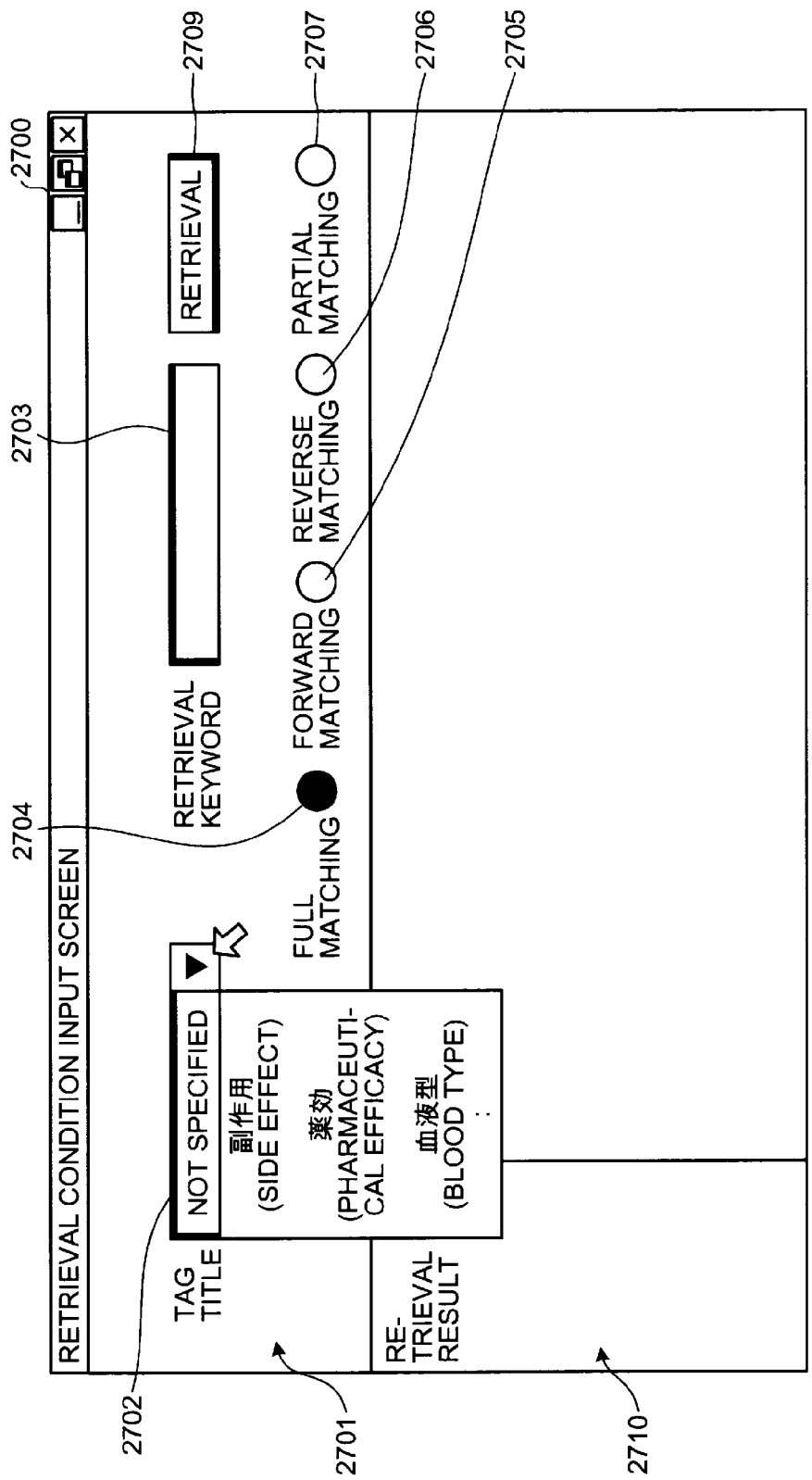
Figure 29:
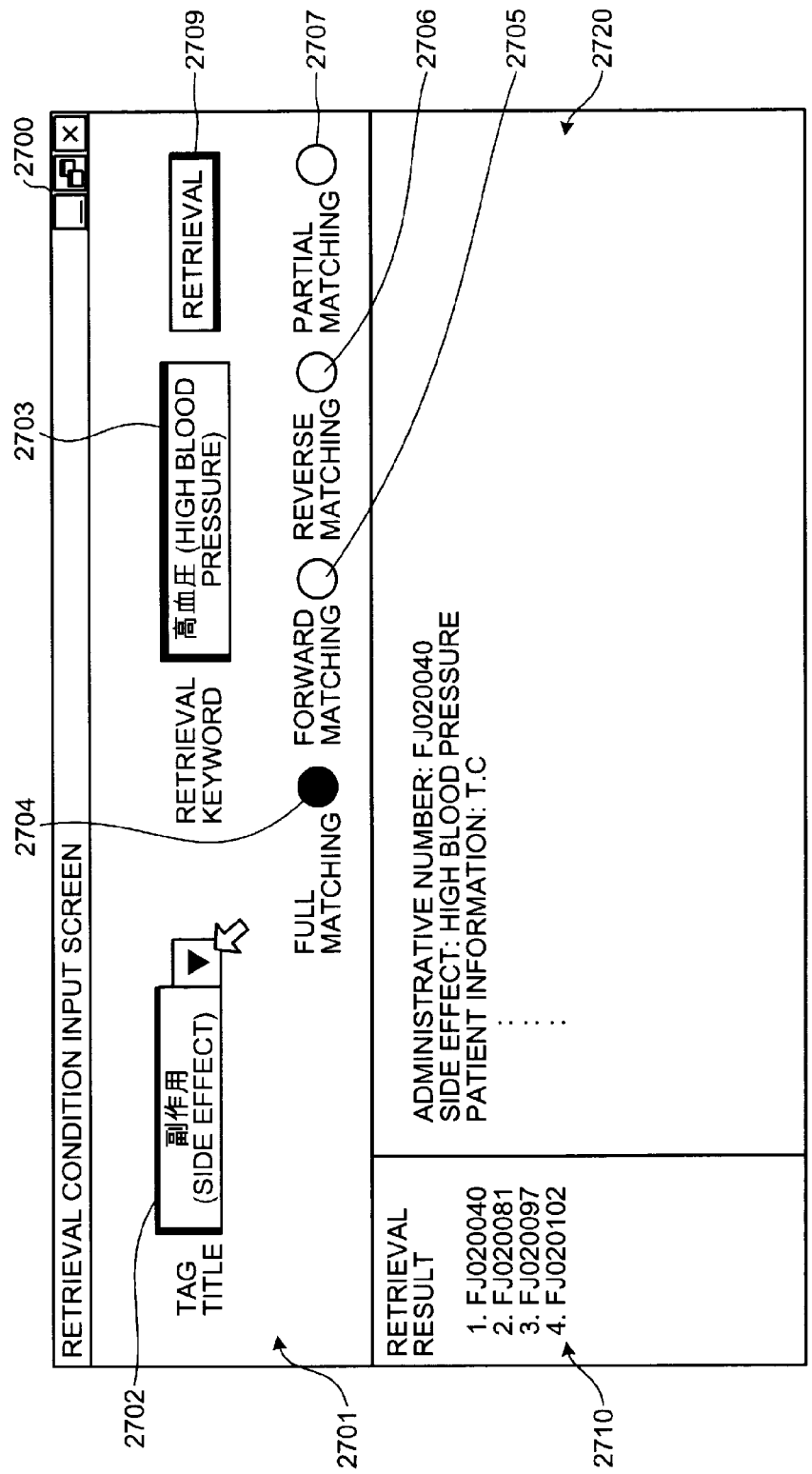

FIGS. 27 to 29 are explanatory diagrams of a retrieval condition input screen. FIGS. 27 to 29 depict a screen through which a character string is input as a retrieval keyword. In FIG. 27, the retrieval condition input screen 2700 has an input field 2701, which displays a designation drop down menu for designating the title of an XML tag, an input space 2703 for inputting a retrieval keyword, radio buttons 2704 to 2707 for selecting any one of full matching, forward matching, reverse matching, and partial matching, and a retrieval button 2709. A retrieval result list field 2710 displays a retrieval result list (e.g., patient identification codes).

The retrieval condition input screen 2700 depicted in FIG. 28 depicts a changed state of the screen 2700 depicted in FIG. 27, resulting when the designation pull-down menu 2702 is clicked by the user. In this screen, "副作用", "薬効", "血液型", etc., may be specified as a tag title.

The retrieval condition input screen 2700 of FIG. 29 depicts a changed state of the screen 2700 of FIG. 28 that results when a tag title "副作用" is specified and a retrieval keyword "血液型" are input by the user. Since the radio button 2707 is selected, clicking the retrieval button 2709 in this state of the screen leads to execution of partial matching retrieval.

The setting unit 2601 sets information according to a retrieval condition on the Huffman tree 1401. Specifically, when the retrieval button 2709 is clicked, a character code, a pointer pointing to each of the tables 1711 to 1714, the decompression flag, the comparison flag, the substitution flag, and the access right flag are set in the Huffman tree 1401 according to the retrieval condition.

For example, in the example depicted in FIG. 29, because the tag title "副作用" is designated, pointers pointing to XML tags <副作用> and </副作用> on the tag table 1712 are set in the area 1703 for each of the character codes "高", "血", and "圧" that are regarded as leaves. Since the radio button 2704 is selected, the decompression flag ON (start of decompression) and the decompression flag OFF (end of decompression) are set for the XML tags <副作用> and </副作用>, respectively.

Since the decompression flag is set to ON for the XML tag <副作用>, a block decompressing unit 2607 to be described later does not execute decompression until a compression code for the XML tag <副作用> is detected. The block decompressing unit 2607 thus decompresses the XML tag <副作用> and a character string following it upon detecting the compression code for the XML tag <副作用>, and terminates decompression upon detecting a compression code for the XML tag </副作用> having the decompression flag set to OFF.

When high-speed retrieval is performed, the compression flag is set for the head character "高" of the retrieval keyword. When a retrieval result is displayed in a highlighted state, the substitution flag is set. The access right flag is set according to the terminal of the logged-in user. For example, if a designated tag title is related to personal information, such as the name of a patient, the access right flag (permission) is set to ON for the tag when the tag title is designated by a user using a terminal of a doctor, and the access right flag is not set for the tag when the tag title is designated by a user using a terminal of a clerk.

The retrieval keyword compressing unit 2602 compresses a retrieval keyword input through the retrieval condition input processing unit 2600, using the Huffman tree 1401 generated by the Huffman tree generating unit 2304 of the retrieval initializing unit 621. In the example depicted in FIG. 29, since the retrieval keyword is "高血圧", for example, a compression code corresponding to the retrieval keyword is identified by detecting a leaf of the Huffman tree 1401 for which character data of "血" is set.

The retrieval keyword compressing unit 2602 compresses the remaining portion of the retrieval keyword excluding the head character of the keyword, using the Huffman tree 1401. In the example depicted in FIG. 29, since the retrieval keyword is "高血圧", the character "高" is not compressed but rather the character string "血圧" is compressed.

The retrieval keyword compressing unit 2602 changes data to be compressed according to the method of retrieval specified by the user. For example, in the case of forward matching retrieval, the comparison flag is set for the XML start tag alone, so that the retrieval keyword is compressed using the Huffman tree 1401.

In the case of reverse matching retrieval, the comparison flag is set for a compression code for the head character of the retrieval keyword, so that a character string consisting of the remaining portion of the retrieval keyword and the XML end tag is compressed using the Huffman tree 1401. In the case of full text matching retrieval, the comparison flag is set for the XML start tag, so that a character string consisting of the retrieval keyword and the XML end tag is compressed using the Huffman tree 1401.

The appearance map reading unit 2603, using the appearance map 510 set by the appearance map setting unit 2305, reads for each character of the retrieval keyword, a string of bits indicative of the presence/absence of the character in the XML files F0 to Fn. Since each character data item in the appearance map 510 is linked to a row/cell code via the character row/cell correspondence table, the appearance map reading unit 2603 is able to read the bit strings for the character data of the retrieval keyword corresponding to the row/cell code.

The compressed XML file identifying unit 2604 calculates the logical product of bit lines for the XML files F0 to Fn of respective characters that are read out from the appearance map 510 to identify a compressed XML file in which all character data of the retrieval keyword are present, thus narrowing down compressed XML files. An example of file narrowing down will be described.

FIG. 30 is a diagram of an example of narrowing down compressed XML files to a compressed XML file fi. As depicted in FIG. 30, a retrieval keyword is "増殖細胞", and the number of XML files is four, which means that files including characters of the retrieval keyword are narrowed down to the files having file numbers i=0 to i=3. As depicted in FIG. 30, for example, a bit string for a character "増" is [1101]. This bit string signifies that the XML files f0, f1 and f3 having file numbers 0, 1 and 3 include the character "増" while the XML files f2 having the file number 2 does not include the character "増".

The deletion flag is set to "1" by default, and the deletion flag "1" indicates that an XML file with the deletion flag "1" is still present. An XML file with the deletion flag set to "0", therefore, indicates that the XML file has been deleted. Hence, the XML file f3 is excluded from the XML files f0 to f3 that are subjected to the narrowing down process.

A narrowing down result depicted in FIG. 30 indicates the logical product (AND) of bits for each file having a file number i. According to this narrowing down result, the XML file f1 alone having the file number 1 has, for each of the characters of the retrieval keyword, the bit "1" indicative of the presence of the character. Thus, all of the characters making up the retrieval keyword, i.e., "増", "殖", "細", and "胞", are present collectively in the XML file f1 alone, and are not present collectively in any of the other XML file f0 and f2.

Hence, a file to be opened as a file-to-be-retrieved is specified as the compressed XML file fi created by compressing the XML file fi, thereby preventing the unnecessary opening and closing of files and improving the retrieval speed.

The XML file f3 with the deletion flag preset to "0" is excluded from files to be narrowed down, regardless of whether any one of the retrieval keyword characters "増", "殖", "細", and "胞" is present in the file f3, thereby preventing the unnecessary opening and closing a file, thus improves retrieval speed.

The compressed XML file extracting unit 2605 depicted in FIG. 26 extracts, from the compressed XML file group F, the XML file Fi identified by the compressed XML file identifying unit 2604. In the example depicted in FIG. 27, a compressed XML file F1 having the file number 1 is extracted. An extracted compressed XML file will hereinafter be referred to as "identified compressed XML file".

The partial decompression/comparison processing unit 2620 has a function of executing, based on the Huffman tree 1401, a binary comparison process for determining character boundary. For example, a compression code string of the specified compressed XML file and a compressed keyword are subject to binary comparison while the compression code string is partially decompressed, and the (decompressed) character string that matches is output to an output buffer. The partial decompression/comparison processing unit 2620 includes a flag/table setting unit 2621, a partial decompressing unit 2622, a binary comparison unit 2623, and a character string substituting unit 2624.

The flag/table setting unit 2621 sets various flags of the compression code table 1600. For example, when the XML tag title "副作用" is input as a retrieval condition, the decompression flag ON, indicative of the start of decompression, is set for the XML start tag "<副作用>", while the decompression flag OFF indicative of the end of decompression is set for the XML end tag "</副作用>" (see FIGS. 16 and 17). As a result, character strings to be decompressed and compared are narrowed down to the character string between the XML tag <副作用> and the XML tag </副作用> alone. This achieves faster retrieval processing.

The comparison flag is set to ON for a compression code for the head character of the retrieval keyword (see, FIG. 16). As a result, among the character strings between XML tags having set decompression flags, compression code strings to be subject to binary comparison are narrowed down to the compression code string having the comparison flag set to ON. This achieves faster retrieval processing.

When character string substitution for highlighted display, etc., is performed, the substitution flag is also set to ON (see FIG. 16). As a result, character strings to be replaced for highlighted display, etc., are narrowed down to the decompressed character string that matches. The access right flag is set based on the user ID or the type of tag.

The flag/table setting unit 2621 sets the various tables 1711 to 1714 depicted in FIG. 17. For example, the remaining portion of the retrieval keyword exclusive of the head character string of the keyword is correlated with the compression length of the compressed keyword as the remaining portion to set the compressed keyword and the compression length in the comparison table 1713. When results of the binary comparison indicate a match, the hit character string is output to the output buffer through a referencing of the comparison table 1713.

When character string substitution is performed, the post-substitution character string, the remaining portion of the retrieval keyword, and the compression length of the compressed keyword as the remaining portion of the keyword, are set together in the substitution table 1714. When the binary comparison results in a match, the post-substitution character string is output in place of the hit character string to the output buffer by a referencing of the substitution table 1713.

The partial decompressing unit 2622 reads in an identified compressed XML file to perform the partial decompression process character by character. For example, the partial decompressing unit 2622 detects a compression code for each character, and determines whether the decompression flag ON is set for the compression code. Compression codes for which the decompression flag is not set to ON are not decompressed. If the decompression flag is set to ON for a compression code, it means an XML start tag meeting the retrieval condition has been hit and hence, the character string between the tags is subjected to partial decompression processing.

If a compression code for which the decompression flag is OFF is detected, the partial decompression process is terminated. The decompressed charter string is then output to a temporary buffer. In this manner, only the character string between tags meeting the retrieval condition is partially decompressed. The details of this partial decompression process will be described with reference to FIG. 31.

The binary comparing unit 2623 compares a sequentially shifted series of compression code strings for the identified compressed XML file with the compressed keyword to perform binary comparison. For example, EXOR of the series of compression code strings and the compressed keyword is calculated to determine whether the compression code strings match the compressed keyword.

When comparison by EXOR calculation results in a match, the binary comparing unit 2623 refers to the comparison table 1713 and transfers the decompressed character string in the temporary buffer to the output buffer. Only the decompressed character string transferred to the output buffer is thus output as a retrieval candidate. The binary comparing unit 2623 does not compare each one of the series of compression code strings for the identified compressed XML file but rather only when the comparison flag ON is set for a compression code detected character by character, performs EXOR calculation for a compression code string subsequent to the detected compression code. This prevents unnecessary calculation and thereby increases retrieval speed. The details of the binary comparison process will be described with reference to FIG. 32A.

The character string substituting unit 2624 functions only when character string substitution is performed. When the comparison executed by the binary comparing unit 2623 results in a match, the character string substituting unit 2624 outputs to the output buffer, the post-substitution character string set in the substitution table 1714 in place of the hit decompressed character string. The details of this character string substitution process will be described with reference to FIG. 32B.

If clinical test data item gj composed of a charter string matching the retrieval keyword is present, the data identifying unit 2609 identifies the page number j of the clinical test data item gj and the file number i of the XML file fi having the clinical test data item gj belonging thereto.

The retrieval candidate list display unit 2610 edits the page list data 400 to extract, from among file lists in the file making up data 300, a file list listing the page number j of the clinical test data item gj and the file number i of the XML file fi having the clinical test data item gj belonging thereto and displays the extracted file list on the display 108 as a retrieval candidate list (e.g., list of headwords). For example, the file list is displayed in the retrieval result list field 2710 depicted in FIG. 29.

In FIG. 29, four retrieval results are displayed in the retrieval result list field 2710. These retrieval results are administrative numbers in an XML file describing adverse effects <副作用> of high blood pressure "高血圧".

The retrieval result selecting unit 2611 receives a retrieval candidate selected by the user, from among a list of retrieval candidates displayed by the retrieval candidate list display unit 2610. When the selected retrieval candidate is received, the retrieval result display unit 623 to be described later displays the full text contents of the retrieval candidate. In FIG. 29, a reference number "FJ020040" is received as the retrieval candidate, and detailed contents corresponding to the reference number "FJ020040" are displayed in the display field 2720.

A character boundary determining binary comparison process corresponding to the Huffman tree will be described. This process is a feature of the present embodiment. The character boundary determining binary comparison process corresponding to the Huffman tree is executed by the full text retrieval executing unit 624.

The character boundary determining binary comparison process will be described in an exemplary case of partial matching retrieval, which is ordinary character string retrieval. In the case of forward matching retrieval, reverse matching retrieval, and full text matching retrieval, the process differs slightly in the setting of the comparison flag, etc., but is identical in principle. While the process will be described in an example of processing characters, the process further applies to the processing of numerical values.

Figure 31:
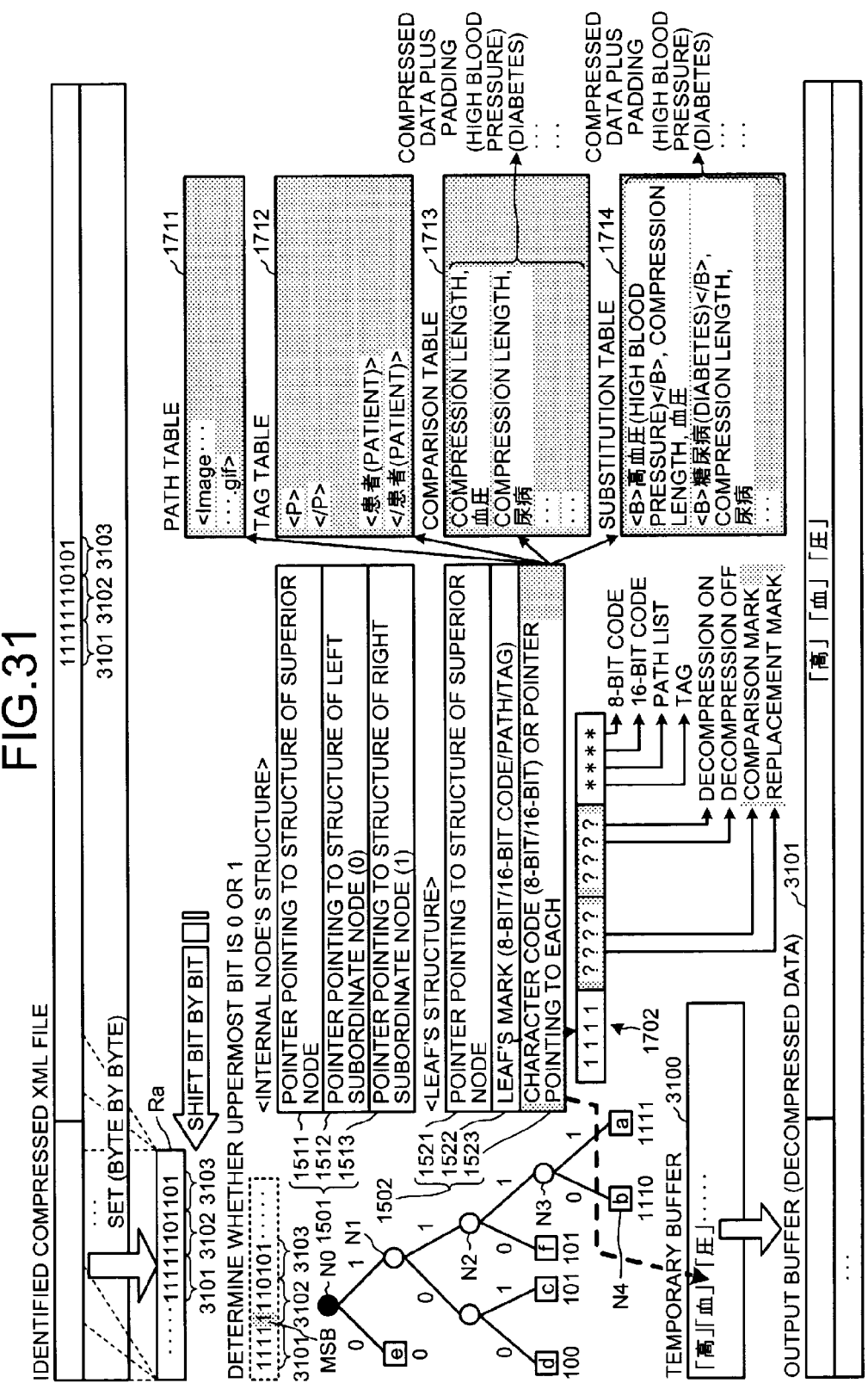
FIG. 31 is an explanatory diagram of a partial decompression process by a partial decompressing unit.

FIG. 31 is an explanatory diagram of the partial decompression process by the partial decompressing unit 2622. For simplicity, the process will be described as an example using the Huffman tree 1401 depicted in FIG. 15. The description will be made on the assumption that a retrieval keyword is "高血圧" and the symbols a, b, and c in the Huffman tree 1401 represent the characters "高", "血", and "圧", respectively. In FIG. 31, reference numerals 3101, 3102, and 3103 denote a compression code for the character "高", a compression code for the character "血", and a compression code for the character "圧", respectively.

When the retrieval keyword "高血圧" is input, the identified compressed XML file identified by the compressed XML file identifying unit 2604 is read in. This identified compressed XML file is the file to be searched that includes all the characters "高", "血", and "圧" making up the retrieval keyword. The compression code strings for the identified compressed XML file are set in a register Ra for each byte, with the head compression code string being set first. A compression code string set in the register Ra is shifted bit by bit, and another compression code string for the identified compressed XML file is set sequentially in the register Ra each time a one-byte vacancy is created.

In the register Ra, whether a bit value sequentially shifted to the uppermost bit MSB is 0 or 1 is determined. This determination of the bit value of 0 or 1 is a process of determining, among left and right branches in the Huffman tree 1401, which branch is selected by determining whether the bit value sequentially set to the uppermost bit MSB of the register Ra is 0 or 1.

For example, in the compression code string for "高血圧", the compression code for "血" is assumed to be "1110". Each of the bit values of the compression code "1110" is thus set sequentially to the uppermost bit MSB of the register Ra. Determining whether the sequentially set bit value is 0 or 1 determines the root of the Huffman tree 1401, which is regarded as the initial position. As the compression code "1110" is shifted, "1" is set to the uppermost bit three consecutive times. As a result, transition is made from the initial position, where a root node N0 is located, to right subordinate nodes N1, N2, and N3 sequentially. Because the bit value at the end of the compression code "1110" is "0", transition is made from the node N3 to a left subordinate node N4.

A structure of the node N4 stores therein not a pointer pointing to a structure of a left subordinate node but rather leaf identification information, indicating that the node N4 is not an internal node but is a leaf. In this manner, the structure of a transition destination node is referred to based on the bit value set to the uppermost bit MSB to be able to determine whether the node is an internal node or a leaf.

When a node is determined to be a leaf, character codes stored in the structure of the leaf are output sequentially to the temporary buffer 3100. As a result, the compressed character string of the identified compressed XML file is decompressed in the temporary buffer 3100.

If the character string "高血圧" decompressed in the temporary buffer 3100 matches the retrieval keyword in the binary comparison process to be described later, the character string "高血圧" is transferred to the output buffer 3101 and is deleted from the temporary buffer 3100. If the character string "高血圧" does not match the retrieval keyword as a result of binary comparison, the character string "高血圧" is deleted from the temporary buffer 3100 without being transferred to the output buffer 3101.

FIG. 32A is an explanatory diagram of the binary comparison process by the binary comparing unit 2623. When the retrieval keyword "高血圧" is input, the comparison flag for the head character "高" in the compression code table 1600 depicted in FIG. 16 is set to ON. When character string substitution is performed, the substitution flag for the head character "高" in the compression code table 1600 of FIG. 16 is also set to ON.

Of the retrieval keyword "高血圧", the remaining character string "血圧" exclusive of the head character "高" is compressed, and is set in a register Rb. A compression code string for "血圧" and the compression length of the compression code string are set together in the comparison table 1713. When character string substitution is performed, the post-substitution character string "<B>高血圧</高血圧>", the compression code string for "血圧", and the compression length of the compression code string are set together in the substitution table 1714.

In the binary comparison process, the remaining portion of the retrieval keyword that is exclusive of the head character of the keyword is compressed using the Huffman tree 1401, and is set in the register Rb. The remaining portion of the retrieval keyword and the compression length are saved together in the comparison table 1713.

In this example, the retrieval keyword "高血圧" is taken as an example, thus, the remaining portion "血圧" of the retrieval keyword that is exclusive of the head character "高" and the compression length of the remaining portion "血圧" are saved in the comparison table 1713, and a compression code string "1110101" for the remaining portion "血圧" of the retrieval keyword is set in the register Rb.

When the comparison flag ON is set for a compression code for which a leaf is detected in the register Ra, the compression code string following the compression code that is set in the register Ra is compared with the compression code string "1110101" for the remaining portion "血圧" of the retrieval keyword set in the register Rb to execute the comparison process by EXOR calculation. In comparison results 3210 depicted in FIG. 32A, reference numeral 3112 denotes a match as a result of comparison of the compression code 3102 for the character "血" and reference numeral 3113 denotes a match as a result of comparison of the compression code 3103 for the character "圧". When no match results from the comparison, the bit value takes a value of "1".

If character string substitution is not performed, since the comparison result 3210 indicates that the compression code string "1110101" for "血圧" matches, the character string "高血圧" saved in the temporary buffer 3100 is transferred to the output buffer 3101.

FIG. 32B is an explanatory diagram of a character string substitution process by the character string substituting unit 2624. As depicted in FIG. 32B, if the comparison result indicates matching, the character string decompressed in the temporary buffer 3100 is replaced with a post-substitution character string by a reference to the substitution table 1714 to write the post-substitution character string to the output buffer 3101. In FIG. 32B, the character string "高血圧" is decompressed in the temporary buffer 3100.

Meanwhile, the character string "血圧" is stored in the substitution table 1714, and matches the decompressed character string "血圧". The character string "高血圧" saved in the temporary buffer 3100 is thus replaced with the character string "<B>高血圧</B>" saved in the substitution table 1714, and the post-substitution character string "<B>高血圧</B>" is transferred to the output buffer 3101, after which the character string "高血圧" saved in the temporary buffer 3100 is deleted.

Figure 33:
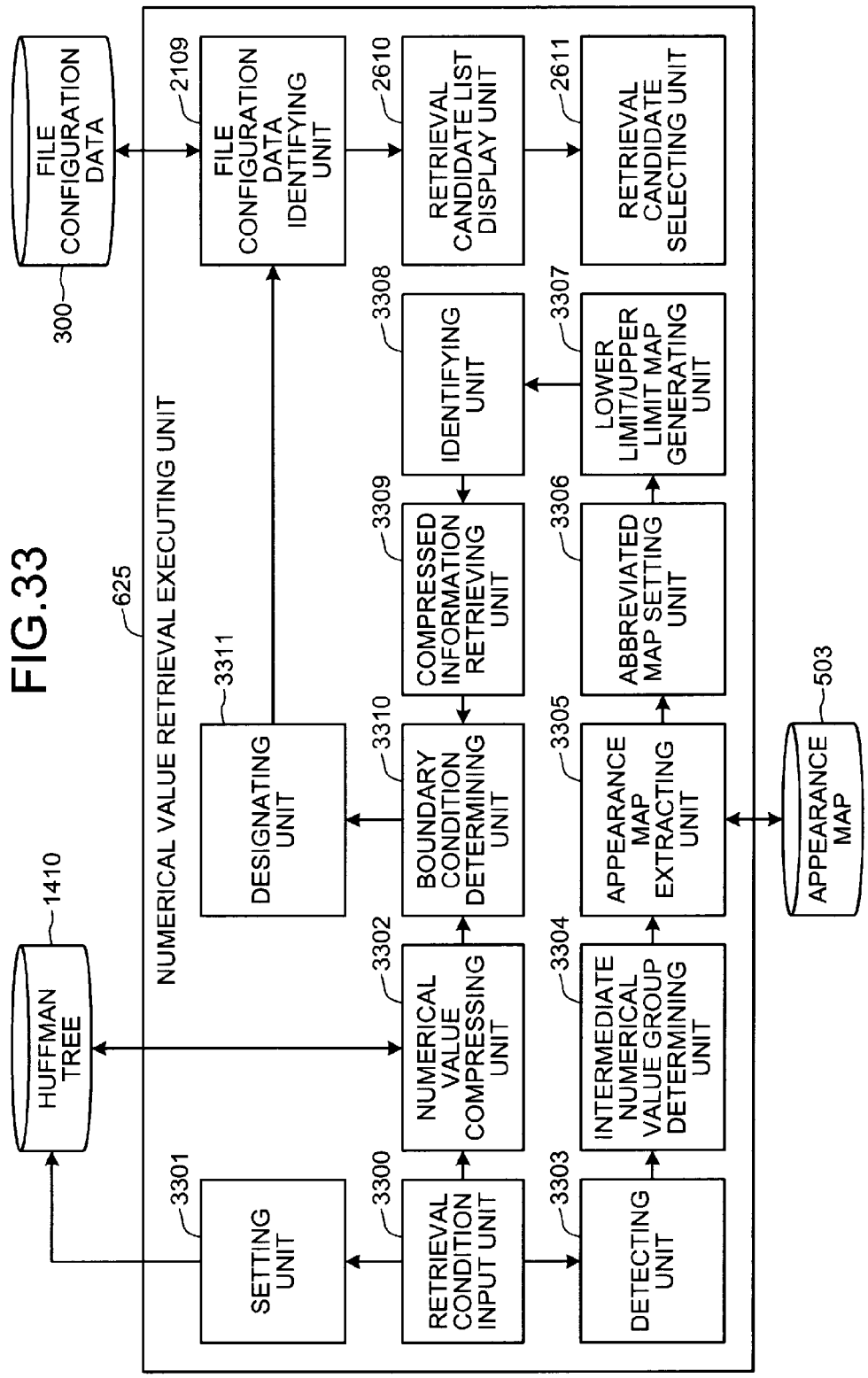
FIG. 33 is a block diagram of a functional configuration of a numerical value retrieval executing unit in the retrieval executing unit.

FIG. 33 is a block diagram of a functional configuration of the numerical value retrieval executing unit 625 in the retrieval executing unit 622. Constituent elements identical to the constituent elements depicted in FIG. 26 are denoted by the reference numerals used in FIG. 26, and are omitted in further description.

In FIG. 33, the numerical value retrieval executing unit 625 includes a retrieval condition input unit 3300, a setting unit 3301, a numerical value compressing unit 3302, a detecting unit 3303, an appearance map extracting unit 3305, an intermediate numerical value group determining unit 3304, an abbreviated map setting unit 3306, an upper limit/lower limit map generating unit 3307, an identifying unit 3308, a compressed information retrieving unit 3309, a boundary condition determining unit 3310, and a designating unit 3311.

The retrieval condition input unit 3300 receives, from the user, input of a retrieval condition for execution of numerical value retrieval. The retrieval condition is, for example, the title of an XML tag and a numerical value defining a boundary of any given numerical value range (equivalent to a retrieval keyword). A numerical value in a clinical test database storing XML format data has different meanings depending on the types of tags between which the numerical value is placed. For example, a numerical value "46" may signify the age of a patient in one case and the pulse rate in another case. Identifying the type of an XML tag is, therefore, important for better retrieval efficiency.

A numerical value range is an interval that is identified by a numerical value defining a boundary and an operator defining the boundary. A numerical value defining a boundary includes a numerical value Nx defining the lower limit of the numerical value range (lower limit numerical value) and a numerical value Ny defining the upper limit of the numerical value range (upper limit numerical value). An arithmetic symbol defining the boundary is an arithmetic symbol representing a sign of inequality, such as "≤", "<", "≥", and ">". The arithmetic symbol functions as a boundary condition for a lower limit value or an upper limit value.

If a given numerical value is Z, the retrieval condition input unit 3300 is able to set the following numerical value ranges that a numerical value N can take based on user input and initially set arithmetic symbols.

Nx<Z
Nx≤Z
Nx>Z
Nx≥Z
Nx<Z<Ny
Nx≤Z<Ny
Nx<Z≤Ny
Nx≤Z≤Ny

FIGS. 34A to 34C are explanatory diagrams of a retrieval condition input screen for execution of numerical value retrieval. FIGS. 34A to 34C depict a screen for inputting a numerical value as a retrieval keyword. In FIG. 34A, the retrieval condition input screen 3400 has an input field 3401. The input field 3401 displays a drop down menu 3402 for designating the title of an XML tag, an input space 3403 for inputting a lower limit numerical value, an input space 3403 for inputting an upper limit numerical value, a drop down menu 3405 for designating a boundary condition for a lower limit numerical value, a drop down menu 3406 for designating a boundary condition for an upper limit numerical value, and a retrieval button 3407. A retrieval result list field 3410 displays a retrieval result list (e.g., list of a patient identification codes).

The retrieval condition input screen 3400 depicted in FIG. 34B displays items that may be designated from the drop down menus 3402, 3405, and 3406. The drop down menu 3402 enables designation of tag titles, such as "血圧値", "血糖値", "年齢", and "体重". The drop down menu 3405 enables designation of a boundary condition for a lower limit numerical value ("equal to or more than or more than"). Similarly, the drop down menu 3406 enables designation of a boundary condition for an upper limit numerical value ("equal to or less than" or "less then").

The retrieval condition input screen 3400 depicted in FIG. 34C depicts a state of the screen where "血圧値" has been designated as a tag title by user operation, "150" has been input as a lower limit numerical value, and "equal to or more than" has been input as a boundary condition for the lower limit numerical value. This screen enables retrieval of data concerning a patient with "a blood pressure ("血圧値") of 150 or more".

The setting unit 3301 sets the comparison flag to ON for the structure 1700 of a leaf corresponding to a feeder serving as the head character of numerical value information. For example, as depicted in FIG. 17, the comparison flag is set to ON in the area 1702. The access right flag is also set according to the terminal of the logged-in user. For example, if a designated tag title is related to personal information, the access right flag (permission) is set to ON for the tag when the tag title is designated via a terminal of a doctor, but is not set to ON for the tag when the tag title is designated via a terminal of a clerk.

The numerical value compressing unit 3302 compresses the numerical value acquired by the retrieval condition input unit 3300. For example, as depicted in FIGS. 19A to 19D, the numerical value is compressed into compressed information including a compression code for a feeder indicative of a numerical value, a compression code for a one-byte/two-byte, a compression code for a comma presence/absence bit, a compression code for the number of places, a compression code for a numeral in each place and, when a decimal point is included, a compression code for a decimal point. A numerical value in each compressed XML file Fi is also compressed based on similar principles. A one-byte/two-byte, a comma presence/absence bit, and compression codes therefor are uniformly set to "0" (OFF). This numerical value compression may be carried out by a method of compression using the numerical value map as depicted in FIGS. 20A to 20C.

The detecting unit 3303 detects the number of places and the head number of a numerical value that defines a boundary input through the retrieval condition input unit 3300. For example, when the numerical value N is 12,345, the number of places is detected to be "5" and the head number is detected to be "1". When a decimal is included in a numerical value, the number of places following a decimal point is also counted. For example, when the numerical value N is 12,345.67, the number of places is detected to be "7" and the head number is detected to be "1". While the head place is determined to be one place at the uppermost position, the head place may be regarded as consecutive upper places starting from the head place. For example, the head number of the numerical value N (N=12,345) may be determined to be "12".

The intermediate numerical value group determining unit 3304 determines whether an intermediate numerical value group is included in a numerical value range acquired by the retrieval condition input unit 3300. An intermediate numerical value group is a numerical value group present between a numerical value group including the lower limit numerical value of the numerical value range (hereinafter "lower limit numerical value group") and a numerical value group including the upper limit numerical value of the numerical value range (hereinafter "upper limit numerical value group"). If the number of places of the lower limit numerical value group is different from the number of places of the upper limit numerical value group, the presence of the intermediate numerical value group is determined. If the number of places of both numerical value groups is the same but the head numbers of both numerical value groups are different from each other, the presence of the intermediate numerical value group is also determined.

For example, when a numerical value range is "3,700 to 6,300", a numerical value group including numerical values with four places and the head numeral of 3 are detected as a lower limit numerical value group, and a numerical value group including numerical values with four places and the head numeral of 6 are detected as an upper limit numerical value group. In this case, a numerical value group including numerical values with four places and the head numeral of 4 and a numerical value group including numerical values with four places and the head numeral of 5 are intermediate numerical value groups within the numerical value range.

Further, when a numerical value range is "3,700 to 16,300", a numerical value group including numerical values with four places and the head numeral of 3 are detected as a lower limit numerical value group, and a numerical value group including numerical values with five places and the head numeral of 1 are detected as an upper limit numerical value group. In this case, a numerical value group including numerical values with four places and the head numeral of 4 to a numerical value group including numerical values with four places and the head numeral of 9 are intermediate numerical value groups within the numerical value range.

When a numerical value range is "3,700 to 4,300", a numerical value group including numerical values with four places and the head numeral of 3 are detected as a lower limit numerical value group, and a numerical value group including numerical values with four places and the head numeral of 4 are detected as an upper limit numerical value group. In this case, there is no intermediate numerical value group within the numerical value range.

Similarly, when a numerical value range is "3,700 to 3,900", a numerical value group including numerical values with four places and the head numeral of 3 are detected as a lower limit numerical value group, and a numerical value group including numerical values with four places and the head numeral of 3 are detected as an upper limit numerical value group, i.e., the lower limit numerical value group and the upper limit numerical values group are the same numerical value group. In this case as well, there is no intermediate numerical value group within the numerical value range.

The appearance map extracting unit 3304 extracts appearance maps corresponding to the number of places and the head numeral detected by the detecting unit 3303, from among appearance maps for numerical value groups. For example, when the detecting unit 3303 detects the number of places "5" and a head numeral "1", the appearance map extracting unit 3304 extracts an appearance map for a numerical value group including numerical values with five places and the head numeral of 1. When an intermediate numerical value group is present, an appearance map for the intermediate numerical value group is also extracted.

The abbreviated map setting unit 3306 sets an abbreviated map, based on the appearance map of the intermediate numerical value group. The abbreviated map is set to calculate the logical product of the abbreviated map and the appearance map of the lower limit numerical value group, and of the abbreviated map and the appearance map of the upper limit numerical value group. Similar to the appearance map 503 of the numerical value group, the abbreviated map expresses the presence/absence of a numerical value in an XML file fi in the form of ON-bit and OFF-bit. The abbreviated map, therefore, indicates that a numerical value within the intermediate numerical value group is present in the XML file fi corresponding to an ON-bit, and that a numerical value within the intermediate numerical value group is not present in the XML file fi corresponding to an OFF-bit.

The abbreviated map is, specifically, set by calculating the logical sum of appearance maps of intermediate numerical value groups to create an intermediate result map and reversing bits in the intermediate result map. If only one appearance map of the intermediate numerical value group is present, bits in this appearance map are reversed to set the abbreviated map. If the appearance map of the intermediate numerical value group is not present, an abbreviated map having OFF-bits only is set.

The upper limit/lower limit map generating unit 3307 generates an upper limit map and a lower limit map. The lower limit map is acquired by calculating the logical product of the appearance map of the lower limit numerical value group (lower limit numerical value group map) and the abbreviated map, and the upper limit map is acquired by calculating the logical product of the appearance map of the upper limit numerical value group (upper limit numerical value group map) and the abbreviated map. This logical product calculation creates the lower limit map as a map indicative of the presence/absence of only the numerical values within the lower limit numerical value group, and generates the upper limit map as a map indicative of the presence/absence of only the numerical values within the upper limit numerical value group.

The identifying unit 3308 identifies a compressed file-to-be-retrieved having a numerical value within a numerical value group that satisfies the number of places and a head numeral detected by the detecting unit 3303, among compressed files-to-be-retrieved. For example, the identifying unit 3308 identifies the XML file fi corresponding to an ON-bit among bits in the lower limit map to extract the compressed XML file fi from the compressed XML file group F, and, in the same manner, identifies the XML file fi corresponding to an ON-bit among bits in the upper limit map to extract the compressed XML file fi from the compressed XML file group F.

The compressed information retrieving unit 3309 retrieves from the compressed XML file fi identified by the identifying unit 3308, compressed information concerning an in-file numerical value. In the compressed XML file fi, in-file numerical values are compressed into compressed information including a compression code for a feeder, a compression code for a two-byte/one-byte flag, a compression code for a comma flag, a compression code for the number of places, and a compression code for a numeral in each place. The compressed information retrieving unit 3309 detects compressed information concerning an in-file numerical value (e.g., only the compression code for the feeder) to extract the detected compressed information.

The compressed information retrieving unit 3309 detects compression information concerning an in-file numerical value (e.g., only the compression code for a feeder) to extract compression information concerning the in-file numerical value. In this process, only the compression code for a feeder with the comparison flag ON is extracted by referring to the Huffman tree 1401. This increases retrieval speed.

The boundary condition determining unit 3310 compares compressed information of a boundary-defining numerical value compressed by the numerical value compressing unit 3302 with compressed information of an in-file numerical value retrieved by the compressed information retrieving unit 3309 to determine whether the in-file numerical value satisfies a boundary condition by the boundary-defining numerical value. The boundary condition is the condition that represents the size relation between the in-file numerical value and the boundary-defining numerical value, such as the in-file numerical value being equal to or larger than, being equal to or smaller than, being larger than, or being smaller than the boundary-defining numerical value.

For example, compressed codes for numerals of the numbers of places are compared first to compare the sizes of the original pre-compression numerical values with each other. When the numbers of places are identical, compression codes for the head numerals are compared with each other to compare the sizes of the original numerical values with each other. When the head numerals are identical, numerals in the places subsequent to the head place are compared sequentially with each other to compare the sizes of the original numerical values with each other. In this way, whether the in-file numerical value satisfies the boundary condition by the boundary-defining numerical value is determined.

Because two-byte/one-byte bits, comma presence/absence bits, and respective compression codes therefor are all set to "0" (OFF) in numerical value compression, the two-byte/one-byte bits, comma presence/absence bits, and compression codes therefor are all set to "0" (OFF) in compressed information when compressed information of the in-file numerical value is compared with compressed information of the boundary-defining numerical value. This allows execution of numerical value retrieval without considering a difference in two-byte/one-byte and/or the presence/absence of a comma.

The designating unit 3311 designates the compressed file-to-be-retrieved Fi identified by the identifying unit 3308 to be a file having a numerical value within the numerical value range, based on a determination result given by the boundary condition determining unit 3310. For example, when the in-file numerical value satisfies the boundary condition by the boundary-defining numerical value, the designating unit 3311 designates the compressed file-to-be-retrieved Fi identified by the identifying unit 3308 to be the file having the numerical value within the numerical value range. In this designating process, a lower limit comparison result map and an upper limit comparison result map are used, which maps are expressed by bit strings corresponding to XML files, as the appearance maps are. All bits in the maps are set OFF in the initial setting.

In the compressed XML file fi, when the in-file numerical value satisfies the boundary condition by the lower limit numerical value, a bit in the lower limit comparison result map that corresponds to the compressed XML file fi is set ON. Similarly, when the in-file numerical value satisfies the boundary condition by the upper limit numerical value, a bit in the upper limit comparison result map that corresponds to the compressed XML file fi is set ON.

The designating unit 3311 then calculates the logical sum of the finally acquired lower limit comparison result map, the upper limit comparison result map, and an intermediate result map, if it is present, to designate the compressed XML file fi having the numerical value within the numerical value range.

When the designating unit 3311 designates the compressed XML file fi having the numerical value within the numerical value range, the data identifying unit 2609 identifies the page number j of clinical data item gj having the in-file numerical value satisfying the boundary condition by the boundary-defining numerical value, and the file number i of the XML file fi to which the clinical data item gj belongs.

An exemplary case will be described, in which the lower limit numerical value and the upper limit numerical value that define a numerical value range have the same number of places and different numerals at the head places. FIGS. 35A to 35D are explanatory diagrams of examples of size comparison in a numerical value range. In the examples, a numerical value range "3,700 to 6,300 yen" is given and a compressed XML file fi having an amount of money (numerical value) within the range specified by the numerical value range is retrieved. Numerical value information of the lower limit numerical value "3,700 yen" and that of the upper limit numerical value "6,300 yen" are both compressed by the compressing process of FIG. 16C.

As depicted in FIG. 35A, with respect to the numerical value range "3,700 yen to 6,300 yen", an appearance map of an intermediate numerical value group is extracted first. For example, a four-place/head numeral 4 map M44 and a four-place/head numeral 5 map M45 are extracted as appearance maps of the intermediate numerical value group, the maps M44 and M45 being present between a four-place/head numeral 3 map M43 equivalent to an appearance map of a lower limit numerical value group and a four-place/head numeral 6 map M46 equivalent to an appearance map of an upper limit numerical value group.

The four-place/head numeral 3 map M43 represents the presence/absence of an XML file fi having a numerical value with four places and the head numeral of 3. The four-place/head numeral 4 map M44 represents the presence/absence of an XML file fi having a numerical value with four places and the head numeral of 4. The four-place/head numeral 5 map M45 represents the presence/absence of an XML file fi having a numerical value with four places and the head numeral of 5. The four-place/head numeral 6 map M46 represents the presence/absence of an XML file fi having a numerical value with four places and the head numeral of 6.

The four-place/head numeral 3 map M43 and the four-place/head numeral 6 map M46 are the appearance maps that are used for size comparison. The four-place/head numeral 4 map M44 and the four-place/head numeral 5 map M45 are subjected to logical sum calculation to create an intermediate result map M01, which represents the presence/absence of an XML file fi having numerical values 4000 to 5999. Bits on this intermediate result map M01 are reversed to acquire an abbreviated map M02.

As depicted in FIG. 35B, the logical product of the four-place/head numeral 3 map M43 and the abbreviated map M02 of FIG. 35A is calculated to acquire a lower limit map M03. Calculating the logical product of the four-place/head numeral 3 map M43 and the abbreviated map M02 eliminates an XML file having a numerical value within the intermediate numerical value group.

A compressed XML file fi with an ON-bit is extracted from the lower limit map M03. The extracted compressed XML file fi is then searched from the head thereof to find a compression code "1011" for a feeder ("x'B'" in FIG. 35B). When the compression code "1011" for the feeder is found, compression information 3501 having the compression code "1011" for the feeder at its head is read out. When a two-byte/one-byte bit and a comma presence/absence bit in the compression information 3501 are respectively "1", both bits are turned to "0" in masking conversion. The compressed information resulting from the masking conversion is referred to as compressed information to-be-compared 3510.

The compressed information to-be-compared 3510 acquired by compressing numerical value information "3,300 yen" in the compressed XML file fi is then compared with lower limit compressed information 3502 acquired by compressing lower limit numerical value information "3,700 yen". First, compression codes for feeders, for the number of places, and for the head numerals of the compressed information to-be-compared 3510 and the lower limit compressed information 3502 are compared with each other for matching. If, at this stage, any one type of compressed codes do not match, the next feeder in the compressed XML file fi is retrieved.

When the compression codes for the feeders match, it indicates that the compressed information to-be-compared 3510 and the lower limit compressed information 3502 are the same type of numerical value information. When the numbers of places match, it indicates that the compressed information to-be-compared 3510 is at least a compressed form of a numerical value of a four-digit number. When the head numerals match, it indicates that the compressed information to-be-compared 3510 is at least a compressed form of a numerical value with the head numeral of "3". When all of the compression codes for the feeders, the number of places, and the head numerals match, therefore, compression codes for numerals in the same place are compared in size.

In this example, compression codes for the second numerals are compared revealing that the lower limit numerical value information "3,700 yen" is larger than the numerical value information "3,300 yen" in the compressed information to-be-compared 3510. In this case, the bit corresponding to the compressed XML file fi remains "0" in the lower limit comparison result map M04. Subsequently, the next feeder in the compressed XML file fi is retrieved. When numerical value information equal to or larger than the lower limit numerical value information "3,700 yen" is present, the bit corresponding to the compressed XML file fi is turned to "1" in the lower limit comparison result map M04.

This comparison process is carried out on each of the compressed XML files f0 to Fn for which a bit is ON in the lower limit map M03 to acquire the lower limit comparison result map M04. In this manner, the compressed XML file fi having a numerical value with four places and the head numeral of "3" is extracted from the lower limit map M03. This enables the XML file fi to be retrieved in its compressed form.

Figure 35C:
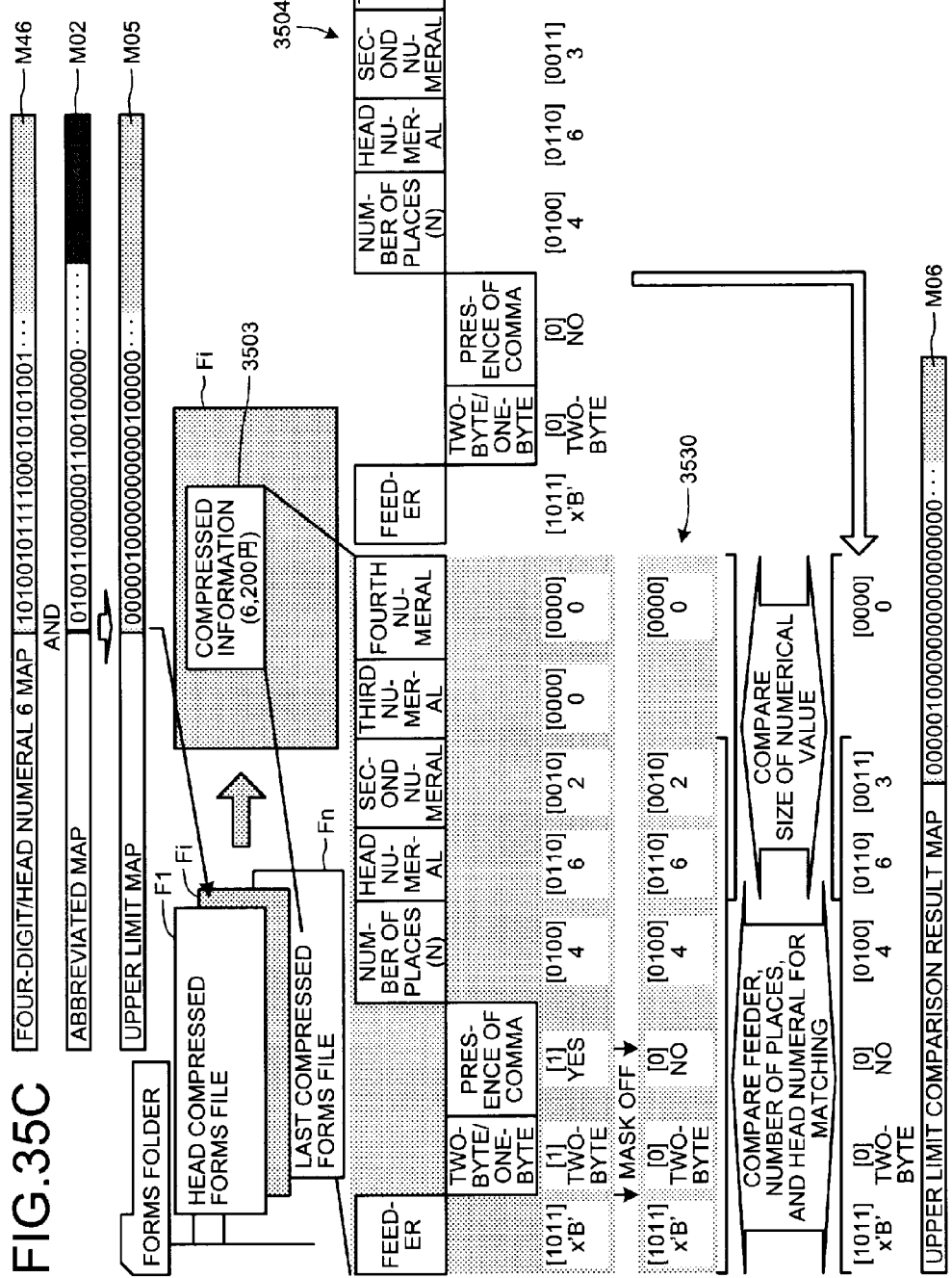

As depicted in FIG. 35C, the logical product of the four-place/head numeral 6 map M46 and the abbreviated map M02 of FIG. 35A is calculated to acquire an upper limit map M05. The abbreviated map M02 and the logical product thereof eliminate an XML file having a numerical value within the intermediate numerical value group.

A compressed XML file fi with an ON-bit is extracted from the upper limit map M05. The extracted compressed XML file fi is then searched from the head thereof to find a compression code "1011" for a feeder ("x'B'" in FIG. 35C). When the compression code "1011" for the feeder is found, compressed information 3503 having the compression code "1011" for the feeder at its head is read out. When a two-byte/one-byte bit and a comma presence/absence bit in the compressed information 3503 are respectively "1", both bits are turned to "0" in masking conversion. The compressed information resulting from the masking conversion is referred to as compressed information to-be-compared 3530.

The compressed information to-be-compared 3530 acquired by compressing numerical value information "6,200 yen" in the compressed XML file fi is then compared with upper limit compressed information 3504 acquired by compressing upper limit numerical value information "6,300 yen". First, compression codes for feeders, for the number of places, and for the head numerals of the compressed information to-be-compared 3530 and the upper limit compressed information 3504 are compared with each other for matching. If, at this stage, any one type of compressed codes do not match, the next feeder in the compressed XML file fi is retrieved.

When the compression codes for the feeders match, it indicates that the compressed information to-be-compared 3530 and the upper limit compressed information 3504 are the same type of numerical value information. When the numbers of places match, it indicates that the compressed information to-be-compared 3530 is at least a compressed form of a numerical value of a four-digit number. When the head numerals match, it indicates that the compressed information to-be-compared 3530 is at least a compressed form of a numerical value with the head numeral of "6". When all of the compression codes for the feeders, the number of places, and the head numerals match, therefore, compression codes for numerals in the same place are compared in size.

In this example, compression codes for the second numerals are compared revealing that the upper limit numerical value information "6,300 yen" is larger than the numerical value information "6,200 yen" in the compressed information to-be-compared 3530. In this case, the bit corresponding to the compressed XML file fi is changed to "1" in the upper limit comparison result map M06.

This comparison process is carried out on each of the compressed XML files fi for which a bit is ON in the upper limit map M05 to acquire the upper limit comparison result map M06. In this manner, the compressed XML file fi having a numerical value with four places and the head numeral of "6" is extracted from the upper limit map M05. This enables the XML file fi to be retrieved in its compressed form.

Figure 35D:
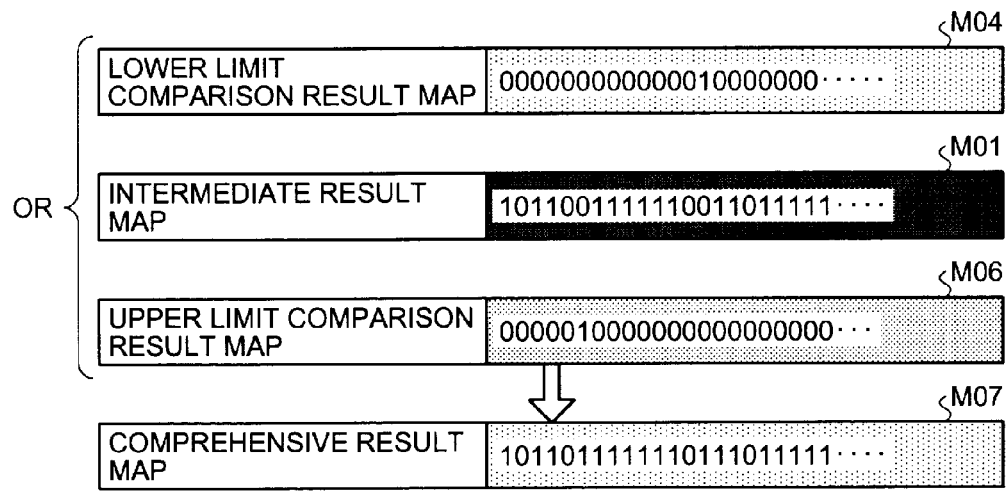

As depicted in FIG. 35D, the logical sum of the lower limit comparison result map M04, the intermediate result map M01, and the upper limit comparison result map M06 is calculated to acquire a comprehensive result map M07. Hence, an XML file fi having numerical value information within the numerical value range "3,700 yen to 6,300 yen" is specified remaining in a compressed form.

In the examples depicted in FIGS. 35A to 35D, the lower limit numerical value and the upper limit numerical value that define the numerical value range have the same number of places and different numerals in the head places. The above size comparison, however, may also be carried out even when the number of places of the upper limit numerical value is larger (or the number of places of the lower limit numerical value is smaller). For example, when a numerical value range is "3,700 yen to 64,000 yen", four-place/head numeral 4 map to four-place/head numeral 9 map and five-place/head numeral 1 map to five-place/head numeral 5 map are extracted as appearance maps of an intermediate numerical value group.

When a numerical value range is "3,700 yen to 3,900 yen", "3,700 yen to 4,500 yen", etc., an intermediate numerical value group is not present, so that the intermediate result map M01 is not present. In this case, therefore, all bits in the abbreviated map M02 are set to OFF. Because of the absence of the intermediate result map M01, the comprehensive result map M07 is acquired by calculating the logical sum of the lower limit comparison result map M04 and the upper limit comparison result map M06.

Figure 36:
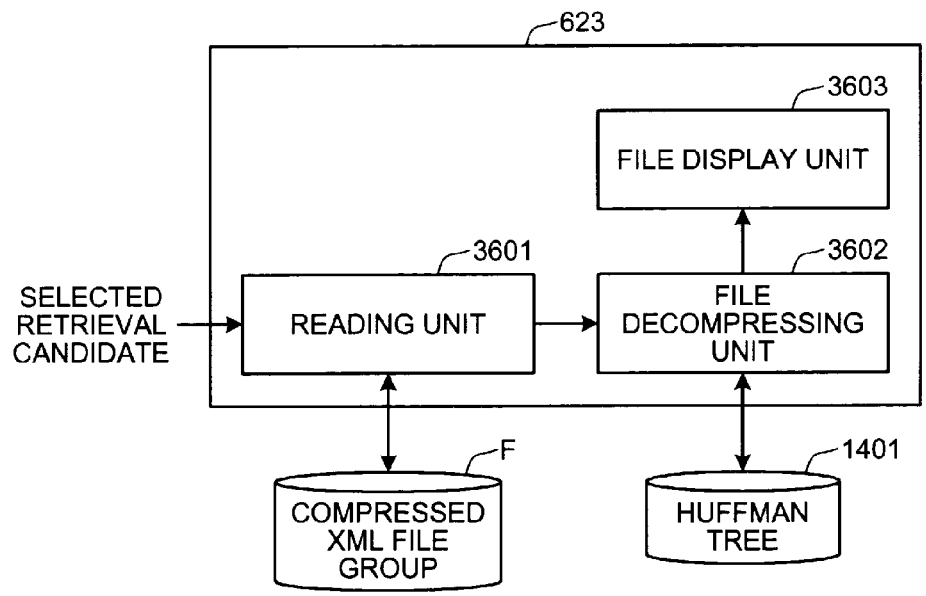
FIG. 36 is a functional diagram of a retrieval result display unit depicted in FIG. 6.

FIG. 36 is a functional diagram of the retrieval result display unit 623 depicted in FIG. 6. As depicted in FIG. 36, the retrieval result display unit 623 includes a reading unit 3601, a file decompressing unit 3602, and a file display unit 3603.

The file decompressing unit 3602 reads from a compressed XML file fi in the compressed XML file group F, item data, which is a retrieval candidate selected via the retrieval candidate selecting unit 2111. The file decompressing unit 3602 decompresses the item data read out by the reading unit 3601, using the Huffman tree 1801. The file display unit 3603 displays the item data decompressed by the file decompressing unit 3602 as a retrieval result.

Figure 37:
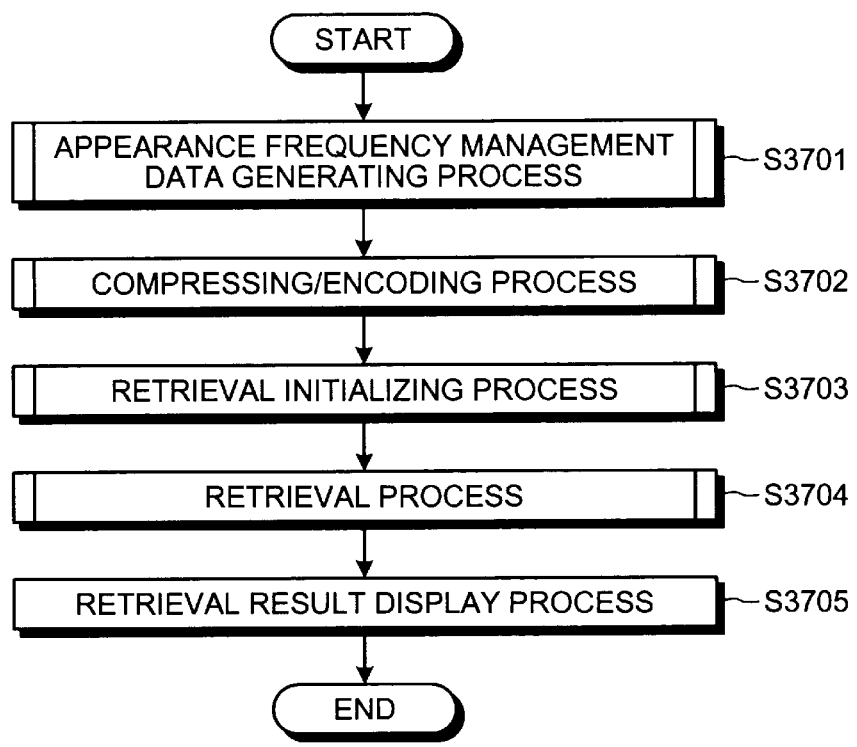
FIG. 37 is a flowchart of an information retrieval process by the information retrieving apparatus.

FIG. 37 is a flowchart of an information retrieval process by the information retrieving apparatus 600 according to the embodiment. As depicted in FIG. 37, the appearance frequency management data generating unit 612 executes an appearance frequency management data generating process (step S3701).

The compressing/encoding unit 613 then executes a compressing/encoding process (step S3702). Subsequently, the retrieval initializing unit 621 executes a retrieval initializing process (step S3703). The retrieval executing unit 622 then executes a retrieval process (step S3704).

Finally, the retrieval result display unit 623 executes a retrieval result display process (step S3705). In the retrieval result display process, a retrieval candidate (item data) selected from a retrieval candidate list is read out from the compressed XML file fi, and is decompressed using the Huffman tree 1401 to display the full text of the item data as a retrieval result.

Figure 38:
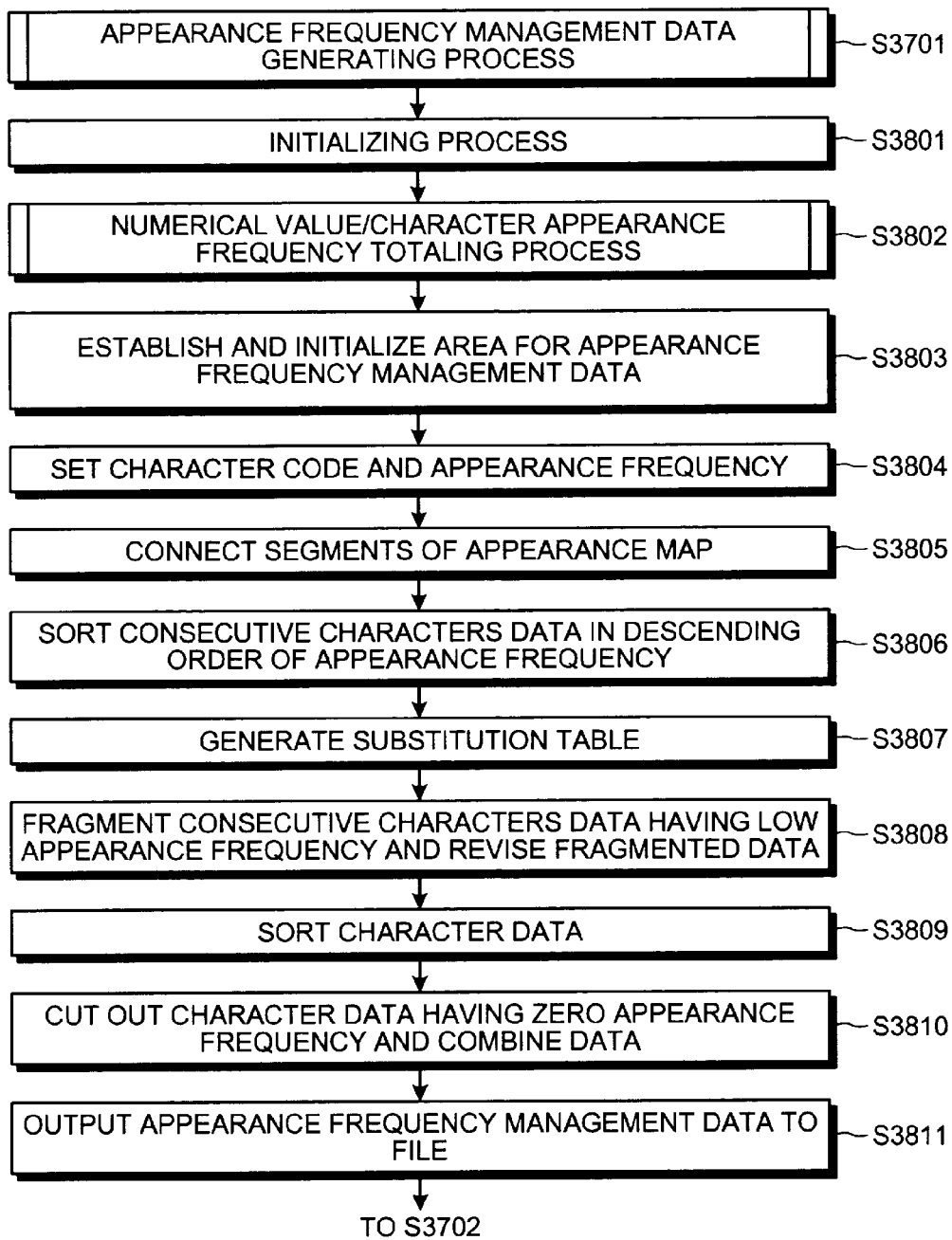
FIG. 38 is a flowchart of an appearance frequency management data generating process (step S3701) of FIG. 37.

FIG. 38 is a flowchart of the appearance frequency management data generating process (step S3701) of FIG. 37. As depicted in FIG. 38, an initializing process is executed (step S3801). Specifically, a totaling area corresponding to the row/cell code of 8-bit/16-bit numerical value/character data, consecutive characters data, and binary data is established, and segments, etc., of the appearance frequency and the appearance map are initialized. The code for numerical value/character data is set, and various counters are initialized.

A numerical value/character appearance frequency totaling process is then executed (step S3802). A detailed procedure of the numerical value/character appearance frequency totaling process will be described later. Following the numerical value/character appearance frequency totaling process, an area for the appearance frequency management data 500 is established and initialized (step S3803), and the character code and appearance frequency of 8-bit/16-bit numerical value/character data, consecutive characters data, and binary data is set (step S3804).

Respective segments of the appearance map are linked (step S3805), and consecutive characters data in the consecutive characters area are sorted in descending order of appearance frequency (step S3806) to select 256 types of consecutive characters data. This reduces the volume of consecutive characters data.

Subsequently, a consecutive characters/non-standard character substitution process is carried out, and the substitution table 640 is generated (step S3807). Specifically, consecutive characters data is substituted with non-standard character data in descending order of appearance frequency to generate consecutive characters/non-standard character data and the substitution table 640.

Consecutive-character data with a low appearance frequency, that is, consecutive characters data not substituted with non-standard character data, is fragmented into single character data, which are allocated to the corresponding areas in a revision process (step S3808). Specifically, consecutive-character data with a low appearance frequency is divided into phonogramic data, the frequency of which is subject to addition and the appearance map of which is subject to logical OR calculation.

Subsequently, numerical value/character data is sorted in descending order of appearance frequency (step S3809), and numerical value/character data having zero frequency is cut out, and then consecutive characters/non-standard character data and binary data is combined together (step S3810). The appearance frequency management data 500 resulting from the joining is output to a file (step S3811), after which the procedure proceeds to step S3702.

Figure 39:
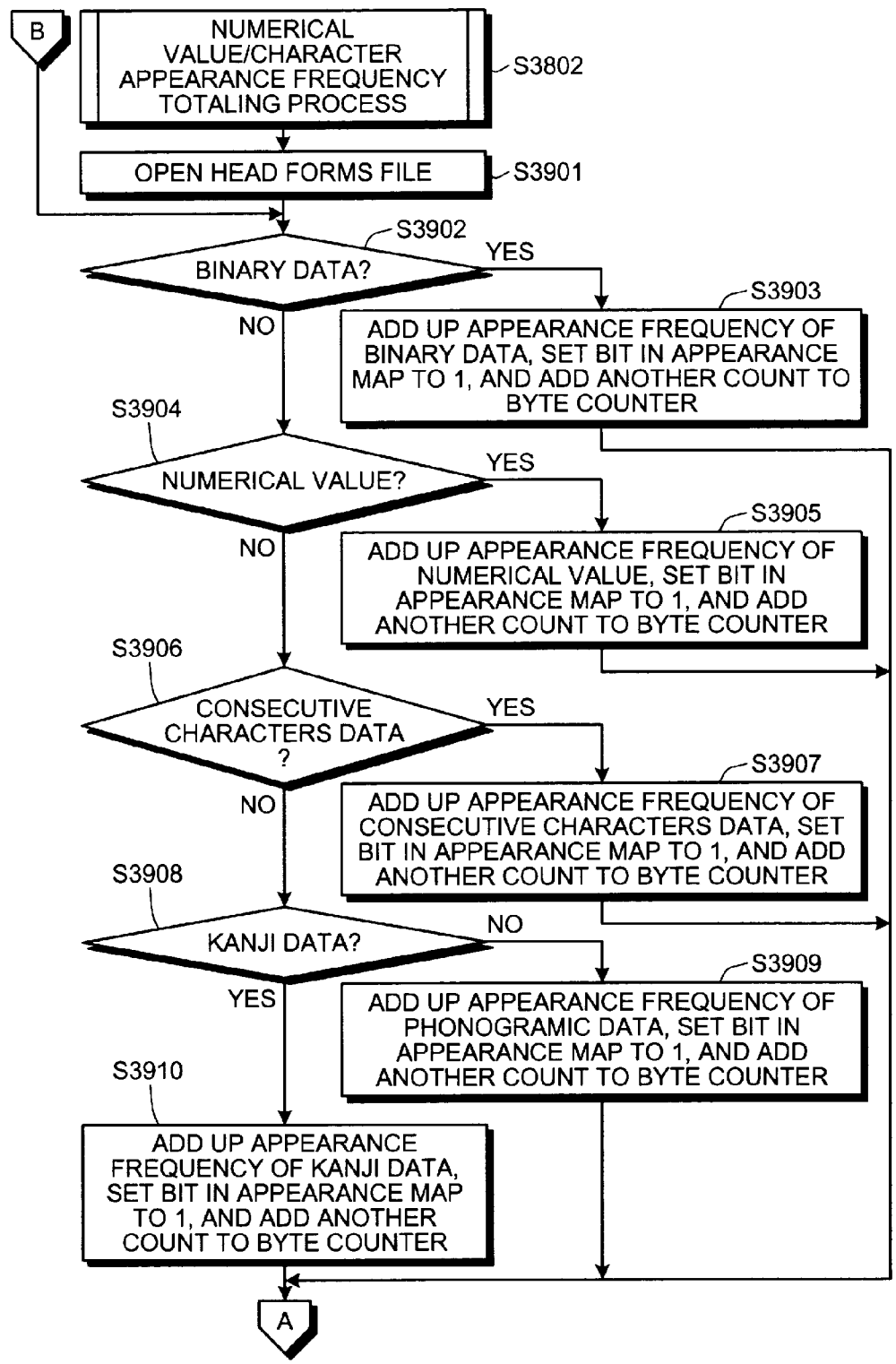
FIG. 39 is a flowchart (first half) of a numerical value/character appearance frequency totaling process (step S3802)

A detailed procedure of the above numerical value/character appearance frequency totaling process (step S3802) will be described. FIG. 39 is a flowchart (first half) of the numerical value/character appearance frequency totaling process (step S3802). As depicted in FIG. 39, the head XML file f0 is opened (step S3901).

Data is extracted sequentially from the opened XML file. When extracted data is binary data (step S3902: YES), the appearance frequency of the binary data is added, and the bit corresponding to the opened file on the appearance map of the binary data is set to "1", and then a byte counter adds an additional count (step S3903), after which the procedure proceeds to step S3911 of FIG. 40.

When extracted data is not binary data at step S3902 (step S3902: NO), whether the extracted data is a numerical value is determined (step S3904). For example, the extracted data of a numerical string consisting of numerals is determined to be a numerical data. The extracted data of a numerical string including a comma "," and a decimal point "." in addition to numerals is also determined to be a numerical value.

When the extracted data is a numerical value (step S3904: YES), the appearance frequency of the numerical value is added, and the bit corresponding to the opened file on the appearance map of the numerical value is set to "1", and then the byte counter adds an additional count (step S3905), after which the procedure proceeds to step S3911 of FIG. 40.

When the extracted data is not a numerical value at step S3904(step S3904: NO), whether the extracted data is consecutive characters data is determined (step S3906). When the extracted data is consecutive characters data (step S3906: YES), the appearance frequency of the consecutive characters data is added, and the bit corresponding to the opened file on the appearance map of the consecutive characters data is set to "1", and then the byte counter adds an additional count (step S3907), after which the procedure proceeds to step S3911 of FIG. 40.

When the extracted data is not consecutive character data at step S3906 (step S3906: NO), whether the extracted data is kanji data is determined (step S3908). When the extracted data is not kanji data (step S3908: NO), the extracted data is phonogramic data. Accordingly, the appearance frequency of the phonogramic data is added, and the bit corresponding to the opened file on the appearance map of the phonogramic data is set to "1", and then the byte counter adds an additional count (step S3909), after which the procedure proceeds to step S3911 of FIG. 40.

When the extracted data is kanji data at step S3908 (step S3908: YES), the appearance frequency of the kanji data is added, and the bit corresponding to the opened file on the appearance map of the kanji data is set to "1", and then the byte counter adds an additional count (step S3910), after which the procedure proceeds to step S3911 of FIG. 40.

Figure 40:
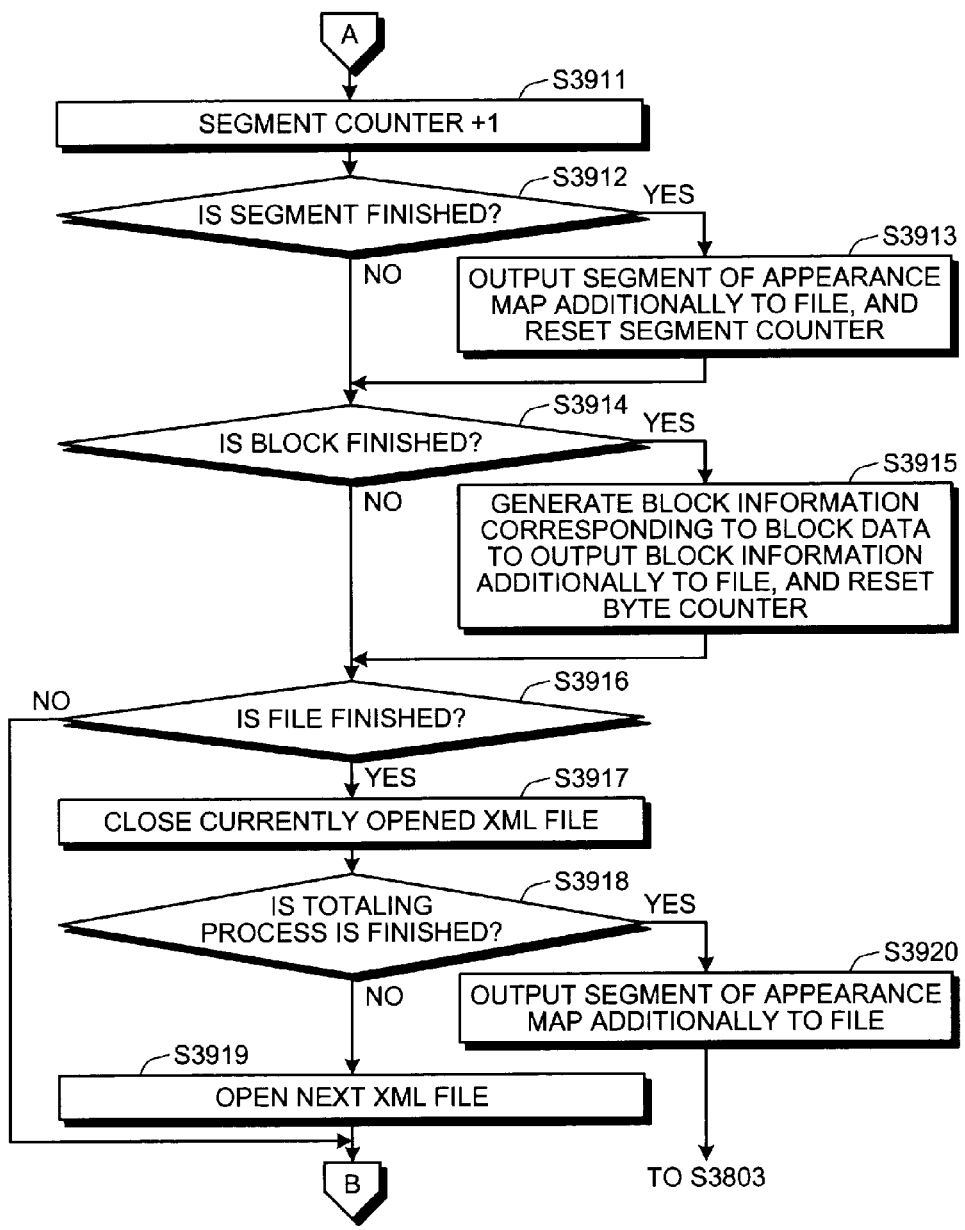
FIG. 40 is a (second half) flowchart of the numerical value/character appearance frequency totaling process (step S3802)

FIG. 40 is a (second half) flowchart of the numerical value/character appearance frequency totaling process (step S3802). As depicted in FIG. 40, a segment counter for segments of the appearance map adds an additional count (step S3911), and whether a segment is finished, that is, whether the totaling process with respect to the segments is finished is determined (step S3912). When the totaling process with respect to the segments is finished (step S3912: YES), the segment of the appearance map is output additionally to the file, and the segment counter is reset (step S3913), after which the procedure proceeds to step S3914.

When the totaling process on the segments is not finished (step S3912: NO) or after execution of step S3913, whether a block is finished, e.g., whether the total number of numerical value/characters reaches 4,000 characters is determined (step S3914).

When the block is finished (step S3914: YES), block information made up of the file number i of a XML file fi having the block data, and the block number m, offset, number of characters, and length of the block data is generated, and is output additionally to the file, and the byte counter is reset (step S3915), after which the procedure proceeds to step S3916.

When the block is not finished (step S3914: NO) or after execution of step S3915, whether the file is finished, that is, whether the totaling process with respect to the currently opened XML file fi is finished is determined (step S3916). When the totaling process with respect to the currently opened XML file fi is not finished (step S3916: NO), the procedure returns to step S3902 of FIG. 39, at which the next data is extracted, and the type of the extracted data is specified to perform the totaling process (steps S3902 to S3910).

When the totaling process on the currently opened XML file is over at step S3916(step S3916: YES), whether the totaling process comes to an end is determined, and the end of the totaling process leads to closing of the currently opened XML file fi (step S3917). Subsequently, whether the totaling process on each of the XML files f0 to Fn has been completed is determined (step S3918).

When the totaling process on each of the XML files f0 to Fn has not been completed (step S3918: NO), a XML file fi having the next file number i (i=i+1) is opened (step S3919). The procedure then returns to step S3902 of FIG. 39, at which the next data is extracted, and the type of the extracted data is specified to perform the totaling process (steps S3902 to S3910).

When the totaling process on each of the XML files f0 to Fn has been completed as determined at step S3918 (step S3918: YES), the segment of the appearance map 510 is output additionally to the file (step S3920), after which the procedure proceeds to step S3903 to end a series of processes.

Figure 41:
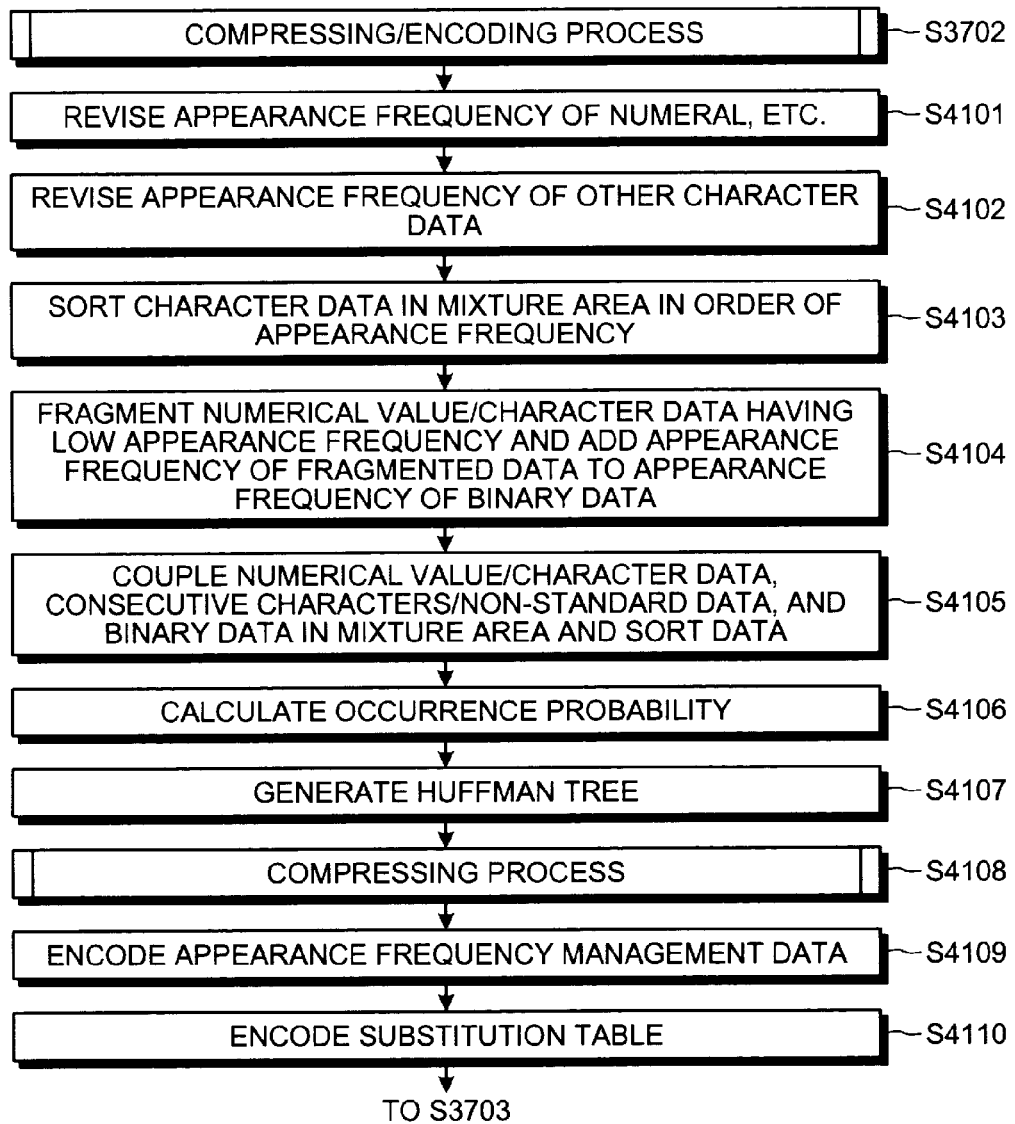
FIG. 41 is a flowchart of a compressing/encoding process (step S3702) of FIG. 37.

FIG. 41 is a flowchart of the compressing/encoding process (step S3702) of FIG. 37. As depicted in FIG. 41, the appearance frequencies of a numeral, a decimal point, and a feeder (hereinafter "numeral, etc.") are revised (step S4101), and the appearance frequency of other character data is also revised (step S4102).

Subsequently, numerical value/character data in the mixture area 812 are sorted in the order of appearance frequency (step S4103). Numerical value/character data with a low appearance frequency is fragmented into 8-bit data, of which the appearance frequency is added to the appearance frequency of binary data corresponding to the 8-bit data (step S4104). Numerical value/character data, consecutive characters/non-standard data, and binary data in the mixture area 812 are linked, and sorted in the order of appearance frequency (step S4105).

Subsequently, the occurrence probability of each type of sorted numerical value/character data is calculated based on the revised appearance frequency (step S4106). Based on the calculated occurrence probability, a Huffman tree common to 8-bit/16-bit numerical value/character data is generated (step S4107).

A compressing process of compressing each of the XML file is then carried out (step S4108). A specific procedure of this compressing process will be described later. The appearance frequency management data 500 is encoded (step S4109). Specifically, an encoding area of the appearance frequency management data 500 (area for numerical value/character data and appearance frequency) is encoded through exclusive-OR (EXOR), using a master key.

The substitution table 640 is then encoded (step S4110). Specifically, an encoding area of the substitution table 640 is encoded through exclusive-OR (EXOR), using a master key. Subsequently, the procedure proceeds to the retrieval initializing process (step S3703) to end a series of processes.

Figure 42:
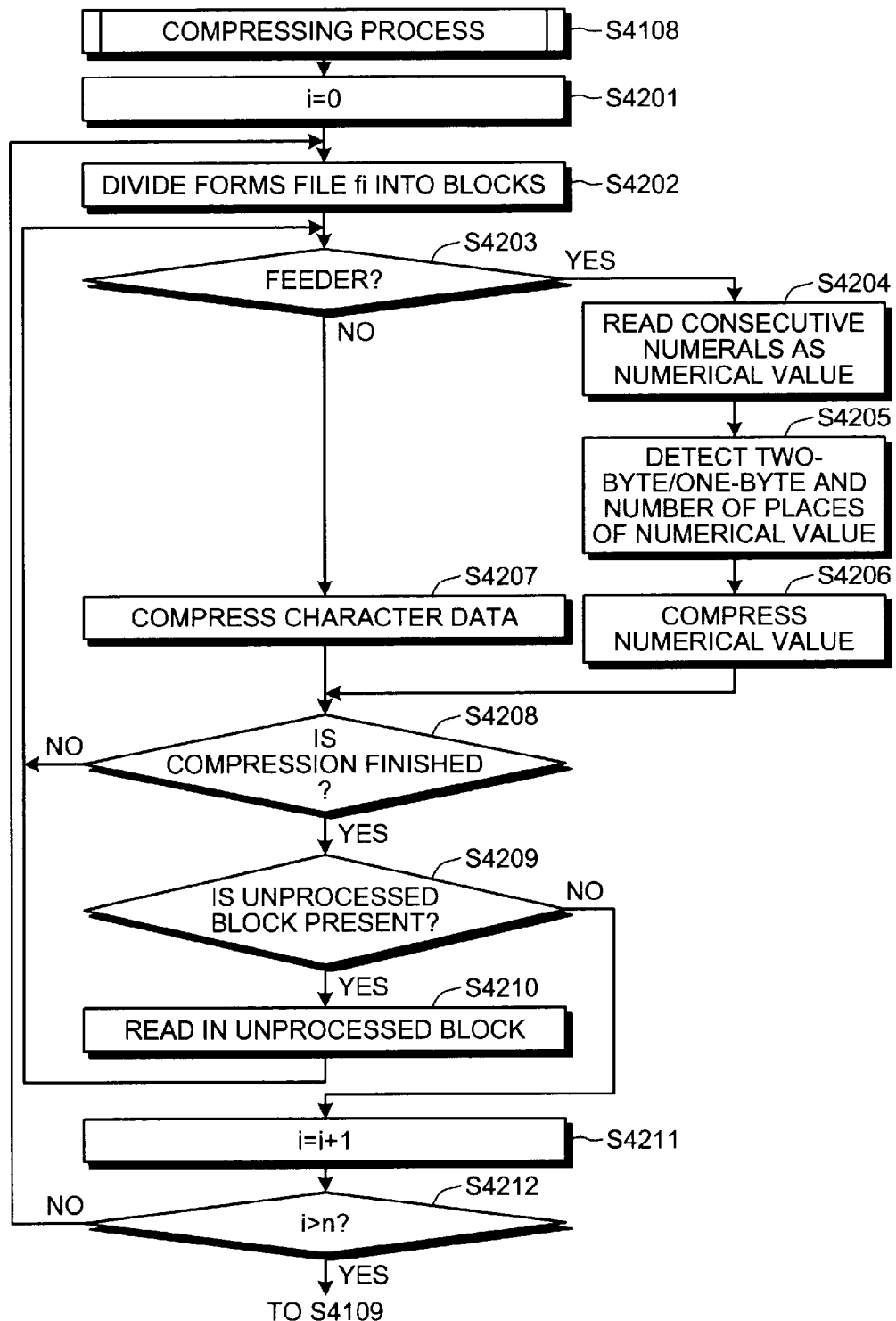
FIG. 42 is a flowchart of a compressing process of step S4108 depicted in FIG. 41.

FIG. 42 is a flowchart of the compressing process of step S4108 depicted in FIG. 41. First, the file number i is set to 0 (step S4201), and the XML file i is divided into blocks of, for example, 4,000 characters (step S4202). Subsequently, data in the XML file i are read in sequentially, and whether read data is a feeder is determined (step S4203).

When the read data is determined to be the feeder (step S4203: YES), a series of numerals following the feeder are read in as a numerical value (step S4204), and the two-byte or one-byte and the number of places of the numerical value are detected (step S4205). The numerical value is then compressed using the Huffman tree (step S4206), after which the procedure proceeds to step S4208.

When the read data is determined to be not the feeder (step S4203: NO), the data is other character data, which is then compressed using the Huffman tree 1401 (step S4207), after which the procedure proceeds to step S4208.

At step S4208, whether the compression process in the current block is over is determined (step S4208). If the compression process is not finished (step S4208: NO), the procedure returns to step S4203, at which the next data is read in. If the compression process is over (step S4208: YES), whether an unprocessed block is present is determined (step S4209).

When an unprocessed block is present (step S4209: YES), the unprocessed block is read in (step S4210), and the procedure returns to step S4203, at which data is read in. When an unprocessed block is not present (step S4209: NO), the file number i is increased by 1 (step S4211), and whether i>n is satisfied is determined (step S4212).

When i>n is not satisfied (step S4212: NO), the procedure returns to step S4202, at which the next XML file is divided into blocks. When i>n is satisfied (step S4212: YES), the procedure proceeds to step S4109 of FIG. 41. Hence, a series of processes making up the compressing process are ended.

Figure 43:
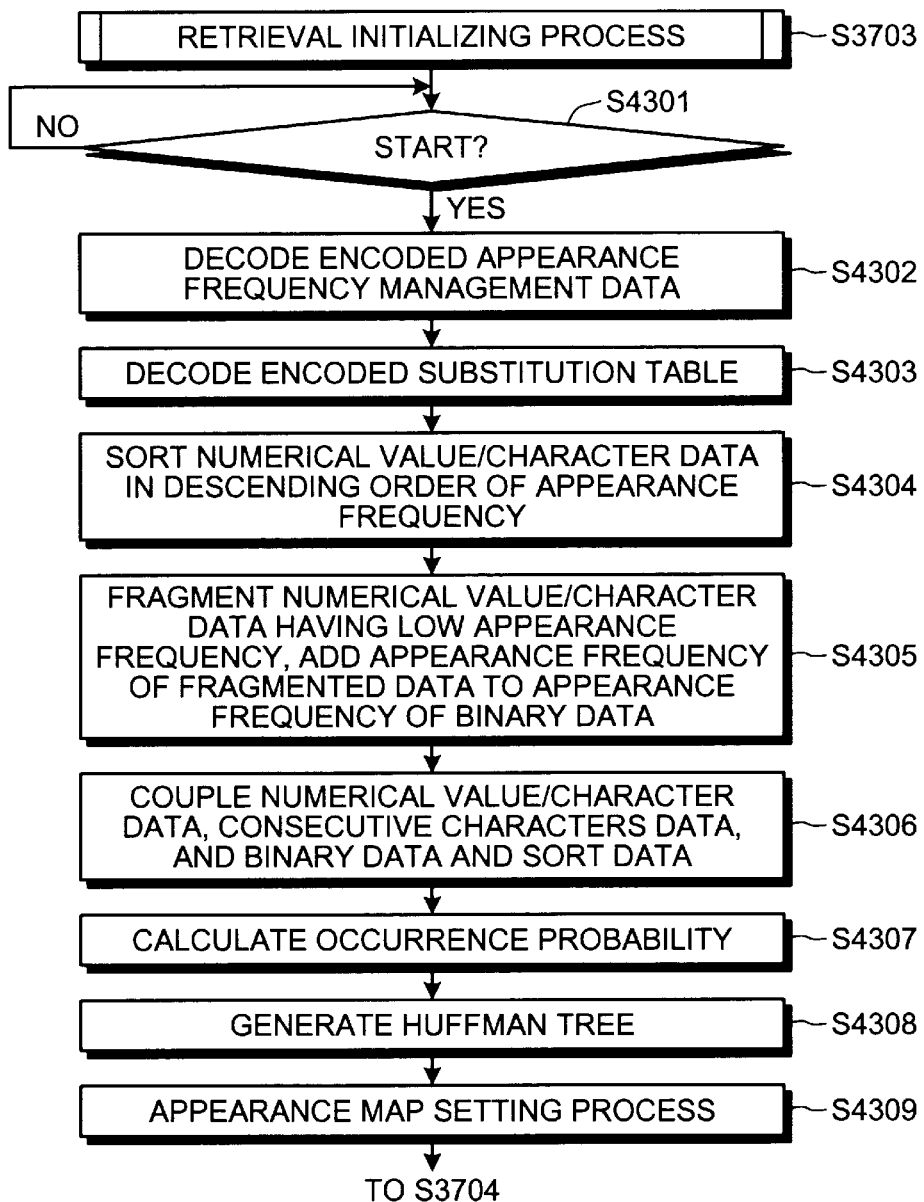
FIG. 43 is a flowchart of a retrieval initializing process (step S3703) depicted in FIG. 37.

FIG. 43 is a flowchart of the retrieval initializing process (step S3703) depicted in FIG. 37.

As depicted in FIG. 43, the start of the retrieval initializing process is waited for (step S4301: NO). When the retrieval initializing process starts (step S4301: YES), the encoded appearance frequency management data 650 encode by the compressing/encoding process is decoded (step S4302). Specifically, the encoding area of the encoded appearance frequency management data 650 (area for numerical value/character data and appearance frequency) is decoded through exclusive-OR (EXOR), using the master key used in the encoding process.

The encoded substitution table 660 is decoded (step S4303). Specifically, the encoding area of the encoded substitution table 660 is decoded through exclusive-OR (EXOR), using the master key used in the encoding process.

Processes identical to the processes at steps S4101 to S4105 in the compressing/encoding process are then carried out. That is, numerical value/character data is sorted in descending order of appearance frequency (step S4304), and numerical value/character data having a low appearance frequency is fragmented into 8-bit data, of which the appearance frequency is added to the appearance frequency of binary data corresponding to the 8-bit data (step S4305).

Numerical value/character data, consecutive characters data, and binary data are linked, and sorted in descending order of appearance frequency (step S4306). Subsequently, the occurrence probability of each type of sorted numerical value/character data is calculated based on the appearance frequency (step S4307). Based on the calculated occurrence probability, a Huffman tree common to 8-bit/16-bit numerical value/character data is generated (step S4308).

Subsequently, a process of setting the appearance map 510 is carried out (step S4309). Specifically, an area for the first row/cell corresponding table and the second row/cell corresponding table is established, the appearance frequency of each of character data is set to the first row/cell corresponding table, the appearance frequency of each of numerical value data is set to the second row/cell corresponding table, the appearance map of the decoded appearance frequency management data 500 is expanded on a memory, and the appearance map is linked to the first row/cell corresponding table and to the second row/cell corresponding table. Subsequently, the procedure proceeds to the retrieval process (step S3704) to end a series of processes.

Figure 44:
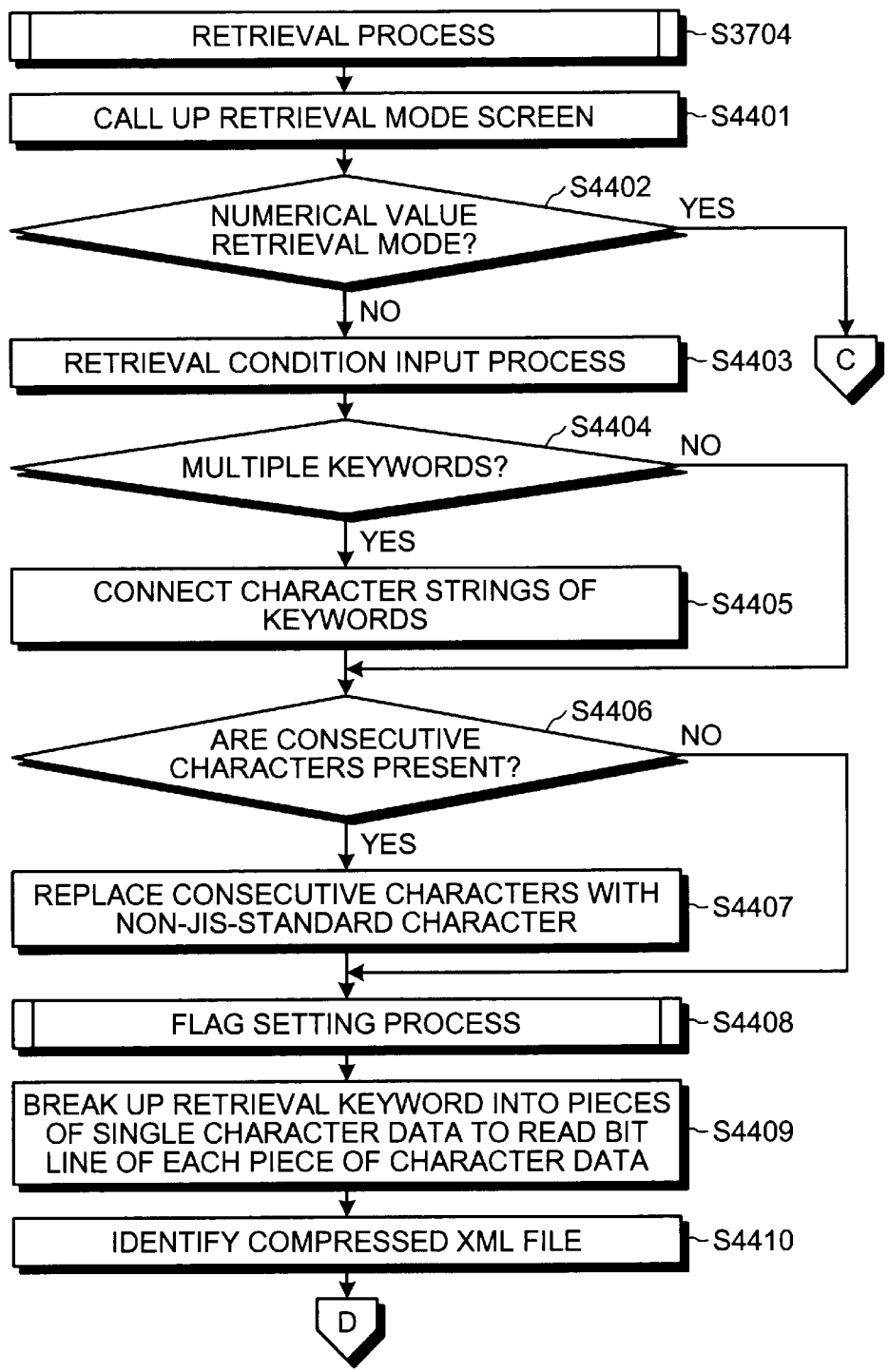
FIGS. 44 and 45 are flowcharts of a retrieval process (step S3704) depicted in FIG. 37.
Figure 45:
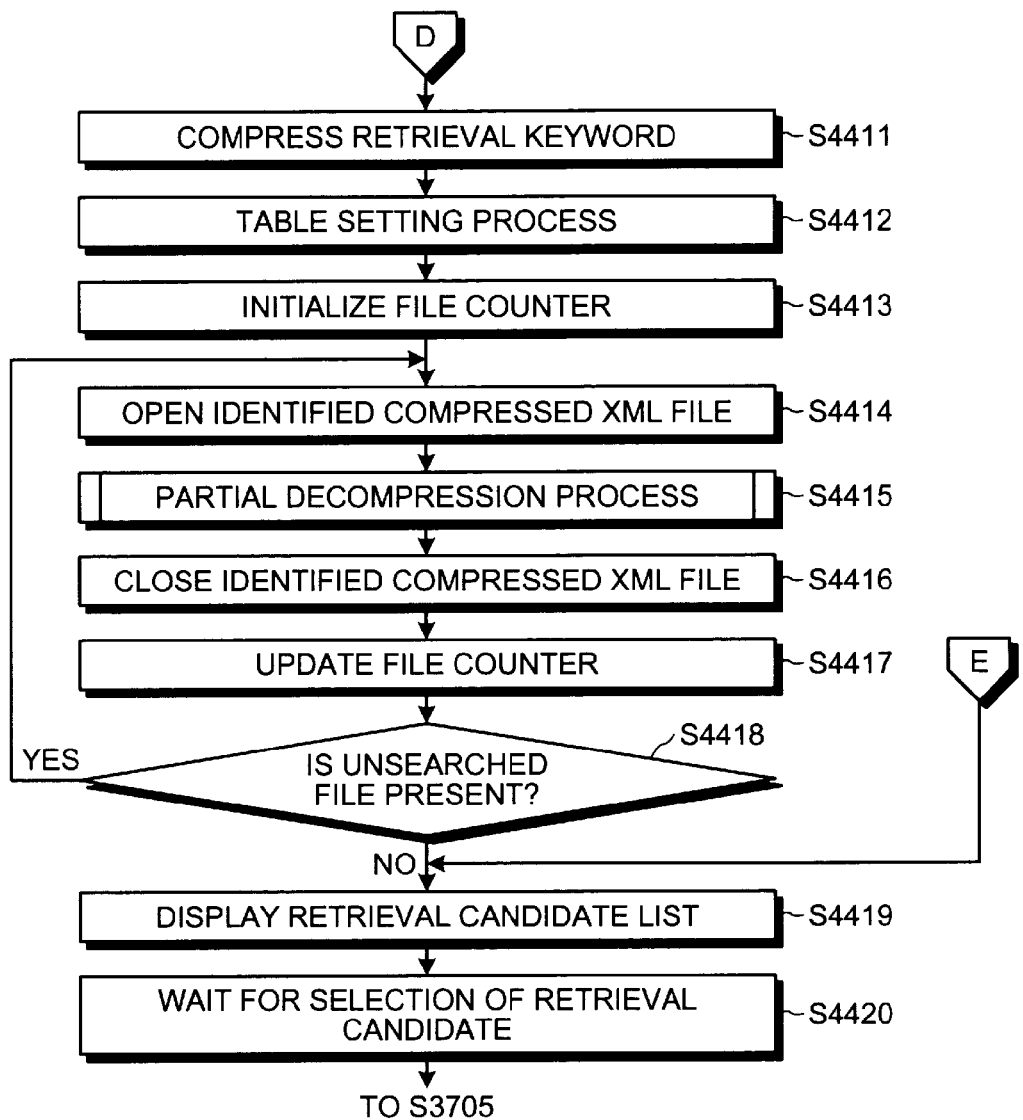

FIGS. 44 and 45 are flowcharts of the retrieval process (step S3704) depicted in FIG. 37. As depicted in FIG. 44, following the retrieval initializing process (step S3703), a retrieval mode screen is called up (step S4401), and selection of a numerical value retrieval mode or of a character retrieval mode is waited for (step S4402).

If the numerical value retrieval mode is selected (step S4402: YES), the procedure proceeds to step S4900 depicted in FIG. 49. If the character retrieval mode is selected (step S4402: NO), retrieval condition input processing is executed (step S4403). Retrieval condition input processing is the processing described with reference to FIGS. 27 to 29 and involving waiting for user input of retrieval conditions via the retrieval condition input screen 2700 and reading in the retrieval condition upon a clicking of the retrieval button 2709.

If the retrieval keyword in the retrieval condition does not include multiple retrieval keywords (step S4404: NO), the process proceeds to step S4406. If the retrieval keyword includes multiple keywords (step S4404: YES), character strings of the keywords are connected (step S4405), and the process proceeds to step S4406.

At step S4406, when consecutive characters data is not present in the retrieval keyword (step S4406: NO), the process proceeds to step S4408. When consecutive characters data is present in the retrieval keyword (step S4406: YES), the consecutive characters data is substituted with non-standard character data consisting of two characters, using the substitution table 640 (step S4407), and the process proceeds to step S4408.

Subsequently, a flag setting process is executed (step S4408). The flag setting process is the process of setting the decompression flag, the comparison flag, the substitution flag, or the access right flag in the structure of a leaf corresponding to each of character data of the retrieval keyword, based on the retrieval condition. After execution of the flag setting process (step S4408), the procedure proceeds to step S4409. The detail of the flag setting process will be described later.

At step S4409, the retrieval keyword is fragmented into single character data, and the bit string for each character data indicative of the presence/absence of the character with respect to each XML file is read from the appearance map (step S4409). Subsequently, the logical product of the bit strings indicative of the presence/absence of the character is calculated to specify (i.e., narrow down files to) a compressed XML file (step S4410).

In the procedure depicted in FIG. 45, the retrieval keyword is compressed using the Huffman tree 1401 generated by the retrieval initializing process at step S3703(step S4411). A table setting process is then executed (step S4412). In this table setting process (step S4412), when the remaining portion of the retrieval keyword excluding the head character of the keyword is compressed (step S4411) and is set in the register Rb, the remaining portion of the retrieval keyword (not compressed) and the compression length of the remaining portion of the retrieval keyword are set together in the comparison table 1713. When character string substitution is performed, the post-substitution character string, the remaining portion of the retrieval keyword (not compressed), and the compression length of the remaining portion of the retrieval keyword are set together in the substitution table.

In this case, the retrieval keyword "高血圧" is taken as an example, so that the remaining portion "血圧" of the retrieval keyword exclusive of the head character "高" and the compression length of the remaining portion "血圧" are saved in the comparison table 1713. When character string substitution is performed, the post-substitution character string "<B> 高血圧 </B>" is also set in the substitution table 14.

Following this table setting process (step S4412), the file counter is initialized (step S4413). Subsequently, the compressed XML file identified at step S4410 is opened (step S4414), and is subjected to the partial decompression/comparison process (step S4415). The details of the partial decompression/comparison process will be described later.

Subsequently, the opened compressed XML file is closed (step S4416), and the file counter is updated (step S4417). If the presence of an identified compressed XML file that has not be processed is determined as a result of file counter updating (step S4418: YES), the process proceeds to step S4414, at which the next identified compressed XML file is opened.

If no identified compressed XML file that has not been processed is determined to be present (step S4418: NO), the retrieval candidate list is displayed (step S4419), and an input of retrieval candidate selection from a user is waited for (step S4420). The process proceeds to the retrieval result display process (step S3705), ending a series of processes.

In this manner, even if the contents are composed of multiple XML files, the XML files can be processed in common in the form of a single piece of compressed information (appearance frequency management data 500).

The data contents of a XML file of a large size is blocked according to the number of character data. This allows application of the Huffman compression technique to a file-to-be-retrieved having a mixture of 8-bit code character data, 16-bit code character data, and 32-bit code character data.

Blocking is carried out not according to file size (volume) but according to the number of character data, and when the appearance frequency of each type of character data in a XML file is summed, the type of the character data (8-bit code, 16-bit code, and 32-bit code) is determined to total the appearance frequency.

Eight-bit code character data having a high appearance frequency, such as English character data, is substituted with 16-bit code character data, such as "Ox'FF**"", and is subjected to Huffman compression. This distinguishes 8-bit code character data with a high appearance frequency from 8-bit code character data with a low appearance frequency to enable efficient compression.

Noncharacter data, such as a pointer, takes a random value, and is, therefore, replaced with an 8-bit code data. For reducing the size of the Huffman tree, 16-bit code character data having a low appearance frequency is fragmented into 8-bit code character data. This enables efficient compression.

The appearance frequency management data 500, from which the Huffman tree 1401 for compression is generated, is encoded entirely or partially. Contents or the Huffman tree for compressing the contents is not directly encoded but the original data from which the Huffman tree is generated is encoded. This improves security.

Figure 46:
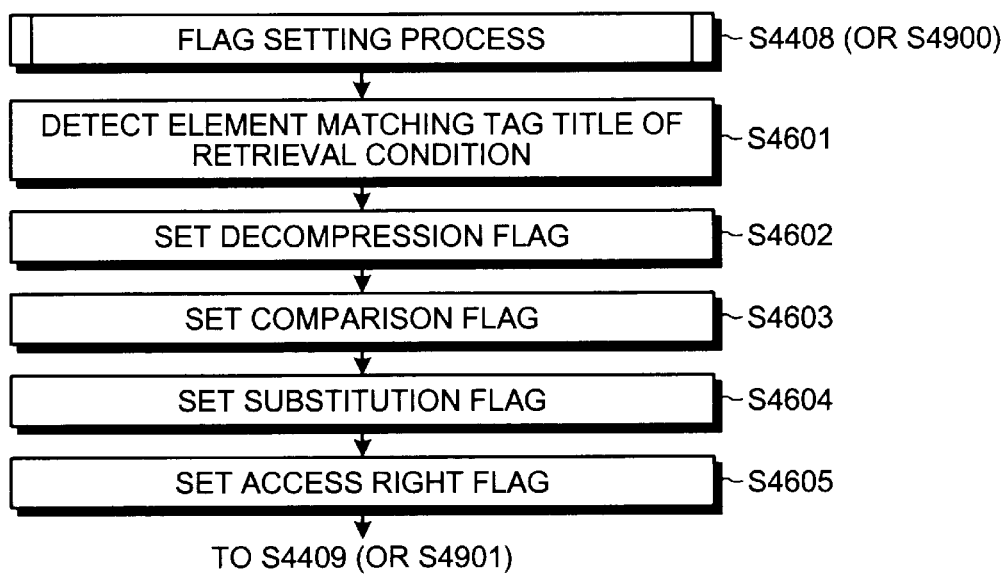
FIG. 46 is a flowchart of a flag setting process (step S4408)

Details of the flag setting process of FIG. 44 (step S4408) will be described. FIG. 46 is a flowchart of the flag setting process (step S4408).

As depicted in FIG. 46, an element (set of an XML start tag and an XML end tag corresponding thereto) that matches a tag title input as a retrieval condition is detected from the tag table 1712 (step S4601). Specifically, a pointer pointing to the element is set in the area 1703 of the structure 1700 of a leaf in the Huffman tree 1401 having a leaf of the element.

The decompression flag is then set in the area 1702 of the structure 1700 of the leaf (step S4602). Specifically, the decompression flag is set to ON for the XML start tag of the element and the decompression flag is set to OFF for the XML end flag of the element.

The comparison flag is set (step S4603). For example, the comparison flag is set to ON in the area 1702 of the structure 1700 in the Huffman tree 1401 having the leaf of the head characters in the retrieval keyword.

The substitution flag is set (step S4604). For example, the substitution flag is set to ON in the area 1702 of the structure 1700 in the Huffman tree 1401 having the leaves of each of the characters in the retrieval keyword.

Subsequently, a pointer pointing to the element is set in the area 1703 of the structure 1700 in the Huffman tree 1401 having the leaf of the XML start tag detected at step S4601. The access right flag is set to ON in the area 1702 of the structure 1700 in the Huffman tree 1401 having the leaf of the XML start tag detected at step S4601(step S4605), after which the procedure proceeds to step S4409.

Figure 47:
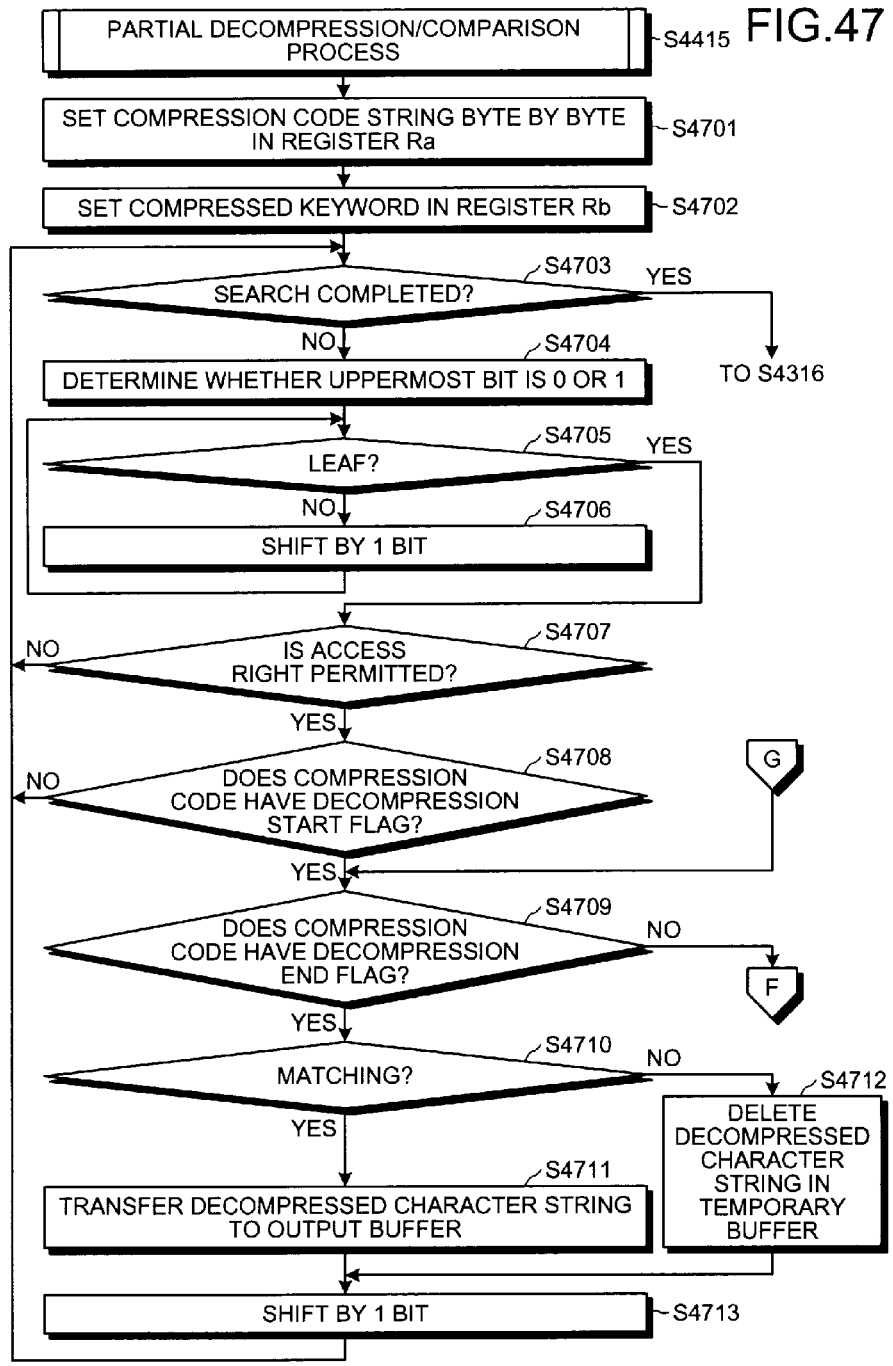
FIGS. 47 and 48 are flowcharts of a partial decompression/comparison process of FIG. 44.
Figure 48:
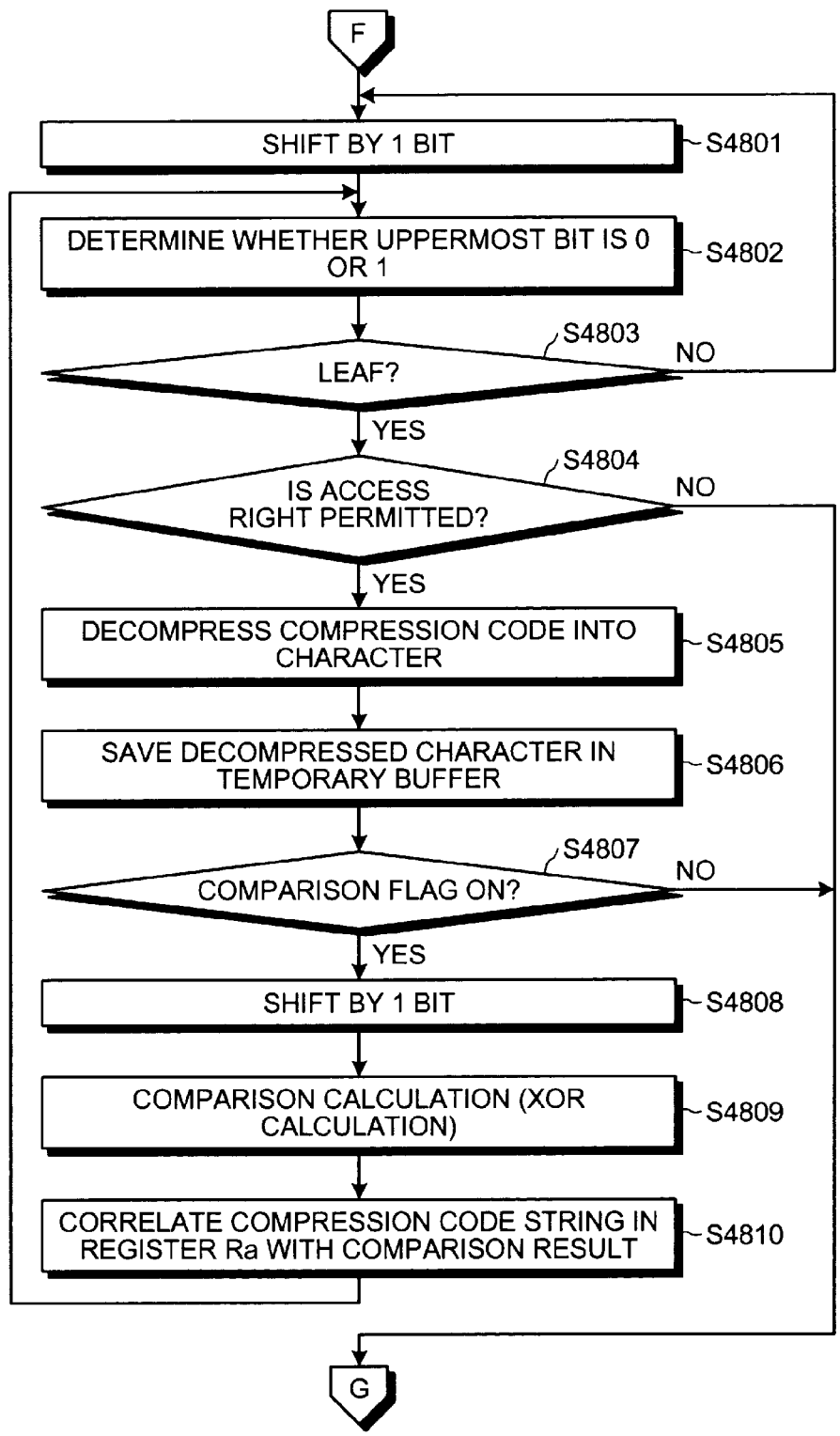

Details of the partial decompression/comparison process of FIG. 44 will be described. FIGS. 47 and 48 are flowcharts of the partial decompression/comparison process of FIG. 44. FIGS. 47 and 48 are the flowcharts of the procedure related to the contents of the processes of FIGS. 31, 32A, and 32B.

As depicted in FIG. 47, a compressed code string at the head of the identified compressed XML file opened at step S4414 is set byte by byte in the register Ra of FIG. 31 (step S4701). When a vacancy of 1 byte is created as a result of bit-by-bit shifting of the compression code string, the ensuing compression code string is set in the register Ra. Subsequently, a compressed keyword is set in the register Rb (step S4702).

Whether search of the identified compressed XML file opened at step S4414 has been completed is determined (step S4703). For example, completion of the search of the identified compressed XML file is determined when the compression code string set in the register Ra disappears.

If the search has not been completed (step S4703: NO), whether the uppermost bit MSB of the register Ra is 0 or 1 is determined (step S4704), i.e., whether a transition destination node is a leaf is determined. If the transition destination node is not a leaf (step S4705: NO), the compression code string set in the register Ra is shifted by 1 bit (step S4706), and the procedure returns to step S4705.

If the transition destination node is a leaf (step S4705: YES), the access right flag set on the compression code in the register Ra is checked to determine whether access is permitted (step S4707). If access is not permitted (step S4707: NO), the procedure returns to step S4703. If access is permitted (step S4707: YES), whether the compression code has the decompression start flag set therefor is determined (step S4708).

If the compression code has no decompression start flag (step S4708: NO), the procedure returns to step S4703. If the compression code has the decompression start flag (step S4708: YES), whether the compression code has the decompression end flag set therefor is determined (step S4709). If the compression code has no decompression end flag (step S4709: NO), the procedure proceeds to step S4801 depicted in FIG. 48.

As depicted in FIG. 48, the compression code string set in the register Ra is shifted by 1 bit (step S4801), and whether the uppermost bit MSB of the register Ra is 0 or 1 is determined (step S4802), i.e., whether a transition destination node in the Huffman tree 1401 is a leaf is determined. If the transition destination node is not a leaf (step S4803: NO), the procedure returns to step S4801.

If the transition destination node is a leaf (step S4803: YES), the access right flag set for the compression code in the register Ra is checked to determine whether access is permitted (step S4804). If access is not permitted (step S4804: NO), the procedure returns to step S4709 of FIG. 47. If access right is permitted (step S4804: YES), the compression code is decompressed into a character (step S4805), and the decompressed character is saved in the temporary buffer 3100 (step S4806).

Subsequently, whether the comparison flag set for the character decompressed in the temporary buffer 3100 is ON is determined (step S4807). If the comparison flag is ON (step 4807: YES), the compression code string set in the register Ra is shifted by 1 bit (step S4808) to carry out comparison calculation for comparison of the compression code string having been shifted by 1 bit and the compressed keyword set in the register Rb (step S4809). The comparison result 3210 of the comparison calculation is then correlated with the compression code string in the register Ra (step S4810), after which the procedure returns to step S4802.

If the comparison flag is not ON (step S4807: NO), the procedure returns to step S4709 depicted in FIG. 47. As depicted in FIG. 47, if the currently identified compression code has the decompression end flag (step S4709: YES), whether the comparison results in matching is determined based on the comparison result 3210 obtained from the comparison calculation at step S4809(step S4710).

If matching has resulted (step S4710: YES), the comparison table 1713 is referred to and the character string decompressed in the temporary buffer 3100 is transferred to the output buffer 3101 (step S4711). When character string substitution is performed, the substitution table 1714 is referred to and a post-substitution character string is transferred to the output buffer 3101.

If no matching has resulted (step S4710: NO), the character string decompressed in the temporary buffer 3100 is deleted (step S4712). Following step S4711 or step S4712, the compression code string set in the register Ra is shifted by 1 bit (step S4713), and the procedure returns to step S4703, from which, if the search is over (step S4703: YES), the procedure proceeds to step S4316. A series of steps thus comes to an end.

In this partial decompression/comparison process, partial decompression executed in consideration of a character boundary and comparison with a compressed keyword is able to be executed separately and simultaneously. For example, partial decompression is executed on a compression code string ranging from a hit XML start tag to an XML end tag, and a decompressed in-tag character string is output to the temporary buffer 3100. In other words, decompression and comparison of an XML tag that has not been hit is unnecessary, so that decompression of highly redundant XML tags and a character strings between such XML tags is prevented automatically.

Binary comparison is carried out in parallel with partial decompression, and when a condition is met, a character string is transferred from the temporary buffer 3100 to the output buffer 3101. As a result, the compression code identical to a compression code between tags specified by a retrieval condition is partially decompressed. This partial decompression/comparison process increases retrieval speed.

Figure 49:
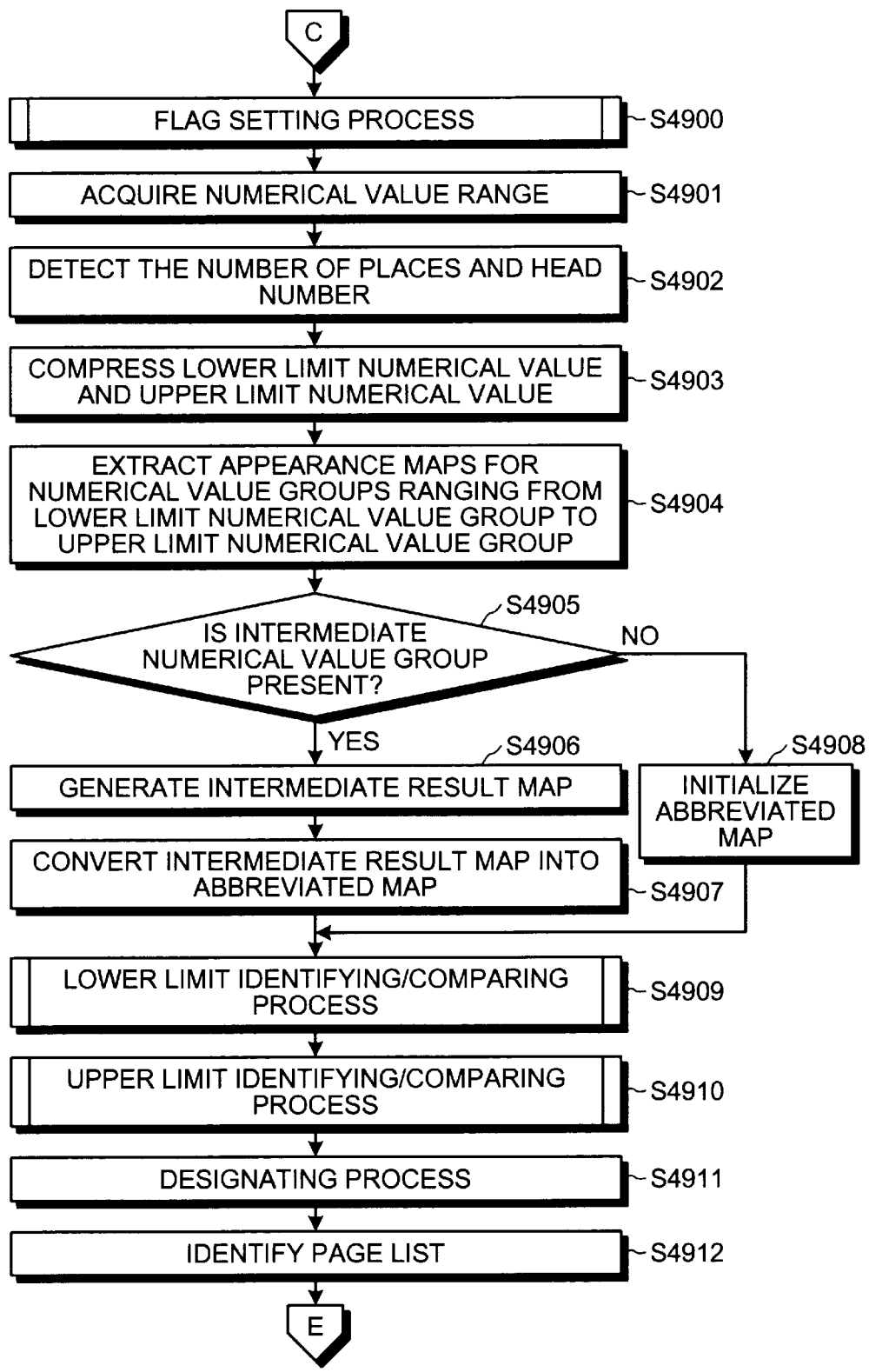
FIG. 49 is a flowchart of the procedure of execution of numerical value retrieval in the numerical value retrieval mode according to the embodiment.

A procedure of execution of numerical value retrieval in a numerical value retrieval mode according to the embodiment will be described. FIG. 49 is a flowchart of the procedure of execution of numerical value retrieval in the numerical value retrieval mode according to the embodiment.

Following step S4602: YES depicted in FIG. 46, the flag setting process is executed according to the input retrieval condition (step S4900). Details of the flag setting process (step S4900) are identical to the procedure depicted in FIG. 46, and will therefore be omitted in further description.

A numerical value range is acquired through the retrieval condition input unit 3300 (step S4901). The detecting unit 3303 then detects the number of places and the head number of a numerical value (lower limit numerical value, upper limit numerical value) defining a boundary of the numerical range (step S4902). The numerical value compressing unit 3302 compresses the lower limit numerical value and the upper limit numerical value (step S4903).

Subsequently, the appearance map extracting unit 3305 extracts appearance maps for numerical value groups ranging from a lower limit numerical value group to an upper limit numerical value group, from the appearance map 503 (step S4904). The intermediate numerical value group determining unit 3304 determines whether an intermediate numerical value group is present (step S4905). If the presence of the intermediate numerical value group is determined (step S4905: YES), the abbreviated map setting unit 3306 calculates the logical sum of appearance maps for the intermediate numerical value group to generate an intermediate result map (step S4906), and reverses each bit in the intermediate result map to convert the intermediate result map into an abbreviated map (step S4907).

If the absence of the intermediate numerical value group is determined (step S4905: NO), the abbreviated map is initialized (step S4908). In other words, bit strings corresponding to the XML files f0 to fn are all set to OFF to acquire an abbreviated map having bits all set to "0". The procedure then proceeds to step S4909.

Subsequently, a lower limit identifying/comparing process (step S4909) and an upper limit identifying/comparing process (step S4910) are executed. Details of the lower limit identifying/comparing process (step S4909) and the upper limit identifying/comparing process (step S4910) will be described later.

The designating unit 3311 designates a compressed XML file Fi in which a numerical value within the numerical value range is present (step S4911). The data identifying unit 2609 then identifies a page list for the compressed XML file Fi in which the numerical value within the numerical value range is present (step S4912), and the procedure proceeds to step S4619. Hence, a series of steps of executing numerical value retrieval comes to an end.

Figure 50:
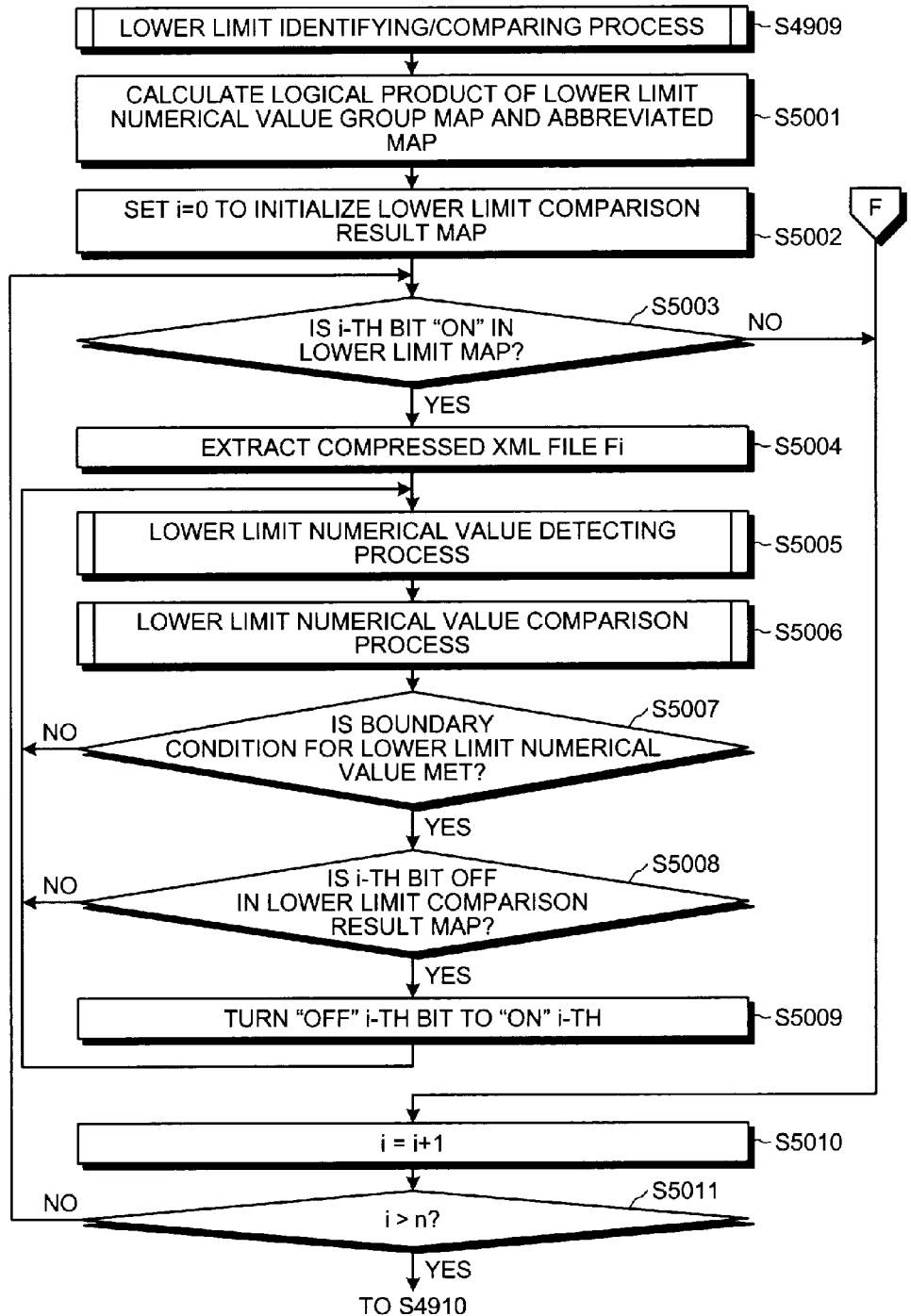
FIG. 50 is a flowchart of a procedure of a lower limit identifying/comparing process depicted in FIG. 49.

FIG. 50 is a flowchart of a procedure of the lower limit identifying/comparing process depicted in FIG. 49. In FIG. 50, the procedure will be described with reference to examples of the size comparison depicted in FIGS. 35A to 35D.

As depicted in FIG. 35B, the logical product of a lower limit numerical value group map (4-digit/head number 3 map M43) and an abbreviated map M02 is calculated to acquire a lower limit map M03 (step S5001). A file number is then set to 0 to initialize a lower limit comparison result map M04 (set all bits to OFF) (step S5002).

Whether the i-th bit is ON in the lower limit map M03 is determined (step S5003). If the i-th bit is OFF (step S5003: NO), the procedure proceeds to step S5010.

If the i-th bit is ON (step S5003: YES), the compressed XML file Fi is extracted from the compressed XML files F (step S5004). Subsequently, a lower limit numerical value detecting process is executed (step S5005). Details of the lower limit numerical value detecting process will be described later with reference to FIG. 51. By this lower limit numerical value detecting process, compression information for an in-file numerical value (compression information 3501 depicted in FIG. 35B) is extracted from the compressed XML file Fi.

Subsequently, a lower limit numerical value comparison process is executed (step S5006). The lower limit numerical value comparison process will be described later with reference to FIG. 52. Based on a comparison result obtained by the lower limit numerical value comparison process, whether a boundary condition for a lower limit numerical value is met is determined (step S5007).

If the boundary condition is not met (step S5007: NO), the procedure returns to step S5005. If the boundary condition is met (step S5007: YES), whether the i-th bit remains OFF in the lower limit comparison result map M04 is determined (step S5008). If the i-th bit has turned ON (step S5008: NO), the procedure proceeds to step S5005.

If the i-th bit remains OFF (step S5008: YES), the OFF i-th bit is turned to ON i-th bit (step S5009), after which the procedure returns to step S5005. At step S5010, the file number i is increased by 1, and whether i>n is satisfied is determined (step S5011).

If i>n is not satisfied (step S5011: NO), the procedure returns to step S5003. If i>n is satisfied (step S5011: YES), the procedure proceeds to step S4910 depicted in FIG. 49. Hence, a series of steps of the lower limit identifying/comparing process comes to an end.

Figure 51:
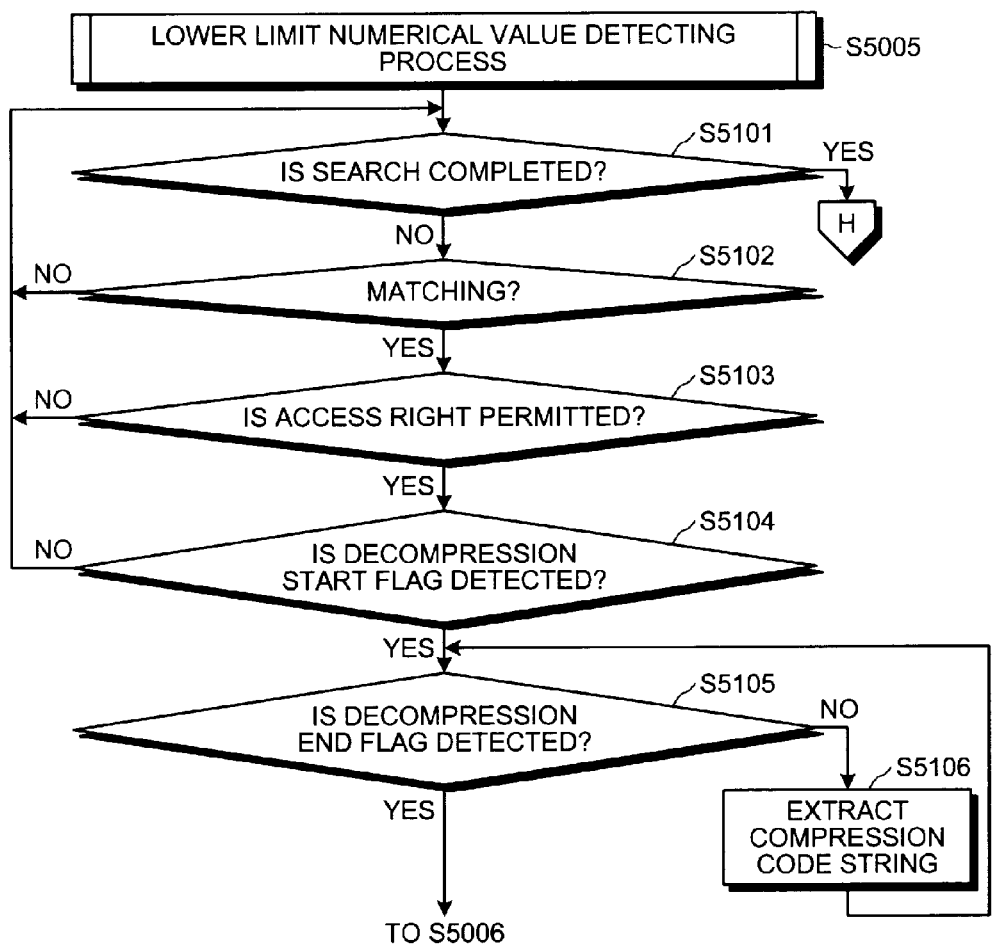
FIG. 51 is a flowchart of a lower limit numerical value detecting process depicted in FIG. 50.

FIG. 51 is a flowchart of the lower limit numerical value detecting process depicted in FIG. 50. As depicted in FIG. 51, search of the compressed XML file Fi extracted at step S5004 of FIG. 50 is started from the head of the XML file Fi, and whether the search is completed is determined (step S5101). This search is a process of detecting a compression code that matches a compression code for a tag specified by a retrieval condition.

If the search has not been completed (step S5101: NO), the search is continued (step S5102) until the compression code matching the compression code for the tag specified by the retrieval condition is detected (step S5102: NO). When the compression code matching the compression code for the tag specified by the retrieval condition is detected during the search (step S5102: YES), the Huffman tree 1401 for the matching compression code is checked to determine whether access to an XML start tag having the decompression start tag detected to be set therefor is permitted, that is, to determine whether the access right flag is set to ON for the XML start tag (step S5103).

If access is not permitted (step S5103: NO), the procedure proceeds to step S5101. If access right is permitted (step S5103: YES), whether the decompression start tag is detected in the Huffman tree 1401 having a leaf corresponding to the tag of the compression code detected to be matching is determined (step S5104).

If the decompression start tag is not detected (step S5104: NO), the procedure returns to step S5101. If the decompression start tag is detected (step S5104: YES), whether the decompression end flag is detected for a compression code following the compression code having the decompression start tag is determined (step S5105).

If the decompression end flag is not detected (step S5105: NO), the compression code following the compression code with the decompression start tag is extracted (step S5106), and the procedure returns to step S5105. If the decompression end flag is detected (step S5105: YES), the procedure proceeds to step S5006.

When the search is completed at step S5101(step S5101: YES), the procedure proceeds to step S5010. A compression code string that is extracted during a period from detection of the decompression start flag to detection of the decompression end flag will hereinafter be referred to as "compression information for a numerical value".

Figure 52:
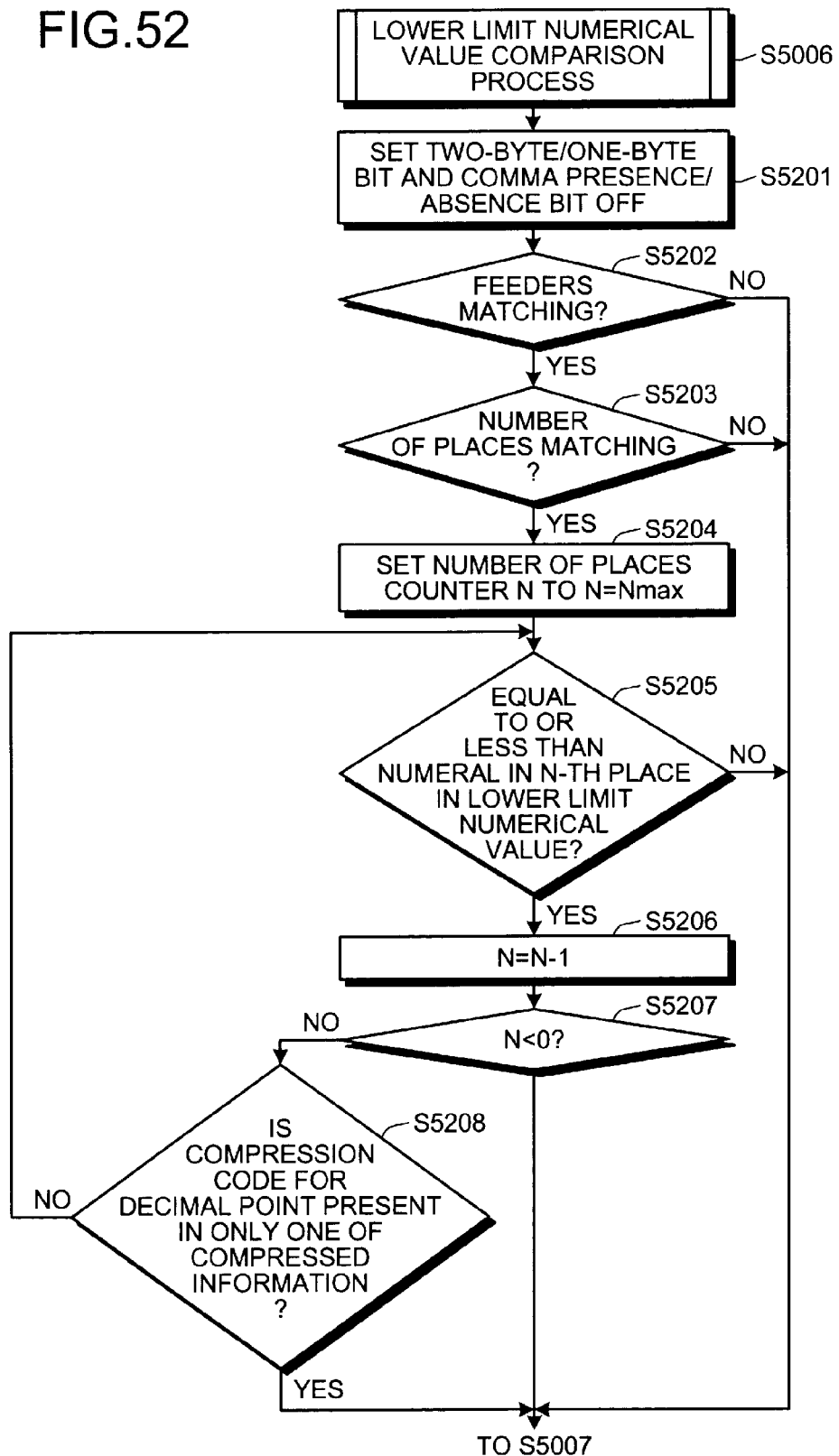
FIG. 52 is a flowchart of a lower limit numerical value comparison process.

FIG. 52 is a flowchart of the lower limit numerical value comparison process. As depicted in FIG. 52, a one-byte/two-byte and a comma presence bit in compression information for a lower limit numerical value and a one-byte/two-byte and a comma presence bit in compression information for an in-file numerical value are set to OFF (step S5201).

The compression information for the lower limit numerical value and of the in-file numerical value are compared with each other to determine whether feeders match (step S5202). If the feeders do not match (step S5202: NO), the procedure proceeds to step S5007. If the feeders match (step S5202: YES), whether the numbers of places match is determined (step S5203).

If the numbers of places do not match (step S5203: NO), the procedure proceeds to step S5007. If the numbers of places match (step S5203: YES), the number of places counter N is set to N=Nmax (step S5204). Nmax represents the number of places of the lower limit numerical value and of the in-file numerical value.

Subsequently, whether a number in the N-th place of the in-file numerical value is at least equal to a number in the N-th place of the lower limit numerical value is determined (step S5205). Being equal to or more than the number in the N-th place of the lower limit numerical value is adopted as a reference for determination because a boundary condition for the lower limit numerical value in a numerical value range is "≤". If the boundary condition is "<", whether the number in the N-th place of the in-file numerical value is more than the number in the N-th place of the lower limit numerical value is determined (step S5205).

If the number in the N-th place of the in-file numerical value is not equal to or more than the number in the N-th place of the lower limit numerical value (step S5205: NO), the procedure proceeds to step S5007. If the number in the N-th place of the in-file numerical value is equal to or more than the number in the N-th place of the lower limit numerical value (step S5205: YES), a count N of the number of places counter N is decreased by 1 (step S5206), and whether the count N of the number of places counter N is N<0 is determined (step S5207).

If the count N is not N<0 (step S5207: NO), whether a compression code for a decimal point is present between a compression code for a number in the (N−1)-th place and a compression code for the number in the N-th place in only one among the compression information for the lower limit numerical value and the compression information for the in-file numerical value is determined (step S5208).

If the compression code for the decimal point is present between the compression code for the number in the (N−1)-th place and the compression code for the number in the N-th place in not only among the compression information for the lower limit numerical value and the compression information for the in-file numerical value (step S5208: NO), that is, the compression code for the decimal point is present in both or is absent in both, the procedure proceeds to step S5205.

If the compression code for the decimal point is present between the compression code for the number in the (N−1)-th place and the compression code for the number in the N-th place in only one among the compression information for the lower limit numerical value and the compression information for the in-file numerical value (step S5208: YES), the procedure proceeds to step S5007.

If the count N is N<0 at step S5207 (step S5207: YES), the procedure proceeds to step S5007. Hence, a series of the lower limit numerical value comparing process comes to an end.

At step S5007 depicted in FIG. 50, meeting the boundary condition for the lower limit numerical value is determined when the count N is N<0 at step S5207 (step 5207: YES), while not meeting the boundary condition for the lower limit numerical value is determined when "NO" results at any one of steps S5202, S5203, and S5205 and "YES" results at step S5208.

By the above lower limit numerical value detecting process and the lower limit numerical value comparison process, partial decompression of a numerical value is achieved. If a numerical value between XML tags is present, a compression code string for the numerical value is decompressed. If such a numerical value is not present, the compression code string is not decompressed. For example, output from the decompression is processed through two stages of buffers.

More specifically, a compressed code string ranging from a hit XML start tag to an XML end tag is subjected to partial decompression, and a decompressed numerical value is output to a temporary buffer at the first stage. Numerical value comparison, etc., is executed in parallel with the decompression, and if a condition is met, the decompressed numerical value is output from the temporary buffer to a decompression buffer. In this manner, only the compression code identical to a compression code for a numerical value between tags specified by a retrieval condition is decompressed, thereby increasing retrieval speed.

Figure 53:
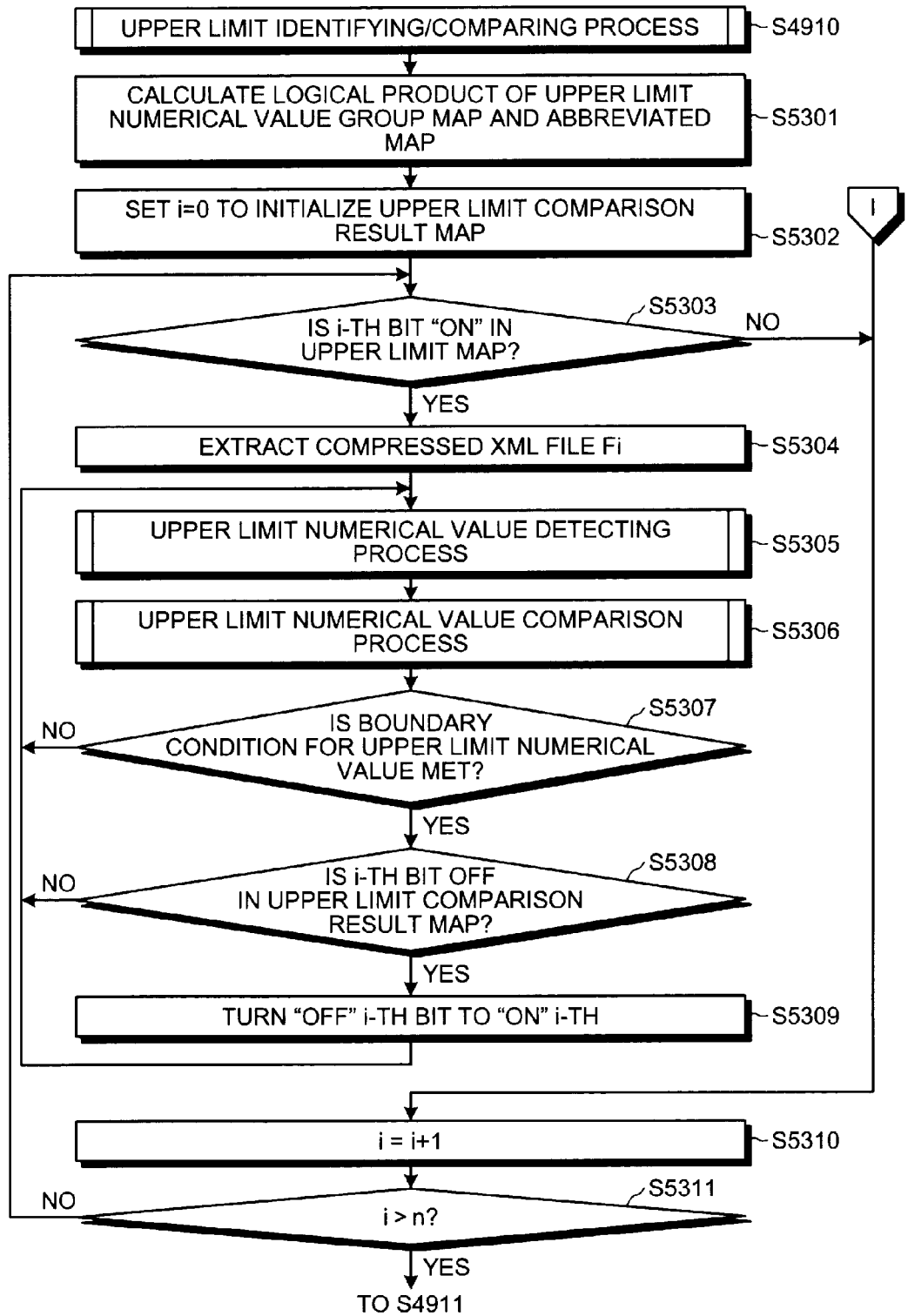
FIG. 53 is a flowchart of a procedure of an upper limit identifying/comparing process depicted in FIG. 49.

FIG. 53 is a flowchart of a procedure of the upper limit identifying/comparing process depicted in FIG. 49. In FIG. 53, the procedure will be described with reference to examples of the size comparison depicted in FIGS. 35A to 35D.

As depicted in FIG. 35C, the logical product of a upper limit numerical value group map (4-digit/head number 3 map M43) and an abbreviated map M02 is calculated to acquire an upper limit map M05 (step S5301). A file number i is then set to 0 to initialize an upper limit comparison result map M06 (set all bits to OFF) (step S5302).

Whether the i-th bit is ON in the upper limit map M05 is determined (step S5303). If the i-th bit is OFF (step S5303: NO), the procedure proceeds to step S5310.

If the i-th bit is ON (step S5303: YES), the compressed XML file Fi is extracted from the compressed XML files F (step S5304). Subsequently, an upper limit numerical value detecting process is executed (step S5305). Details of the upper limit numerical value detecting process will be described later with reference to FIG. 54. By this upper limit numerical value detecting process, compression information for an in-file numerical value (compression information 3503 depicted in FIG. 35C) is extracted from the compressed XML file Fi.

Subsequently, an upper limit numerical value comparison process is executed (step S5306). The upper limit numerical value comparison process will be described later with reference to FIG. 55. Based on a comparison result obtained by the upper limit numerical value comparison process, whether a boundary condition for an upper limit numerical value is met is determined (step S5307).

If the boundary condition is not met (step S5307: NO), the procedure returns to step S5305. If the boundary condition is met (step S5307: YES), whether the i-th bit remains OFF in the upper limit comparison result map M06 is determined (step S5308). If the i-th bit has turned ON (step S5308: NO), the procedure proceeds to step S5305.

If the i-th bit remains OFF (step S5308: YES), the OFF i-th bit is turned to ON i-th bit (step S5309), after which the procedure returns to step S5305. At step S5310, the file number i is increased by 1, and whether i>n is satisfied is determined (step S5311).

If i>n is not satisfied (step S5311: NO), the procedure returns to step S5303. If i>n is satisfied (step S5311: YES), the procedure proceeds to step S4910 depicted in FIG. 49. Hence, a series of steps of the upper limit identifying/comparing process comes to an end.

Figure 54:
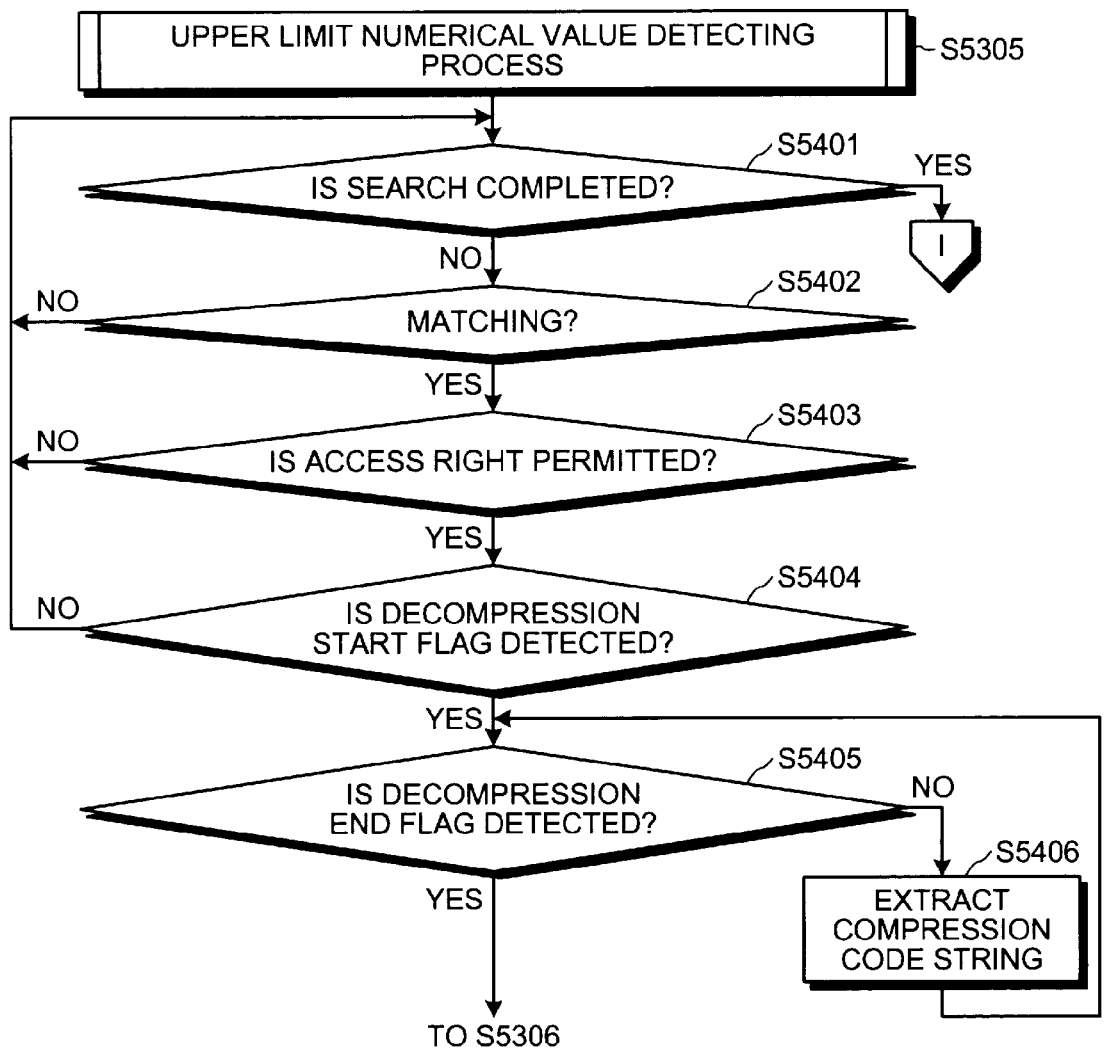
FIG. 54 is a flowchart of an upper limit numerical value detecting process depicted in FIG. 53.

FIG. 54 is a flowchart of the upper limit numerical value detecting process depicted in FIG. 53. As depicted in FIG. 54, search of the compressed XML file Fi extracted at step S5304 of FIG. 53 is started from the head of the XML file Fi, and whether the search is completed is determined (step S5401). This search is a process of detecting a compression code that matches a compression code for a tag specified by a retrieval condition.

If the search has not been completed (step S5401: NO), the search is continued (step S5402) until the compression code matching the compression code for the tag specified by the retrieval condition is detected (step S5402: NO). When the compression code matching the compression code for the tag specified by the retrieval condition is detected during the search (step S5402: YES), the Huffman tree 1401 for the matching compression code is checked to determine whether access to an XML start tag having the decompression start tag detected to be set therefor is permitted, that is, to determine whether the access right flag is set to ON for the XML start tag (step S5403).

If access is not permitted (step S5403: NO), the procedure proceeds to step S5401. If access is permitted (step S5403: YES), whether the decompression start tag is detected in the Huffman tree 1401 having a leaf corresponding to the tag of the compression code detected to be matching is determined (step S5404).

If the decompression start tag is not detected (step S5404: NO), the procedure returns to step S5401. If the decompression start tag is detected (step S5404: YES), whether the decompression end flag is detected for a compression code following the compression code having the decompression start tag is determined (step S5405).

If the decompression end flag is not detected (step S5405: NO), the compression code following the compression code with the decompression start tag is extracted (step S5406), and the procedure returns to step S5405. If the decompression end flag is detected (step S5405: YES), the procedure proceeds to step S5306.

When the search is completed at step S5401(step S5401: YES), the procedure proceeds to step S5010. A compression code string that is extracted during a period from detection of the decompression start flag to detection of the decompression end flag will hereinafter be referred to as "compression information for a numerical value".

Figure 55:
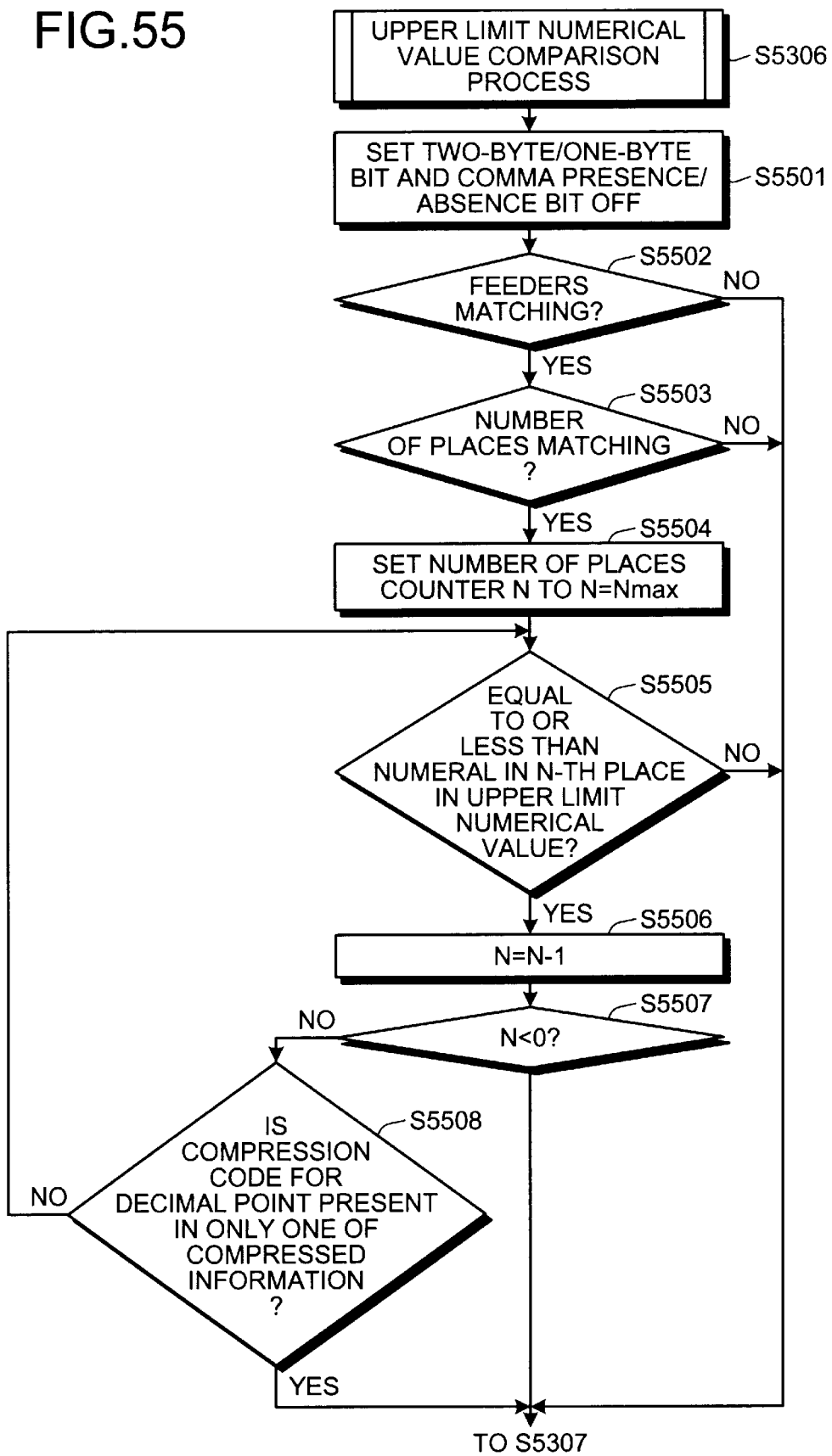
FIG. 55 is a flowchart of an upper limit numerical value comparison process.

FIG. 55 is a flowchart of the upper limit numerical value comparison process. As depicted in FIG. 55, a one-byte/two-byte and a comma presence bit in compression information for an upper limit numerical value and a one-byte/two-byte and a comma presence bit in compression information for an in-file numerical value are set to OFF (step S5501).

The compression information for the upper limit numerical value and of the in-file numerical value are compared with each other to determine whether feeders match (step S5502). If the feeders do not match (step S5502: NO), the procedure proceeds to step S5307. If the feeders match (step S5502: YES), whether the numbers of places match is determined (step S5503).

If the numbers of places do not match (step S5503: NO), the procedure proceeds to step S5307. If the numbers of places match (step S5503: YES), the number of places counter N is set to N=Nmax (step S5504). Nmax represents the number of places of the upper limit numerical value and of the in-file numerical value.

Subsequently, whether a number in the N-th place of the in-file numerical value is at most equal to a number in the N-th place of the upper limit numerical value is determined (step S5505). Being equal to or less than the number in the N-th place of the upper limit numerical value is adopted as a reference for determination because a boundary condition for the upper limit numerical value in a numerical value range is "≥". If the boundary condition is ">", whether the number in the N-th place of the in-file numerical value is less than the number in the N-th place of the upper limit numerical value is determined (step S5505).

If the number in the N-th place of the in-file numerical value is not equal to or less than the number in the N-th place of the upper limit numerical value (step S5505: NO), the procedure proceeds to step S5307. If the number in the N-th place of the in-file numerical value is equal to or less than the number in the N-th place of the upper limit numerical value (step S5505: YES), a count N of the number of places counter N is decreased by 1 (step S5506), and whether the count N of the number of places counter N is N<0 is determined (step S5507). If the count N is not N<0 (step S5507: NO), whether a compression code for a decimal point is present between a compression code for a number in the (N−1)-th place and a compression code for the number in the N-th place in only one among the compression information for the upper limit numerical value and the compression information for the in-file numerical value is determined (step S5508).

If the compression code for the decimal point is present between the compression code for the number in the (N−1)-th place and the compression code for the number in the N-th place in not only among the compression information for the upper limit numerical value and the compression information for the in-file numerical value (step S5508: NO), that is, the compression code for the decimal point is present in both or is absent in both, the procedure proceeds to step S5505.

If the compression code for the decimal point is present between the compression code for the number in the (N−1)-th place and the compression code for the number in the N-th place in only one among the compression information for the upper limit numerical value and the compression information for the in-file numerical value (step S5508: YES), the procedure proceeds to step S5307.

If the count N is N<0 at step S5507(step S5507: YES), the procedure proceeds to step S5307. Hence, a series of the upper limit numerical value comparing process comes to an end.

At step S5307 depicted in FIG. 53, meeting the boundary condition for the upper limit numerical value is determined when the count N is N<0 at step S5507 (step 5207: YES), while not meeting the boundary condition for the upper limit numerical value is determined when "NO" results at any one of steps S5502, S5503, and S5505 and "YES" results at step S5508.

By the above upper limit numerical value detecting process and the upper limit numerical value comparison process, partial decompression of a numerical value is achieved. If a numerical value between XML tags is present, a compression code string for the numerical value is decompressed. If such a numerical value is not present, the compression code string is not decompressed. For example, output from the decompression is processed through two stages of buffers.

More specifically, a compressed code string ranging from a hit XML start tag to an XML end tag is subjected to partial decompression, and a decompressed numerical value is output to a temporary buffer at the first stage. Numerical value comparison, etc., is executed in parallel with the decompression, and if a condition is met, the decompressed numerical value is output from the temporary buffer to a decompression buffer. In this manner, only the compression code identical to a compression code for a numerical value between tags specified by a retrieval condition is decompressed, thereby increasing retrieval speed.

According to this numerical value range retrieval, an intermediate numerical value group is detected and is reflected on the abbreviated map M02. Because of this, the presence/absence of a numerical value in a numerical value range is detected without performing matching comparison of the numerical value in the numerical value range against a compressed XML file identified by an appearance map for the intermediate numerical value group.

While numerical value matching comparison is carried out on the lower limit numerical value group and upper limit numerical value group only, because an in-file numerical value is correlated with a feeder, numerical value information alone is retrieved at high speed from the compressed XML file Fi. Because different pieces of compression information for a numerical value are compared with each other for matching, size comparison is performed by comparing different compression codes for feeders or the numbers of places for matching. This enables execution of highly precise retrieval at high speed.

In the numerical value/character appearance frequency management data 500, matching comparison and decompression of a numerical value is sped up by amending the appearance frequency of a numeral, etc. When numerical value data and character data are present together in a file to be searched, in particular, matching comparison and decompression of a numerical value is sped up by appearance frequency amending.

As described, the embodiments offer an effect of improving the efficiency of data retrieval from an XML file, such as clinical test data having complicated types of tags and enormous in volume.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a search program that causes a computer to execute a process comprising:
    generating a Huffman tree from an XML file, leaf nodes of the Huffman tree that correspond to XML tags being different from leaf nodes of the Huffman tree that correspond to characters other than XML tags;
    compressing the XML file into a compressed XML file using the generated Huffman tree;
    receiving search input that includes a search keyword and search type of the search keyword;
    compressing the search keyword using the Huffman tree;
    setting a start flag for a compression code corresponding to an XML start tag related to the search type and an end flag for a compression code corresponding to an XML end tag related to the search type;
    searching the compressed XML file for the compressed retrieval keyword, between the start flag and the end flag; and
    decompressing searched compression code using the Huffman tree when the compressed retrieval keyword is searched.

2. The non-transitory computer-readable recording medium according to claim 1, wherein:
    the end flag instructing termination of decompression at a compression code reaching the XML end tag,
    the searching includes searching, in the compressed XML file, the compression code for the XML end tag and for which the end flag has been set at the setting, and
    the decompressing includes decompressing the compression code string up to the XML end tag, using the Huffman tree.

3. The non-transitory computer-readable recording medium according to claim 1, wherein:
    the setting includes setting an access right flag for a compression code corresponding to an XML tag related to the search type, the access right flag permitting access to the XML tag, and
    the searching includes searching, in the compressed XML file, only the compression code for the XML tag and for which the access right flag has been set at the setting.

4. The non-transitory computer-readable recording medium according to claim 1, wherein:
    the setting includes setting an access right flag for a compression code corresponding to head character data of the search keyword, the access right flag permitting access to a character string matching the search keyword, and
    the searching includes searching, in the compressed XML file, only the compression code for which the access right flag has been set at the setting.

5. The non-transitory computer-readable recording medium according to claim 1, wherein:
    the compressing of the search keyword includes excluding head character data of the search keyword and compressing a remaining portion of the search keyword, using the Huffman tree,
    the setting includes setting a comparison flag for a compression code that is among compression codes indicated by the Huffman tree and that matches a compression code for the head character data, the comparison flag instructing comparison using the compressed remaining portion of the search keyword,
    the searching includes searching, in the compressed XML file, the compression code for which the comparison flag has been set at the setting.

6. The non-transitory computer-readable recording medium according to claim 1, wherein:
    the receiving includes receiving search input for forward matching retrieval employing the search keyword,
    the setting, when at the receiving, input for the forward matching retrieval is received, includes setting a comparison flag for a compression code that is among compression codes indicated by the Huffman tree and that corresponds to the XML start tag related to the search type,
    the searching includes searching, in the compressed XML file, the compression code for which the comparison flag has been set at the setting.

7. The non-transitory computer-readable recording medium according to claim 1, wherein:
    the receiving includes receiving search input for reverse matching retrieval employing the search keyword;

the compressing of the search keyword, when at the receiving, input for the reverse matching retrieval is received, includes excluding head character data of the search keyword and compressing a remaining portion of the search keyword and the XML end tag, using the Huffman tree, to generate a compressed keyword related to the compressed remaining portion of the search keyword and the XML end tag, the setting, when at the receiving, input for the reverse matching retrieval is received, includes setting a comparison flag for a compression code that is among compression codes indicated by the Huffman tree and that matches a compression code for the head character data, the comparison flag instructing comparison using the compressed keyword related to the compressed remaining portion of the search keyword and the XML end tag, the searching includes searching, in the compressed XML file, the compression code for which the comparison flag has been set at the setting.

8. The non-transitory computer-readable recording medium according to claim 1, wherein:
the receiving includes receiving search input for full matching retrieval employing the search keyword;
the compressing of the search keyword, when at the receiving, input for the full matching retrieval is received, includes compressing the search keyword and the XML end tag, using the Huffman tree, to generate a compressed keyword related to the compressed search keyword and the XML end tag,
the setting, when at the receiving, input for the full matching retrieval is received, includes setting a comparison flag for a compression code that is among compression codes indicated by the Huffman tree and corresponds to the XML start tag, the comparison flag instructing comparison using the compressed keyword related to the compressed search keyword and the XML end tag,
the searching includes searching, in the compressed XML file, the compression code for which the comparison flag has been set at the setting.

9. A non-transitory computer-readable recording medium storing therein a search program that causes a computer to execute a process comprising:
generating a Huffman tree from an XML file, leaf nodes of the Huffman tree that correspond to XML tags being different from leaf nodes of the Huffman tree that correspond to characters other than XML tags;
compressing the XML file into a compressed XML file using the generated Huffman tree;
receiving search input a search keyword and search type of the search keyword;
compressing the search keyword using the Huffman tree;
setting a start flag for a compression code corresponding to an XML start tag related to the search type and an end flag for a compression code corresponding to an XML end tag related to the search type;
searching the compressed XML file for the compressed retrieval keyword, between the start flag and the end flag; and
extracting searched compression code.

10. The non-transitory computer-readable recording medium according to claim 9, wherein:
the end flag instructing termination of decompression at a compression code reaching the XML end tag,
the searching includes searching, in the compressed XML file, the compression code for the XML end tag and for which the end flag has been set at the setting, and the extracting includes extracting the compression code string up to the XML end tag.

11. The non-transitory computer-readable recording medium according to claim 9, wherein:
the setting includes setting an access right flag for a compression code corresponding to an XML tag related to the search type information, the access right flag permitting access to the XML tag, and
the searching includes searching, in the compressed XML file, only the compression code for the XML tag and for which the access right flag has been set at the setting.

12. A search apparatus comprising:
a generating unit that uses a central processing unit to generate a Huffman tree from an XML file, leaf nodes of the Huffman tree that correspond to XML tags being different from leaf nodes of the Huffman tree that correspond to characters other than XML tags;
a file compressing unit that compresses the XML file into a compressed XML file using the generated Huffman tree;
an input unit that receives search input that includes a search keyword and search type of the search keyword;
a setting unit that sets a start flag for a compression code corresponding to an XML start tag related to the search type;
a searching unit that searches, in the compressed XML file for the compressed retrieval keyword, between the start flag and the end flag; and
a decompressing unit that decompresses the searched compression code using the Huffman tree when the compressed retrieval keyword is searched.

13. A search method comprising:
generating a Huffman tree from an XML file, leaf nodes of the Huffman tree that correspond to XML tags being different from leaf nodes of the Huffman tree that correspond to characters other than XML tags;
compressing the XML file into a compressed XML file using the generated Huffman tree;
receiving search input that includes numerical data and search type of the numerical data;
compressing the numerical data using the Huffman tree;
setting a start flag for a compression code corresponding to an XML start tag related to the search type and an end flag for a compression code corresponding to an XML end tag related to search type;
searching the compressed XML file for the compressed retrieval keyword, between the start flag and the end flag; and
using the Huffman tree when the compressed retrieval keyword is searched.

14. A non-transitory computer-readable recording medium storing therein a search program that causes a computer to execute a process comprising:
generating a Huffman tree based from an XML file, leaf nodes of the Huffman tree that correspond to XML tags being different from leaf nodes of the Huffman tree that correspond to characters other than XML tags;
compressing the XML file into a compressed XML file using the generated Huffman tree;
receiving search input that includes a search keyword and search type of the search keyword;
setting a start flag for a compression code corresponding to an XML start tag related to the search type and an end flag for a compression code corresponding to an XML end tag related to the search type;
searching the compressed XML file for the compressed retrieval keyword, between the start flag and the end flag; and decompressing searched compression code using the Huffman tree when the compressed retrieval keyword is searched.

* * * * *

UNITED STATES PATENT AND TRADEMARK OFFICE
CERTIFICATE OF CORRECTION

PATENT NO. : 8,595,196 B2
APPLICATION NO. : 12/622902
DATED : November 26, 2013
INVENTOR(S) : Kataoka et al.

Page 1 of 1

It is certified that error appears in the above-identified patent and that said Letters Patent is hereby corrected as shown below:

In the Claims:

Col. 51, line 50, after "input" insert --that includes--.

Signed and Sealed this
Sixteenth Day of September, 2014

Michelle K. Lee
*Deputy Director of the United States Patent and Trademark Office*